US011550704B2

(12) United States Patent
Canter

(10) Patent No.: US 11,550,704 B2
(45) Date of Patent: Jan. 10, 2023

(54) METHODS, SYSTEMS AND COMPUTER PROGRAM PRODUCTS FOR AUTOMATED SOFTWARE TESTING

(71) Applicant: Intelliframe, Inc., Raleigh, NC (US)

(72) Inventor: James Arthur Canter, Raleigh, NC (US)

(73) Assignee: James Arthur Canter, Raleigh, NC (US)

( * ) Notice: Subject to any disclaimer, the term of this patent is extended or adjusted under 35 U.S.C. 154(b) by 0 days.

(21) Appl. No.: 16/886,416

(22) Filed: May 28, 2020

(65) Prior Publication Data

US 2020/0379891 A1   Dec. 3, 2020

Related U.S. Application Data

(60) Provisional application No. 62/854,083, filed on May 29, 2019.

(51) Int. Cl.
*G06F 11/36* (2006.01)
*G06F 8/71* (2018.01)

(52) U.S. Cl.
CPC ............ *G06F 11/3688* (2013.01); *G06F 8/71* (2013.01); *G06F 11/3664* (2013.01); *G06F 11/3684* (2013.01)

(58) Field of Classification Search
None
See application file for complete search history.

(56) References Cited

U.S. PATENT DOCUMENTS

| 8,739,150 | B2 * | 5/2014 | Gass ........................ G06F 8/36 717/173 |
| 9,164,859 | B2 * | 10/2015 | Rivera Trevino ..... G06F 11/263 |
| 9,342,301 | B2 * | 5/2016 | Koutrika ................... G06F 8/36 |
| 9,916,226 | B2 * | 3/2018 | Singonahalli ....... G06F 11/3668 |

(Continued)

OTHER PUBLICATIONS

Choodi, "Testing In Iterative Product Development Environment", 2006, 6th Annual International Software Testing Conference 2006 (Year: 2006).*

(Continued)

*Primary Examiner* — Hossain M Morshed
(74) *Attorney, Agent, or Firm* — Stanek Lemon Crouse & Meeks, PA

(57) ABSTRACT

A system for automating testing of a software product is provided including an automation test framework module configured to receive input from the framework to define and maintain test suite modules to test the software product including object requirements for tests based on user stories and/or requirements associated with the software product; build object instance navigation and automated test scripts based on the received input; and provide an object instance navigation map for the test suite modules, wherein the automation test framework module receives the input, builds the object instances and provides the object instance navigation map before or in parallel with coding analysis, design and coding of the software product. Thus, embodiments of the present inventive concept replace manual tests with an automated system. Related methods and computer program products are also provided.

23 Claims, 161 Drawing Sheets

(56) References Cited

U.S. PATENT DOCUMENTS

| | | | | |
|---|---|---|---|---|
| 2008/0270079 A1* | 10/2008 | Delory | ............... | G06F 11/273 |
| | | | | 702/186 |
| 2012/0030654 A1* | 2/2012 | Park | ............... | G06F 11/3684 |
| | | | | 717/124 |
| 2018/0074944 A1* | 3/2018 | Hirt | ............... | G06F 11/3664 |
| 2018/0267887 A1* | 9/2018 | Dsouza | ............... | G06F 40/30 |
| 2019/0042400 A1* | 2/2019 | Surace | ............... | H04L 67/146 |
| 2020/0183813 A1* | 6/2020 | Sudhakaram | ......... | G06F 40/268 |
| 2020/0379891 A1* | 12/2020 | Canter | ............... | G06F 8/71 |

OTHER PUBLICATIONS

OMG, "Test Information Interchange Format (TestIF)", 2015, Published by OMG (Year: 2015).*
Hamilton, "What is Parallel Testing? Definition, Approach, Example", 2021, https://www.guru99.com/parallel-testing.html (Year: 2021).*
Object Management Group, Test Information Interchange Format (TestIF), Version 1.0, May 2015, 113 pages.

* cited by examiner

| Project | Design | Reports | Approve | Maintenance | Developer | The Following |
|---|---|---|---|---|---|---|
| New | Test Definitions | Narrative Scripts | Test Definitions | Search | Engine Definitions | are Defined |
| Open | Test Suite Definitions | Executable Scripts | Test Suite Definitions | Replace | Application Definitions | Based on the |
| Print | Test Prefix Definitions | Test Results | | Assess Impact | Function Scriptlets | Test Design |
| Generate | Object Instance Navigation | Error Logs | | Object Type Definitions | OM Scriptlets | Modeling Tool: |
| Save | OM Narrative Definitions | Impact Report | | Test Type Definitions | Common Functions | Design Tool Maps |
| Save As | Function Narrative Definitions | | | Users | Design Tool Maps | |
| Import | Import Tests | | | Languages | Icon Library | Reports can be Done |
| Export | Adopt Tests | | | | | During the Pilot: |
| Share | | | | | | Narrative Scripts |
| Options | | | | | | Executable Scripts |
| Close | | | | | | Test Results |
| | | | | | | Error Logs |
| | | | | | | Impact Report |

Processing Rules

Generate Tests
Generate Narrative (1)
Generate Narrative (2)

FIG. 7

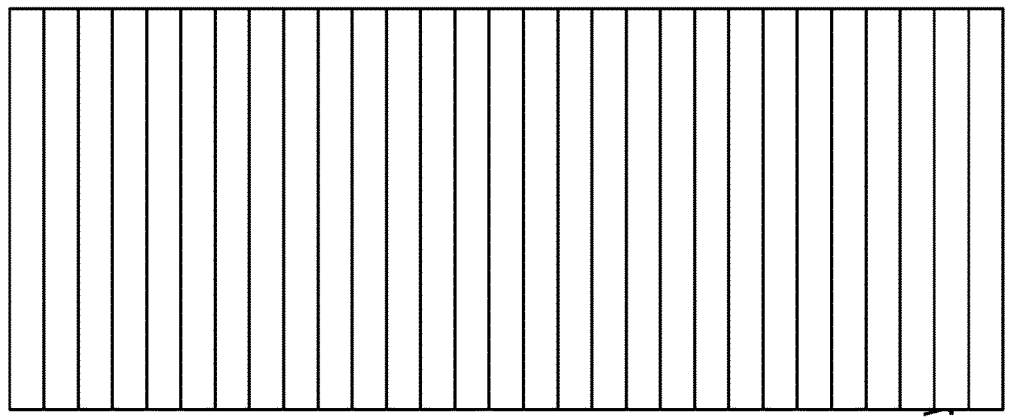

Print Command
Standard Microsoft Print Commands & Screens

Export Operation

Tag Convention & Formatting

Several data items can be treated as tabs, particularly in the search filter screen:
- Test Prefixes
- Requirement Names
- Tags
- Object Names
For example, when a user types in an object name that matches an object on file, the following is displayed successful match Login ID  Password  Colewort Pipal H

FIG. 8

Object Name:
Successful Match
As Soon as the user hits 'Enter' on a name being input, the application works to match the entry.
If the entry doesn't match the entry isn't bundled as a tag.
The "x" on the right of the tag allows the user to delete the entry.
When computing operations are initiated, non-bundled data is removed from the field.

Auto Text Convention (for typing fields that are record keys - e.g. Search

When user is typing in the keyname to call up a record, the system uses a similar convention for searching for a selection to call up an existing record match as it uses in the tag convention, however it doesn't bundle the entry as a tag.

| Filter Name | Module |
|---|---|
| | Mode in A Registration Tests |
| | Mode in A SIT Texts |
| | Mode in B Registration Tests |
| | Mode in B SIT Texts |

The search result window appears below the field as a pop-up dialog, and the user can click on a

Date-Time Stamps
Format yyyymmdd-hhmm (24 hour format) Hosting Machine or Server time

Installation
The installation script creates the following defaults
1. Sets default language to English and creates the Language record for "English"
2. Sets the default execution engine to Selenium and creates the Engine Definition record for "Selenium" (Java Script-no compiler)
3. Set the Replace Filter Time Out to 5 min.
4. Import path is set to C:\Users\<user ID>\AppData\Inteliframe\Test Import files

FIG. 8
(Continued)

| | |
|---|---|
| 1 | Use Case |
| 2 | Create/Revise Object Instance in Navigation |
| 3 | Create/Revise Test Definitions |
| 4 | Create/Revise Test Header |
| 5 | Create/Revise Test Steps |
| 6 | Create/Revise Test Suite Definitions |
| 7 | Create/Revise Test Prefix Definitions |
| 8 | Create/Revise OM Narrative Definitions |
| 9 | Adopt Test Definitions(*) |
| 10 | Approve Test Definitions |
| 11 | Approve Test Suite Definitions |
| 12 | Search |
| 13 | Replace |
| 14 | Assess Impact |
| 15 | Create/Revise Object Type Definitions |
| 16 | Create/Revise Test Type Definitions |
| 17 | Create/Revise Users |
| 18 | Replicate Narration(*) |
| 19 | Create/Revise Languages |
| 20 | Create/Revise Engine Definitions |
| 21 | Create/Revise Method Definitions |
| 22 | Create/Revise Function Definitions |
| 23 | Create/Revise Execution Scriptlets(*) |
| 24 | Create/Revise Common Functions(*) |
| 25 | Create/Revise Import Maps (for Adoption)(*) |
| 26 | OM Synch Analysis(*) |
| 27 | Replicate Execution(*) |
| 28 | Create/Revise Icons(*) |
| 29 | Generate Narrartive |

FIG. 9

Test Definition Tables (Header & Steps)

| Test Definition Header (Table) |
| --- |
| Test ID (*) |
| Test Prefix |
| Test Number |
| Callable (Boolean) |
| Calling Test Count (Int) |
| Test Name |
| Application |
| Status |
| Test Objective |
| Description |
| Test Type |
| Author ID |
| Author Name |
| Requirement |
| Requirement Risk |
| Notes |
| Last Generated |
| Last Run |
| Last Outcome |
| Last Outcome DTS |
| Reviewer ID |
| Reviewer Name |
| Submitted for Review DTS |
| Review Status |
| Approve (Boolean) |
| Reject (Boolean) |
| Review Status DTS |
| Reviewer Feedback |
| Escalation Request |
| Escalation DTS |

→ All Data

FIG. 10

| Test Header | | | |
|---|---|---|---|
| Test ID | Banking00043 | Application | Internet Banking |
| Test Prefix | Banking | Name | Verify Account Balance |
| Test Number | 00043 | Status | Production |

Test Objective

To verify account balance after transfer of $100

Callable N  Calling Tests

Test Description

| | | | |
|---|---|---|---|
| Test Type | SIT | Author | Jcanter   Jim Canter |
| Requirement | Internet Banking Accounts Transfer UC#235, Scenario 4 | | |
| Requirement Risk | 2-Medium | | |

Notes

| | | | |
|---|---|---|---|
| Last Generated | YYYYMMDDHH:MM | Last Outcome | Passed |
| Last Run | YYYYMMDDHH:MM | On | YYYYMMDDHH:MM |
| Review Status | Rejected | YYYYMMDDHH:MM | |
| Reviewer | Jmarlo   June Marlo | Days since Submission | 5 |

Reviewer Feedback

Escalation   YYYYMMDDHH:MM
Escalation Request

Initiated Flat File with Filename <Application>-<Test ID>-<Language> YYYYMMDD HH:MM

**FIG. 10
(Continued)**

| Test Definition Test Steps |
|---|
| Test ID (*) |
| Test Step Number (*) |
| Function Name (Partial Key) |
| Function Name ID (key) |
| {Language - not included} |
| Object Instance (Partial Key) |
| Application Name (key) |
| Object Name ID (key) |
| {Engine Name (key) - not included} |
| OM Narrative Definition (Partial Key) |
| Object Type (key) |
| Method ID (key) |
| {Language - not included} |
| Test Step Narrative |

| Test Definition Test Steps-Token Values |
|---|
| Test ID (*) |
| Test Step Number (*) |
| Token Name (*) |
| Data |

FIG. 11B

Object, Function & OM Definition Tables

Object Instance Table

| |
|---|
| Application Name (key) (*) |
| Object Name ID (*) |
| Engine Name (Key) (*) |
| Object Name |
| Object Type Name (key) |
| Outline Level (1....6) |
| Executable |

OM Narrative Definition Table

| |
|---|
| Object Type (key)(*) |
| Method ID (*) |
| Language (key) (*) |
| Method Name |
| Tokens |
| Narrative |

Function Narrative Definition Table

| |
|---|
| Function Name ID (*) |
| Language (key) (*) |
| Function Name |
| Tokens |
| Narrative |

FIG. 11C

Processing Data for OM Narrative
Assemble Object & Method Names, Token Values and Narrative
Example
Test Definition Test Steps Table

| Test ID | Test Step Number | Function Name Key | Object Instance Key | OM Narrative Key | Test Step Narrative |
|---|---|---|---|---|---|
| Banking 00054 | 1 | <Blank> | App Name + Obj Name | Obj Type + Method ID | For Table//Obj_Inst_Name//, Search Column//ColA_Nbr//for//Search_Data//and Get the Row Number. In Column Number//ColB_Nbr// of that Row Enter//Data// |

Test Definition Test Steps-Token Values

| Test ID | Test Step Number | Token | Data |
|---|---|---|---|
| Banking00054 | 1 | ColA_Nbr | 3 |
| Banking00054 | 1 | Search_Data | Mary Smith |
| Banking00054 | 1 | ColB_Nbr | 4 |
| Banking00054 | 1 | Data | 3142 Allen Ave |

For Table//Obj_Inst_Name//, Search Column//ColA_Nbr//for//Search_Data//and Get the Row Number. In Column Number//ColB_Nbr//of that Row, Enter//Data//.
For Table Address List, Search Column 3 for Mary Smith and Get the Row Number. In Column Number 4 of That Row, Enter 3142 Allen Ave.
    (Object Name)

Test Step Narrative Result:
00001 for Table Address List, Search Column 3 for Mary Smith and Get the Row Number. In Column Number 4 of that Row, Enter 3142 Allen Ave
Executable Script Remark Result
Step 00001-000: for Table Address List, Search Column 3 For Mary Smith and Get the Row Number. In Column Number 4 of that Row, Enter 3142 Allen Ave

FIG. 11F

| Target Step |
|---|
| Test Definition Test Steps |
| Test ID (*) |
| Test Step Number (*) |
| Function Name (Partial Key) |
|     Function Name ID (key) |
|     {Language - not included} |
| Object Instance (Partial Key) |
|     Application Name (key) |
|     Object Name ID (key) |
|     {Engine Name (key) - not included} |
| OM Narrative Definition (Partial Key) |
|     Object Type (key) |
|     Method ID (key) |
|     {Language - not included} |
| Test Step Narrative |

| Test Definition Test Steps-Token Values |
|---|
| Test ID (*) |
| Test Step Number (*) |
| Token Name (*) |
| Data |

FIG. 12B

| Test Definition Header (Table) |
| --- |
| Test ID (*) |
| Test Prefix |
| Test Number |
| Callable (Boolean) |
| Calling Test Count (Int) |
| Test Name |
| Application |
| Status |
| Test Objective |
| Description |
| Test Type |
| Author ID |
| Author Name |
| Requirement |
| Requirement Risk |
| Notes |
| Last Generated |
| Last Run |
| Last Outcome |
| Last Outcome DTS |
| Reviewer ID |
| Reviewer Name |
| Submitted for Review DTS |
| Review Status |
| Approve (Boolean) |
| Reject (Boolean) |
| Review Status DTS |
| Reviewer Feedback |
| Escalation Request |
| Escalation DTS |

FIG. 12C

| Replace Filter Table |
|---|
| Replace Filter Name (*) |
| Replace Filter Type (O or F) |
| Target Object Instance ID |
| Target Method ID |
| Replace Object Instance ID |
| Replace Method ID |
| Target Function ID |
| Replace Function ID |
| Target Test Step |
| Replace Test Step |
| Test Step Count Replaced |
| Replace Complete DTS |

| Replace Test Steps-Token Values |
|---|
| Replace Filter Name (*) |
| Replace Token Name |
| Replace Data |

| Target Test Steps |
|---|
| Replace Filter Name(*) |
| Test ID (key) |
| Test Step Number (key) |

FIG. 12D

Test Definition Tables (Header & Steps)

| Test Definition Header (Table) |
| --- |
| Test ID (*) |
| Test Prefix |
| Test Number |
| Callable (Boolean) |
| Calling Test Count (Int) |
| Test Name |
| Application |
| Status |
| Test Objective |
| Description |
| Test Type |
| Author ID |
| Author Name |
| Requirement |
| Requirement Risk |
| Notes |
| Last Generated |
| Last Run |
| Last Oucome |
| Last Outcome DTS |
| Reviewer ID |
| Reviewer Name → Reviewer Name |
| Submitted for Review DTS |
| Review Status → Review Status |
| Approve (Boolean) |
| Reject (Boolean) |
| Review Status DTS → Review Status DTS |
| Reviewer Feedback |
| Escalation Request |
| Escalation DTS |

FIG. 13B

| | |
|---|---|
| I-Frame <Project Name> | |
| Project   Reports   Design   Approve   Maintenance   Developer | |
| Options | |

| Test Engineer Email DL | (up to 150 characters) |
| Replace Filter Time Out | 5 (min)  (defaults to 5 min) |
| Language | English  (up to 30 characters) |
| Execution Engine | Selinium  (up to 30 characters) |
| Import Path | (up to 500 characters) |
| Design Tool Map | Optim |

| Operation | Action |
|---|---|
| Select Menu Item | Navigates to Menu Screen and Makes Relevant Operations Available |

Note: This Filter Screen can be Called for other Operations in the Application. It Serves as a Pop-up(Yellow Screen with Light Blue Header)

| Navigation Map Ribbon |
|---|
| None |

| Rules |
|---|
|  |
|  |
|  |
|  |
|  |
|  |

FIG. 15

| Boolean Operator Table |
|---|
| > |
| < |
| = |
| >= |
| <= |

| Test Status Pulldown Table |
|---|
| New |
| In Progress |
| Tier 1 Resolution |
| Tier 2 Resolution |
| Tested OK |
| Production |

| Last Test Outcome Pulldown Table |
|---|
| No Run |
| Pass |
| Fail |
| Incomplete |

| Test Review Status Pulldown Table |
|---|
| Submitted |
| Approved |
| Rejected |

| Requirement Risk Pulldown Table |
|---|
| 3-High |
| 2-Moderate |
| 1-Low |
| 0-None |

FIG. 15
(Continued)

| Operation | Action |
|---|---|
| Select Menu Item | Navigates to Menu Screen and Makes Relevant Operations Available |

| Navigation Map Ribbon |
|---|
| None |

| Rules |
|---|
| Import File Screen is Launched as Shown |
| Import File Name Entry/Selection(Mandatory) |
|     File Name is Entered or Selected in Browsing Operation |
|     Browsing is Configured to Filter for xml Type Files |
|     Unqualified Name (i.e. without the directory path) is selected |
| Test Prefix(Mandatory) |
|     One Test Prefix is Selected from the Defined Test Prefixes |
| Design Tool Map(Mandatory) |
|     The Default Design Tool Map Name is Entered as Shown in Options |
|     Selection of Other Pre-Defined Maps are Available in the Pull Down |
| Import Button |
|     Enabled After All Mandatory Fields Are Filled in |
|     When Pushed, Initiates Import Parsing to the Adoption Staging File |
| Error Pop-Ups(After Import Button is Pushed) |
|     Import File Format Inconsistent with OMG TESTIF Specification |
|     Parsing Error at Line xx in the Import File |
|     File not Found |
|     Error(s) Logged in The Import Log |
| Success Pop-up Launched When Import File is Parsed Successfully |
| OK Button On Pop-Ups - Closes the Pop-Up Message |

FIG. 16B

- Log Entries
  - Import File Format Inconsistent with OMG TESTIF Specification
  - Parsing Error at Line xx in the Import File
  - Import File <Import File Name> Successfully Parsed
  - File Not Found
- Import Destination
  - Adoption Tables
- Design Tool Field
  - Required Field-a Predefined Design Tool Name Must be Selected
- Import File Field
  - Through Browsing or Manual Entry the Valid Import Filename Is Entered
- Browse Button
  - Disabled Until The Design Tool Filed Is Filled In
- Disabled Until the Import File Field Is Filled In
- Process
  - Parsing Halts at First Error
  - Key Construction for Data Pulled Into Adoption Staging Tables
    - Import Filename
    - Test ID is Constructed Using The Prefix and the Number is Incremented From the Last Count
  - Adoption Complete Date is Set to 00000000-0000
  - Status is Set to "New"
  - Application Name is Taken From the Prefix Record
  - Author ID is Taken From the User ID of the Person Importing the File
  - Remaining Header and Test Step Data is pulled from the xml File According to the Map

FIG. 16B
(Continued)

Import Success Pop-Up

| Import Successful |
|---|
| Import file successfully processed |
| ok |

Tables

| Import Log Table |
|---|
| YYYYMMDDHHMM (24 hr clock) (*) |
| Entry Line (00000) (*) |
| Log Text |

| Adoption Staging Test Definition Header (Table) |
|---|
| Import Filename (*) |
| Test ID (*) |
| Adoption Complete Date |
| Test Prefix |
| Test Number |
| Test Name |
| Application |
| Status |
| Test Objective |
| Description |
| Test Type |
| Author ID |
| Author Name |
| Requirement |
| Requirement Risk |
| Notes |
| Ready to Adopt (Boolean) |

FIG. 16C

| | I-Frame <Project Name> | - □ x |
|---|---|---|
| Project   Reports   Design   Approve   Maintenance   Developer | | |

| <Project Name>Test Definitions | | Filter   No Active Filter | |
|---|---|---|---|
| Test ABC000C Application Name...... | Test Name............................ | Test Status | Called |
| Test ABC000C Application Name...... | Test Name............................ | Test Status | |
| Test ABC000C Application Name...... | Test Name............................ | Test Status | |
| Test ABC000C Application Name...... | Test Name............................ | Test Status | Calling |
| Test ABC000C Application Name...... | Test Name............................ | Test Status | |
| Test ABC000C Application Name...... | Test Name............................ | Test Status | |
| Test ABC000C Application Name...... | Test Name............................ | Test Status | |
| Test ABC000C Application Name...... | Test Name............................ | Test Status | Calling |
| Test ABC000C Application Name...... | Test Name............................ | Test Status | |
| Test ABC0001 Application Name...... | Test Name............................ | Test Status | |
| Test ABC0001 Application Name...... | Test Name............................ | Test Status | Calling |
| Test ABC0001 Application Name...... | Test Name............................ | Test Status | |
| Test ABC0001 Application Name...... | Test Name............................ | Test Status | |

Right - Mouse Click Pop-up Menu (When a Record is Selected)

Add
Delete

Test Deletion Confirmation Pop-up

Confirm Test Deletion

To Confirm deletion of the Test Definition,
Press "OK" below

OK   Cancel

Test Definition Deletion Blocked Pop-up

Test Definition Deletion Blocked

The Test Definition cannot be deleted
as it is called by other tests

| Operation | Action |
|---|---|
| Select Menu Item | Navigates to Menu Screen and Makes Relevant Operations Available |
| Double Click on Record | Launches Test Definition Screen for the Record Selected |
| Right-Mouse-Button | When a Record is Selected, Lanches Pop-up Menu (See Below) |

| Navigation Map Ribbon | | |
|---|---|---|
| Add(+) Delete(-)<br><br>Add/Delete | Filter<br><br>Trace | |

| Rules | | |
|---|---|---|
| Test Definition List Screen | Clicking on a Test Record Launches the Test Definition Header Screen for the Related Test Definition | |
| | For Screen Actions, Use the Right-Mouse Click Pop-up Menu | |
| | Filter | |
| | | Clicking on Filter Launches the Test Definition Search Filter Screen |
| | | See Maintenance>Search for Test Definition Search Filter Screen Rules |
| | | Employment of a Saved a Test Definition Search Filter, the Test Definition Search Filter Nan |
| | | Employment of an Unsaved Filter, the Message "Unnamed Filter" is displayed to the Right o |
| | | When No Filter is Active, the Message "No Active Filter" is Displayed to the Right of the "Filt |
| | Tests are Listed with the Following Fields Displayed | |
| | Test ID(Prefix + Test Number) | |
| | Application Name | |
| | Test Name | |
| | Test Status | |
| | Called/Calling Status | |
| | | "Called" if a Test is Called by Another Test |
| | | "Calling" if a Test is Calls Another Test |

FIG. 17A
(Continued)

| | |
|---|---|
| Add | The Add(+) Ribbon Command Launches a Fresh Test Definition Header Screen |
| | Double Clicking on the Screen (NOT on a specific Record) Launches a Fresh Test Definition Head |
| Delete | The Delete(-) Ribbon Command is Disabled if a Test Definition isn't Selected |
| | The Delete(-) Ribbon Command Deletes the Test Definition for the Selected Test |
| | If the Test Selected for Deletion is being called by others Tests, Deletion is Blocked |
| |     The Test Deletion Blocked Pop-up is Launched |
| |     "OK" Closes the Pop-up |
| | If the Test Selected for Deletion is NOT being Called by Other Tests, Deletion is Allowed After |
| |     The Test Deletion Confirmation Pop-up is Launched |
| |     "OK" Closes the Pop-up and Deletes All Related Test Definition Data, Including Test Steps |
| |     "Cancel" Closes the Pop-up and does Nothing Else |

FIG. 17A
(Continued)

Test Definition Search Filter pop-up screen

Test Definition Search Filter

| Filter Name | <Up to 50 characrars> | | | | |
|---|---|---|---|---|---|
| Prefixes | | Tag format | | | |

| | | ---Dates--- | Boolean | 1st Date | Boolean | 2nd Date | |
|---|---|---|---|---|---|---|---|
| Application | At Least 1 Pull Down | Generated | | | and | | ˄ ˅ |
| Status | At Least 1 Pull Down | Executed | | | and | | |
| Last Outcome | At Least 1 Pull Down | Approved | | | and | | |

Callable only ▫

| Req'm't | | Tag format | ˄ ˅ |
|---|---|---|---|
| Requirement Ris | At Least 1 Pull Down | | |

| Tags | | Tag format | ˄ ˅ |
|---|---|---|---|

| Test Autho | <Pulldown - One> | Object Type | At most 1 pulldown value |
|---|---|---|---|
| Test Type | At Least 1 pull Down | Method | At most 1 pulldown value |

| Obj Name | | Tag format | |
|---|---|---|---|

Test Names Only ▫

[Load]  [Apply]  [Save]  [Delete]

FIG. 17B

Example of Filtered Display

| | I-Frame <Project Name> |
|---|---|
| Project Reports Design Approve Maintenance Developer | |
| <Project Name> Test Definitions | Filter | Module A Regression Tests |

Test ABC0000: Application Name......... TestName............ Test Status   Called
Test ABC0000: Application Name......... TestName............ Test Status

Test Definition Screen (Header)

[Required Fields]   [Required for Submission]

Test Definition Header

| Test ID Prefix | <Pulldown One> | <Number> | <Full Test ID (prefix+Number)> | Callable ☐ |
| Test Name | <Up to 50 Characters> | Status | <Pulldown - One> | Called By |
| Application | <Pulldown One> | | | 0 Tests |

Test Objective     <Up to 500 Characters>
Description        <Up to 1000 Characters>

| Test Type | <Pulldown One> | Requirement | <Up to 50 Characters> |
| Author ID | <Pulldown One> | ...Author Name.....Requirement Risk | <Pulldown One> |

Tags          <Tag Format>
Suites        <Tag Format>
Notes         <Up to 1000 Characters>

Operation Events....................................................................
   Last Generated <Date-Time Stamp> Last Run <Date-Time Stamp> Last Outcome <Last Outcome> <Date-Time Stamp>

Reviews.................................................................................
[Submit] <Reviewer Name....>   Submitted for Review <Date-Time Stamp> Review Status <Review Status>
Reviewer ID <Pulldown-One> Days Since Submission <# Days>  Date <Date-Time Stamp>
Reviewer Feedback    <Up to 500 Characters>

Tier 2 Escalation.....................................................................
                 Escalation Request:
[Escalate]
<Date-Time Stamp>        <Up to 500 Characters>

Days since escalation <# Days since submission>

[Save] [Generate] [Delete] [Cancel]

FIG. 17C

| Rules for Test Definition Header Screen |
|---|
| Test ID |
|    Prefix |
|       Prefix is Mandatory and One and Only One Prefix Value May be Selected |
|       Test Prefix is Auomatically Added as a Tag in the "Tags" Field |
|    Test Number |
|       Is Auto-Generated from the Test Prefix Record for up to 99,999 Tests |
|    Full Test ID |
|       Combines Prefix+Number |
| Callable (Checkbox) |
|    When TRUE, this Test can be Called by Other Tests |
|    When the Test is Called (used) by Other Tests, those Tests are Listed in the "Called by" Pop-l |
|       The Test Records can't be Deleted or Altered |
|       Only the Test data Entries may be Changed |
| Called by Button |
|       Launches the "this test Called by" Screen (see Below) |
|       The Called By Button is Disabled when |
|          The Test Onscreen Calls Other Tests (Nested Calls are not Supported) |
|          The "this Tests Called by" Screen is Open |
| Test Count (Below Called by Button) is the Number of tests calling the current test |
| Test Objective Field Allows up to 500 Characters |
| Description Field Allows up to 1000 Characters |
| Test Type is a Pulldown Field where One and Only one Record must be Selected-Defaults to BL |
| Author ID is a Pulldown Field where One and Only One Record must be Selected-Defaults to th |
| Author Name is Displayed to the Right of Author ID and is Changed when the ID is Changed |
| Requirement Field Allows up to 50 characters and Uses the Auto-Text Field to List Matches to e |
| Requirement Risk Field Is a Pulldown Field where One and Only One Record Must be Selected - |
| Tags is a Tag Field where up to 100 Tags can be Defined /Reused |
| Suites (Tag Field) can assign the Test to an Existing Suite (Only Existing Suite Definition Record |
|    When a Test is a Added to a suite in the Test Suite Definition Screen, the Suite Name Tag is a |
|    When a Test is deleted from a suite, in the Test Suite Definition Screen, the Suite Tag Name |
|    A Test can Belong to Multiple Suites |

FIG. 17D

| | | |
|---|---|---|
| | Notes Field Allows up to 1000 Characters | |
| | Dates & Outcome Section | |
| | | Last Generated - Displays the Date-Time Stamp Marking the Last Time this Test was Generate |
| | | Last Run -Displays the Date -Time Stamp Marking the Last Time the test Script was Executed |
| | | Last Outcome-Displays the Last Outcome (see Last Outcome tbl Below) and the Assoc Date |
| | Reviews Section | |
| | | Submit Button |
| | | Generates an Email to the Reviewer in the Reviewer ID Requesting they Review (and app) |
| | | Saves the Date-Time -Stamp of the Email Request Generation ("Submitted for Review") Field |
| | | Changes the Review Status Field to "Submitted" |
| | | Is DISABLED if the Reviewer ID is Blank OR the Review Status is "Approved" |
| | | Reviewer ID is a Pull Down Field where One and Only One Record is Selected-Defaults to BLA |
| | | Reviewer ID is a Pull Down Filters to Include Only Those Users Authorized to Review Test Define |
| | | Reviewer Name is Displayed Above Reviewer ID and is Changed when the ID is Changed |
| | | Days Since Submission is a Calculated Field - Calculated when the Record is Opened. NOT S |
| | | Review Status Displays the Review Status of this Test (Defaults to "N/A" for New Records) |
| | | Date Displays the Date-Time Stamps for the Review Status Displayed (for First Status, Date -Time |
| | | Reviewer feedback field is Always Displayed and will Display the Reviewers Feedback (up to |

FIG. 17D
(Continued)

- Tier 2 Escalation Section
  - Escalate Button
    - Generates an Email to the Automation Engineer Email DL as Defined in Options
    - Sets the Date - Time Stamp Value for the Email (Displayed Below the Button)
  - Request field Allows up to 500 Characters and is Include in Escalation Email
  - Days Since Escalation is a Calculated Field- Calculated when the Record is Opened NOT Sa
- Save
  - Saves the header Record, Collapses the Header Display and Opens the Test Steps Section
  - If the Test Header Record, is New OR the Test Prefix was Changed:
    - The Next Test Number is Generated and Included in the File & Increment in the Prefix re
    - All Test Steps are Updated with the New Test ID, Prefix, and Test Number
- Delete
  - If any Other test Calls this Test, the Delete button is Disabled
  - If no Other Tests Call this Test, the Test Deletion Confirmation Pop-up is Launched
  - "Ok" Closes the Pop-up and deletes the Test Definition Records
  - "Cancel" Closes the Pop-up and Nothing is Deleted
- Cancel Closes the Test Definition Header Screen and Nothing Else Happens

FIG. 17D
(Continued)

Test Definition Header Pulldowns

| Test Prefix Pulldown | Application Pulldown | Test Status Pulldown | |
|---|---|---|---|
| (... All Defined Test Prefixes) | (... All Defined Applications from Application Name Tab) | New | (Defalt) |
| *(Dynamic)* | *(Dynamic)* | In Progress | |
| | | Tier 1 Resolution | |
| | | Tier 2 Resolution | |
| | | Tested OK | |
| | | Production | |
| | | *(From Options)* | |

| Test Type Pulldown |
|---|
| System |
| UAT |
| Smoke |
| SIT |
| Regression |
*(Dynamic)*

| Test Author Pulldown |
|---|
| *Defaults to Current User* |
| (... All Defined User IDs) |
| *(Dynamic)* |

| Requirement Risk Pulldown |
|---|
| |
| 3-High |
| 2-Moderate |
| 1-Low |
| 0-None |
*(From Options)*

| Reviewer ID Pulldown |
|---|
| *(All User ID's with "Approval-Test Definitions" checked on User Record)* |
*(Dynamic)*

Last Test Outcome & Review Status Values

| Last Outcome Values | Review Status Values |
|---|---|
| No Run | N/A |
| Pass | Submitted |
| Fail | Approved |
| Incomplete | Rejected |

*(Dynamic)*

Last Test Outcome & Review Status Values

| Last Outcome Values | Review Status Values |
|---|---|
| No Run | N/A |
| Pass | Submitted |
| Fail | Approved |
| Incomplete | Rejected |

FIG. 17E

Select Method Pulldown

Select Method for Data Entry Object Type

| Test Definition Header |||||
|---|---|---|---|---|
| Test ID  Prefix  *<Prefix>*  *<Number>*  *<Full Test ID(prefix+Number)>* | | | | ☐ Callable |
| Test Name ←——— *Test Name* ———→ Status — *Status* | | | | Called By |
| ↓ Test Header ||||
| Test Steps  [+] [-]  [^] [v] [>] ||||
| 00001 Enter Jim/Smith in First Name Field ||||
| 00002 Enter Smith in Last Name Field ||||
| 00003 Street Address Method: | Select One ||||
| | Enter ||||
| | Validate Enabled ||||
| | Validate Disabled ||||
| | Clear ||||

Result

| Test Definition Header |
|---|
| Test ID  Prefix  *<Prefix>*  *<Number>*  *<Full Test ID(prefix+Number)>*  ☐ Callable |
| Test Name ←——— *Test Name* ———→ Status — *Status*  Called By |
| ↓ Test Header |
| Test Steps  [+] [-]  [^] [v] [>] |
| 00001 Enter Jim/Smith in First Name Field |
| 00002 Enter Smith in Last Name Field |
| 00003 Enter 1408 Main St ← in Street Address Field   Test analyst enters actual address in entry field provided |

FIG. 17F
(Continued)

Complex Test Step Example

Token Conversion to Input Fields

| Test Definition Header |||||
|---|---|---|---|---|
| Test ID Prefix Banking | 00054 | Banking00054 | | Callable ☐ |
| Test Name Update Address List | | Status Production | | Called By |

↓ Test Header
Test Steps | + | - | ∧ | ∨ | >

00001 For Table Address List, Search Column 3 for Mary Smith and get the row number. In column number 4 of that row, enter 1342 Allen Ave (Object Instance) (ColA Nb) (Search Data)
(ColB Nb) (Data)

(Row Nbr) *is a hidden variable used by the executable script*

Save | Cancel

Address List Table (Before)

| # | Member? | Name | Street | City | State |
|---|---|---|---|---|---|
| 1 | Y | John Jenkins | 134 Hollingsworth Dr | Temple | AZ |
| 2 | Y | Vira Mar | 227 Aimes Dr | Temple | AZ |
| 3 | N | Keith Hastings | 322 Foster St | Wiley | CO |
| 4 | N | Mary Smith | 2322 1st St | Shermar | NM |
| 5 | Y | Julian Moore | 1530 Winter Ln | Kingwod | TX |
| 6 | Y | Kyle Harris | 534 Sample Dr | Sullivan | WY |

Address List Table (After)

| 1 | 2 | 3 | 4 | 5 | 6 |
|---|---|---|---|---|---|
| # | Member? | Name | Street | City | State |
| 1 | Y | John Jenkins | 134 Hollingsworth St | Temple | AZ |
| 2 | Y | Vira Mar | 227 Aimes Dr | Temple | AZ |
| 3 | N | Keith Hastings | 322 Foster St | Wiley | CO |
| 4 | ~~N~~ | ~~Mary Smith~~ | →1342 Allen Ave | Shermar | NM |
| 5 | Y | Julian Moore | 1530 Winter Ln | Kingwod | TX |
| 6 | Y | Kyle Harris | 534 Sample Dr | Sullivan | WY |

FIG. 17F
(Continued)

| Rules for Test Definition Test Steps Screen | | |
|---|---|---|
| Test Definition Test Step Screen | When the Test Header is Saved, the Header Screen is Collapsed and the Test Steps Section is Displayed | |
| | Test Header Information is Displayed as Shown | |
| | Callable Field is Disabled | |
| | Called by Button is Disabled | |
| | ↓ Test Header | Test Header Can be Re-Displayed by Selecting the Down Arrow |
| | Test Step + - ∧ v > | The Following Buttons are Disabled if a Test Step has not been Selected |
| | | + Button Adds a New Test Step Number |
| | | − Button Delets the Selected Test Step |
| | | ∧ Button-Moves the Selected Step up by One Position |
| | | v Button-Moves the Selected Step Down by One Position |
| | | > Button-Inserts a Test Step Above the Selected Step |
| | New Test Step | |
| | 0000n> ☐ ƒ | |
| | | 0000n Next Step Number (Last Number+1) |
| | | ☐ Button-Launches the Select Object Instance in <Application Name> Pop-up |
| | | ƒ Button-Activates the Function Selection Pulldown Field to the Right of the Test Step Number |
| | A New Test Step Screen (no Test Steps) Defaults with Step 00001 and the Object & Function buttons | |
| | Each Time a Test Step is Saved the Next Sequential Test Step is Displayed with the "☐" & "ƒ" Buttons | |
| | Deleting, Inserting or Moving a Test Step Renumbers Test Steps Sequentially | |
| | Note: Test Steps are Saved in the Format "0000#-000" (See Section on Calling a Test) | |
| Object Instance Based Test Steps | | |
| Select Object Instance Pop-up | Double Click on Object to Select, then Pop-up Closes and the Method Selection Pop-up for th | |
| | Select Button: Selects the Object Highlighted | |
| | Cancel Closes the Pop-up and Does Nothing Else | |
| Test Steps Scree | After an Object Instance is Chosen, the Test Step | |
| | | Displays the Step Number, Followed by the Object Instance Name and a Pull-down Field for the re |
| | After the Method is Chosen, in the Pulldown | |
| | | The Step is Displayed According to the Related OM Definition |
| | | Visible Token Fields are Converted to Input Fields and Displayed as Per the Phrasing of the OM Def |
| | The Test Analyst Enters the Appropriate Input Data Into These Token Fields | |

FIG. 17G

| Rules for Test Definition Test Steps Screen (Continued) |
|---|
| Function Based Test Steps |
| Selecting the Function(*f*) Button Causes the Function Selection Pulldown to be Displayed to the Right O |
| When the Function is Selected, the Step is Displayed According to the Related Function Definition |
| Calling Another Test |
| Function "Call Test" is a Native, Hard Coded Function |
| When Selected from the Function Pull-down, the Step is Displayed as Per the Function Definition (see |
| Included in the Pulldown |
| Callable Tests(i.e, "TRUE" Assigned to Callable Field in Header) |
| "Production" Assigned to Status Field in Header |
| Same Application Value as Calling Test in "Application" Header Field |
| When Called Test Selection is Complete, |
| The First Line States which Test is Being called and is Assigned a Non-calling Test Step Number(s) |
| All Subsequent Lines are Inserted Below the First Line and Ahead of Any Subsequent Non-calling s |
| Sequencing is Mainained with Test Step Number Suffixes(See Below) |
| Called Test Steps are Hidden and Inherit the Same 1st 5 Digits as the Calling Step. They are Apper |
| Non-Called Steps #####-000 |
| Called Steps #####-001 Through 999 |
| Example of Called Test with Actual Test Steps |
| 00001-000 Call Test Banking0002 Login User<br>00001-001 Launch IE Browser<br>00001-002 Navigate to URL https://www.internetbankingsite.com<br>00001-003 Verify Internet Banking Login Page<br>00001-004 Verify Text "Welcome to the Internet banking site"<br>00001-005 Enter User ID Jamaca1<br>00001-006 Enter Password zWK243#<br>00001-007 Press Login Button<br>00001-008 Verify Internet Banking Main Menu Page<br>00001-009 Verify Text "Internet Banking Main Menu"<br>00002-000 Select Hypertext Display Accounts<br>00003-000 Verify Checking Account Balance of $400.00<br>00004-000 Select Text Logout |

- All Fields Default to the Values Assigned in the Original, Called Test
- Any Field can be Overridden with a New Value, which is Saved with the Test
- When Inserting, Deleting or Moving a Number Above a Called Test,
  - The Prefix Number is Renumbered to Maintain Test Step Sequence, the Suffixes Keep Their Values
- When Moving a Called Test, Only the Prefix Number is Changed, the Suffixes Keep their Values
- For Tests that are Being Called,
  - The Calling Test ID & Name is Saved (See Header Tables)
  - The Test Header Cannot be Deleted or its Name Changed
  - Test Steps Cannot Be Deleted, Added to, or Moved
  - Only Data Values can be Changed
    - When Data Values are Changed, No Existing Calling Tests Inherit the New Values
  - The Following Header Fields are Disabled, Retaing their Original Values
    - Prefix
    - Test Name
    - Application
  - The Status Field can be Changed from "Production"
    - No Calling Tests are Affected
    - The Test will not Show Up in "Call Test" Pulldowns Until the Status "Production" is Restored
- Save Button
  - The Save for Test Steps is Enabled, Unless an Active Replace Filter has Targeted Any Step in
- Cancel Button
  - Closes the Test Step Screen and Restores the Header Screen

**FIG. 17H
(Continued)**

Adding a Function

| Test Definition Header |||||
|---|---|---|---|---|
| Test ID Prefix | *Banking* | *00043* | *Banking00043* | Callable ☐ |
| Test Name | *Verify Account Balance* | | *Status Production* | Called By |
| ↓ Test Header ||||||

| Test Steps | + | - | ^ | v | > |

00001> |O| *f*   (Triggers the function selection pulldown)

| Test Definition Header |||||
|---|---|---|---|---|
| Test ID Prefix | *Banking* | *00043* | *Banking00043* | Callable ☐ |
| Test Name | *Verify Account Balance* | | *Status Production* | Called By |
| ↓ Test Header ||||||

| Test Steps | + | - | ^ | v | > |

00001> |O| *f*
*Select One*
Call Test
Close Browser
Launch Chrome Browser
Launch IE Browser
Log System Time
Wait

| Test Definition Header |||||
|---|---|---|---|---|
| Test ID Prefix | *Banking* | *00043* | *Banking00043* | Callable ☐ |
| Test Name | Verify Account Balance | | *Status Production* | Called By |
| ↓ Test Header ||||||

| Test Steps | + | - | ^ | v | > |

00001 Wait __5__ seconds.

FIG. 17I

Adding the "Call Test" Function

| Test Definition Header |||||
|---|---|---|---|---|
| Test ID  Prefix | *Banking* | 00043 | *Banking00043* | Callable ☐ |
| Test Name | *Verify Account Balance* | | Status  *Production* | Called By |

↓ Test Header

Test Steps  + -  ∧ ∨ >

00001 Call Test    Select One
                   Banking00002 Login User
                   Banking00003 Navigate to Customer Profile
                   Banking00004 Logout

| Test Definition Header |||||
|---|---|---|---|---|
| Test ID  Prefix | *Banking* | 00043 | *Banking00043* | Callable ☐ |
| Test Name | Verify Account Balance | | Status  *Production* | Called By |

↓ Test Header

Test Steps  + -  ∧ ∨ >

00001 Call Test Banking0002 Login User    (see Banking00002 below)
    Launch IE Browser
    Navigate to URL  https://www.internetbankingsite.com
    Verify Internet Banking Login page
    Verify Text "Welcome to the Internet banking site"
    Enter User ID Jamaca1    (Login Id changed after test *defaults* loaded)
    Enter Password zWK243#    (Password changer after test *defaults* loaded)
    Press Login button
    Verify Internet Banking Main Menu page
    Verify Text "Internet Banking Main Menu"
00002 Select Hypertext Display Accounts
00003 Verify Checking Account Balance of $400.00
00004 Select Text Logout

[Save] [Cancel]

FIG. 17I
(Continued)

| Rules for Test Definition Test Steps Screen (Continued) |||
|---|---|---|
| | Function Based Test Steps ||
| | Selecting the Function(f) Button Causes the Function Selection Pulldown to be Displayed to the Right O ||
| | When the Function is Selected, the Step is Displayed According to the Related Function Definition ||
| | Calling Another Test ||
| | Function "Call Test" is a Native, Hard Coded Function ||
| | When Selected from the Function Pull-down, the Step is Displayed as Per the Function Definition (see Included in the Pulldown ||
| | | Callable Tests(i.e, "TRUE" Assigned to Callable Field in Header) |
| | | "Production" Assigned To Status Field in Header |
| | | Same Application Value as Calling Test In "Application" Header Field |
| | When Called Test Selection is Complete, ||
| | | The First Line States which Test is Being Called and is Assigned a Non-Calling Test Step Numbers(s |
| | | All Subsequent Lines are Inserted Below the First Line and Ahead of Any Subsequent Non-Calling s |
| | | Sequencing is Mainaimed with Test Step Number Suffixes(See Below) |
| | Called Test Steps are Hidden and Inherit the Same 1st 5 Digits as the Calling Step.They are Apper ||
| | | Non-Called Steps #####-000 |
| | | Called Steps #####-001 Through 999 |
| | | Example of Called Test with Actual Test Steps |
| Test Steps Screen | | 00001-000 Call Test Banking0002 Login User<br>00001-001 Launch IE Browser<br>00001-002 Navigation to URL https//www.internetbankingsite.com<br>00001-003 Verify Internet Banking Login Page<br>00001-004 Verify Text "Welcome to the Internet banking site"<br>00001-005 Enter User ID Jamaca1<br>00001-006 Enter Password zWK243#<br>00001-007 Press Login Button<br>00001-008 Verify Internet Banking Main Menu Page<br>00001-009 Verify Text "Internet Banking Main Menu"<br>00002-000 Select Hypertext Display Accounts<br>00003-000 Verify Checking Account Balance of $400.00<br>00004-000 Select Text Logout |

- All Fields Default to the Values Assigned in the Original, Called Test
- Any Field can be Overridden with a New Value, which is Saved with the Test
- When Inserting, Deleting or Moving a Number Above a Called Test,
  - The Prefix Number is Renumbered to Maintain Test Step Sequence, the Suffixes Keep their Values
- When Moving a Called Test, Only the Prefix Number is Changed, the Suffixes Keep their Values
- For Tests that are Being Called,
  - The Calling Test ID & Name is Saved(See Header Tables)
  - The Test Header Cannot be Deleted or its Name Changed
  - Test Steps Cannot Be Deleted, Added to, or Moved
  - Only Data Values can be Changed
    - When Data Values are Changed, No Existing Calling Tests Inherit the New Values
  - The Following Header Fields are Disabled, Retaing their Original Values
    - Prefix
    - Test Name
    - Application
- The Status Field can be Changed from "Production"
  - No Calling Tests are Affected
  - The Test will not Show Up in "Call Test" Pulldowns Until the Status "Production" is Restored
- Save Button
  - The Save for Test Steps is Enabled, Unless an Active Replace Filter has Targeted Any Step in
- Cancel Button
  - Closes the Test Step Screen and Restored the Header Screen

FIG. 17J
(Continued)

Test Definition Header

Test ID  Prefix  Banking  ###  Banking00002  Callable ▫
Test Name  Login User  Status  Production  | Called By |

↓ Test Header

Test Steps  ⊕  ⊖  ∧  ∨  >

00001 Launch IE Browser
00002 Navigate to URL  https://www.internetbankingsite.com
00003 Verify *Internet Banking Login page*
00004 Verify *Text* "Welcome to the Internet banking site"
00005 Enter User ID Kathrynk
00006 Enter Password ky6!23jL
00007 Press Login button
00008 Verify Internet Banking Main Menu page
00009 Verify *Text* "Internet Banking Main Menu"

(For actively called tests, only test data entries can be

*(For actively called tests, only test data entries can be changed)*

| Save | Cancel |

---

Test Definition Header

Test ID  Prefix  *Banking*  ###  *Banking00002*  Callable ▫
Test Name  Login User  Status:  *Production*  | Called By |

This test called by:

Bankin00043 Verify Account Balance
Banking00052 Modify Customer Profile
Banking00058 Transfer Funds Disabled when viewing calling tests

| Close |

FIG. 17K

Test Definition Header

| Test ID Prefix | Banking | <Number> | <Full Test ID (prefix+Number)> | Callable ☐ |
|---|---|---|---|---|
| Test Name | Login User | Status | Production | Called By |
| Application | Internet Banking | | | 5 Tests |

| Test Objective | <Up to 500 Characters> |
|---|---|
| Description | <Up to 1000 Characters> |

---

Tier 2 Escalation.. .. .. .. .. .. .. .. .. .. .. .. .. .. .. .. .. .. .. .. .. .. .. .. .. ..

| Escalate | |
|---|---|
| <Date-Time Stamp> | <Up to 500 Characters> |

Days since escalati <# Days since submission>

[Save] [Delete] [Cancel]

*(Actively Called Tests Can't be Deleted)*

FIG. 17K
(Continued)

Generated Test Script Displays

Generated Test Script

| Narrative | Executable | Close |

Internet Banking-Banking00043 Verify Account Balance

00001 Call Test Banking0002 Login User
    Launch IE browser
    Navigate to URL https://www.internetbankingsite.com
    Verify Internet banking Login page
    Verify Text "Welcome to the Internet banking site"
    Enter User ID Jamaca1
    Enter Password zWK243#
    Press Login button
    Verify Internet Banking Main Menu page
    Verify Text "Internet Banking Main Menu"
00002 Select Hypertext Display Accounts
00003 Verify Checking Account Balance of $400.00
00004 Select Text Logout

Generated Test Script

| Narrative | Executable | Close |

Internet Banking-Banking00043 Verify Account Balance

'Step00001-000 Call Test Banking0002 Log *(Narrative lines are preceeded by remark symbol for engine code.*
'Step00001-001 Launch IE Browser
    *Engine Code for Launch IE Browser*
    *Engine Code for Launch IE Browser*
    *Engine Code for Launch IE Browser*
    *Engine Code for Launch IE Browser*
'Step 00001-002 Navigate to URL https://www.Internetbankingsite.com
    *Engine Code to navigate to URL*
    *Engine Code to navigate to URL*
    *Engine Code to navigate to URL*
'Step 00001-003 Verify Internet Banking Login page
    *Engine Code to verify login page*
    *Engine Code to verify login page*
    *Engine Code to verify login page*

Rules for Display of Generated Test Scripts

FIG. 17L

| Function Pulldown |
|---|

| Function Pulldown |
|---|
| ƒ Call Test |
| ƒ Close Browser |
| ƒ Launch Chrome Browser |
| ƒ Launch IE Browser |
| ƒ Log System Time |
| ƒ Wait |
| [...All Defined Functions] |

*[Dynamic]*

*[Native Function]*

FIG. 17M

Tables (Header)

| Test Definition Header(Table) |
|---|
| Test ID(*) |
| Test Prefix |
| Test Number |
| Callable (Boolean) |
| Calling Test Count (Int) |
| Test Name |
| Application |
| Status |
| Test Objective |
| Description |
| Test Type |
| Author ID |
| Author Name |
| Requirement |
| Requirement Risk |
| Notes |
| Last Generated |
| Last Run |
| Last Outcome |
| Last Outcome DTS |
| Reviewer ID |
| Reviewer Name |
| Submitted for Review DTS |
| Review Status |
| Approve (Boolean) |
| Reject (Boolean) |
| Review Status DTS |
| Reviewer Feedback |
| Escalation Request |
| Escalation DTS |

| Test Definition Header Tags |
|---|
| Test ID (*) |
| Tag (*) |

| Test Definition Header Suite |
|---|
| Test ID (*) |
| Suite NameTag (*) |

| Test Definition Header-Calling |
|---|
| Test ID(*) |
| Called Test Prefix |
| Called Test Number |
| Called Test ID |
| Called Test Name |

*(Field Exposed and Editable on Approve Screen)*
*(Field Exposed and Editable on Approve Screen)*

FIG. 17M
(Continued)

Tables Test Steps

Examples

| Test ID | Test Step Number | Function Name Key | Object Instance Key | OM Narrative Key | Test Step Narrative |
|---|---|---|---|---|---|
| Banking00054 | 1 | <Blank> | App Name+Obj Name | Obj Type+Method ID | For Table//Obj_Inst_Name//, Search Column//ColA_Nbr// for//Search_Data// and Get the Row Number. In Column Number//ColB_Nbr//of that Row, Enter |
| Banking00083 | 5 | Function Name ID | <Blank> | <Blank> | Wait/Number/Seconds. |

FIG. 17N

Example from Above
<--Key----------------------------->

| Test ID | Test Step Number | Token | Data |
|---|---|---|---|
| Banking00054 | 1 | ColA_Nbr | 3 |
| Banking00054 | 1 | Search_Data | Mary Smith |
| Banking00054 | 1 | ColB_Nbr | 4 |
| Banking00054 | 1 | Data | 3142 Allen Ave |

Example
<--Key----------------------->

| Test ID | Test Step Number | Token Name | Data |
|---|---|---|---|
| Banking00083 | 5 | Number | 5 |

Test Definition Test Steps
Test ID (*)
Test Step Number (*)
Function Name (Partial Key)
Function Name ID (key)
{Language - not included}
Object Instance (Partial Key)
Application Name (key)
Object Name ID (key)
{Engine Name (key) - not included}
OM Narrative Definition (Partial Key)
Object Type (key)
Method ID (key)
{Language - not included}
Test Step Narrative

Test Definition Test Steps-Token Values
Test ID (*)
Test Step Number (*)
Token Name (*)
Data

FIG. 17N (Continued)

| Test Header | |
|---|---|
| Test ID: | TestPrefix + Test Number (Generated) |
| Test Title: | 50 Char (ALM Allows 255 Characters for Test Name) |
| Callable (Y/N): | Y |
| Test Status: | New, In Progress, Tier 1 Res, Tier 2 Res, Tested Ok, Production |
| Test Issue: | (for Tier 2 Res Only) |
| Last Generated | Configured Date-Time Stamp (Options) |
| Last Run: | Configured Date-Time Stamp (Options) |
| Last Outcome: | Pass/Fail/Incomplete |
| Test Objective: | 500 Characters |
| Description | 1000 Characters |
| Requirement ID: | 50 Char (ALM?) |
| Requirement Description: | 500 Characters |
| Requirement Risk Level: | (5-Highest to 0-No Risk) |
| Author ID: | |
| Test Type: | System, UAT, Smoke, SIT, Regression (at Least One) |
| Application: | |
| Suite Tags: | |

FIG. 17O

| | |
|---|---|
| Tags: | Inherits Test Prefix Tags, Duplicate Tags not Allowed |
| Notes: | |
| Submit for Review (Y/N) | |
| Reveiw Status: | N/A, Draft, Submitted, Approved, Rejected |
| Review Rejection Comment: | 500 Characters |
| Reviewer/Approver ID: | |
| Review Date/Time: | Configured Date-Time Stamp (Options) |
| Input Summary (Pop-up) | (See Below) |
| Test Step | |
| Test Step ID | Test Case Prefix-Test Number-step 0000# |
| Test Step Type | Blank (Executable), O=Orphan, R=Remark/Comment |
| Test Step Body | Text or Object Instance::Method Instance with Test Data or Test Case(with Input Data)to Perform |
| | |
| | |
| Input Summary (Pop-up) | This is an Aggregation of All Test Steps Needing Data Inputs(Verification Steps not Considered) |
| | For Example |

FIG. 17O (Continued)

| | |
|---|---|
| | Lookup: |
| | AppModeA-Test 00001 Login User (Acct Summary) |
| | AppModeA-Test 00002 Sign Out User |
| | AppModeA-Test 00003 Reset Password |
| | AppModeA-Test 00004 Show User Profile |
| | AppModeA-Test 00005 Add User Access |
| | |
| | The User Clicks on the Test Case they Want to Execute and the Next Step is Displayed: |
| | |
| | Step 00002-Function, Execute Test AppModA-Test 00001 Login User (Acct Summary) |
| | Step 00001-ID- |
| | Step 00002-Password- |
| | |
| | This is Displayed in the Test Step of a Calling Operation to Execute a Test Case as a Test Step. |
| | |

FIG. 17O
(Continued)

| Test Title | | | | | | | | | | | | | | | | | |
|---|---|---|---|---|---|---|---|---|---|---|---|---|---|---|---|---|---|
| Callable (Y/N) | | | | | | | | | | | | | | | | | |
| Test Status (New, In Progress, Tire 1 Res, Tire 2 Res, Tested OK, Production) | | | | | | | | | | | | | | | | | |
| Test Issue | | | | | | | | | | | | | | | | | |
| Last Generated (Date/Time) | | | | | | | | | | | | | | | | | |
| Last Run Date- Time* | | | | | | | | | | | | | | | | | |
| Last Outcome (Pass/Fail/Incomplete)* | | | | | | | | | | | | | | | | | |
| Test Objective | | | | | | | | | | | | | | | | | |
| Description | | | | | | | | | | | | | | | | | |
| Requirement ID | | | | | | | | | | | | | | | | | |
| Requirement Description | | | | | | | | | | | | | | | | | |
| Requirement Risk Level | | | | | | | | | | | | | | | | | |
| Author ID | | | | | | | | | | | | | | | | | |
| Test Type (System, UAT, Smoke, SIT, Regression - at Least One) | | | | | | | | | | | | | | | | | |
| Application | | | | | | | | | | | | | | | | | |
| Suite Tags | | | | | | | | | | | | | | | | | |
| Tags | | | | | | | | | | | | | | | | | |
| Notes | | | | | | | | | | | | | | | | | |
| Submit for Review (Y/N) | | | | | | | | | | | | | | | | | |
| Review Status (N/A, Draft, Submitted, Approved, Rejected) | | | | | | | | | | | | | | | | | |

FIG. 17P

| | | | | | | | |
|---|---|---|---|---|---|---|---|
| Review Comment | | | | | | | |
| Review/Approver ID | | | | | | | |
| Review Date/Time | | | | | | | |
| | | | | | | | |
| Test Step IDs (with Test ID Prefix - Test Number - Step Number) | | | | | | | |
| Test Step Type (Blank (Executable), O=Orphan, R=Remark/Comment Specific, Named Object Instances Pulled from the Object Navigation Tree (e.g Screen Identification, Gender Pull-Down, Address Field, First Name Field, Service Option Radio Button) | | | | | | | |
| The Method to Act Upon the Object (e.g. Enter [Data], Verify [Data], Check [Checkbox], Select [Radio Button or Pull-Down Value]) | | | | | | | |
| Input Data for Test Execution (e.g. Data to be Entered in to a Field, Data Value to be Verified, which Checkbox to Check) | | | | | | | |
| What Subtest to Invoke | | | | | | | |
| What Data to Pass to the Sub-Test (if Method is to Execute ReusableTest) | | | | | | | |

FIG. 17P
(Continued)

Test Suite pop-up screen

Required Fields

Test Suite Definition

Test Suite Menu — <Up to 100 Characters>

Test Suite Description — Test Suite Description(500 Characters)

[+] [-]

☐ Check All

- ☐ Test ABC0000 <Test Name....................................................>
- ☐ Test ABC0000 <Test Name....................................................>
- ☐ Test ABC0000 <Test Name....................................................>
- ☐ Test ABC0002 <Test Name....................................................>
- ☐ Test ABC0004 <Test Name....................................................>
- ☐ Test ABC0003 <Test Name....................................................>

Review............................................................................

[Submit]  Submitted ID   Submitted for Review  Date-Time Stamp  Review Status <Review Status>
Reviewer ID [<Pulldown-One>] <Reviewer Name... Days Since Submission <# Days> Date<Date-Time Stamp>
Reviewer Feedback [Reviewer Feedback]

[Save] [Delete] [Cancel] [Print]  Suite Last Executed  Date-Time Stamp>

FIG. 18A
(Continued)

| Rules |
|---|
| Suites can be Expanded and Collapsed (-/-) |
| Expanding a Suite will Display all Test Records Assigned to the Suite |
| Collapsing a Suite will Hide All Assigned Test Records for that Suite |
| Add/Edit Test Suite Screen → User Double clicks on Suit to Edit. Test Suite Pop-up Screen Launched for Selected Suite |
| Save Command |
|     Save Button is Disable if Required Fields are Blank |
|     Save Saves the Suite with the Revised Test Record List, and then Closes the Pop-up Screen |
|     If the Suite Name is a Duplicate of a Previously Saved Suite. Name is Appended with |
|     If Incremental Count Takes Suits Names Length Over 100 Characters, the Name is Truncated to |
|     Test Suite Names Tagged |
|     When a Suite is Saved, the Test Definition Screen Field "Suites" is Appended with a Tag of the |
| Delete Command |
|     Deletes the Test Suite Name Record |
|     Removes the Test Suite Name Tag from all Test Definition Records (Field "Suite") |
| Input Is Limited to 500 Characters for the Test Suite Description |
| Input is Limited to 100 Characters for the Test Suite Name |
| + Button Launches the Select Tests Pop-up Screen |
| - Button Deletes the Selected Test (s) |
| Check all & Checkbox Operation |
| Reviews Section |
|     Submit Button |
|         Generates an Email to the Reviewer in the Reviewer in the Reviewer ID Requesting they Review (and Approv |
|         Saves the Date-Time-Stamp of the Email Request Generation ("Submitted for Review" Field |
|         Changes the Review Status Field to "Submitted" |
|         Is DISABLED if the Review ID is Blank or the Review Status is "Approved" |
|     Reviewer ID is a Pulldown Field where One and Only One Record is Seleced-defaults to BLAN |
|         Reviewer ID Pulldown Filters to Include Only those Users Authorized to Review Test Suite |

FIG. 18B

| | | |
|---|---|---|
| | | Reviewer Name is Displayed Above Reviewer ID and is Changed When the ID is Changed |
| | | Days Since Submission is a Calculated Field Calculated when the Record is Opened. NOT S… |
| | | Review Status Displays the Review Status of this Test (Defaults to "N/A" for New Records) |
| | | Date Displays the Date-time Stamp for the Review Status Displayed (for First Status, Date-time… |
| | | Reviewer Feedback Field is Always Disabled and will Display the Reviewers Feedback (up to 50… |
| Add | | Check All Checkbox, when Checked, Selects all Tests in List and x's in all Test Checkboxes |
| | | Check All Checkbox, when Un-checked, Deselects all Tests in List and all Blanks all Test… |
| | User Clicks on Any Suite or Test Record and Selects Ribbon "Suite (+)" or "Test(+)" | |
| Delete | If "Suite (+)" is chosen, the Test Suite Pop-up Screen is Launched | |
| | If "Test (+)" is Chosen, the Select Test(s) Pop-up Screen is Launched | |
| | If "Delete (-)" is Chosen on the Ribbon, the Entity Selected Will be Deleted | |
| Copy | If Suite Name is Selected Delete (-) is Executed, the Suite Will be Deleted After Confirmatiom | |
| | Deleting a Suite Deletes the Suite's List of Tests and all Suite Data | |
| Paste | The Copy Command is Enabled only when a Test Suite Name or a Test or Range of Tests are Sele… | |
| | When the Copy Command is Executed, the Selected Items are Copied onto a screen Specific Cli… | |
| | The Paste Command is Disabled When the Clipboard is Empty | |
| | If a Range of Tests were Copied, the Paste Command is Enabled Only When a test Suite is Selecte… | |
| | When the Paste Command is Executed for Copied Tests | |
| | | The Tests from the Clipboard are Copied into the Test Suite Selected |
| | | Where a Test Already Exists, the Paste of that Test into the Targeted Suite is Skipped |
| | When the Paste Command is Executed for a test suite | |
| | | The Test Suite is Duplicated in its Entirety |
| | | The New Test Suite Name is Appended with Incremental Count "_##" |
| | | If Incremental Count Takes Suite Name Length Over 100 Characters, the Name is Truncated to… |

FIG. 18B
(Continued)

| | |
|---|---|
| Mouse Menu | Copy Follows the Copy Rules Above |
| | Add Suite Launches a Fresh Test Suite Pop-up Screen |
| | Edit Suite is Only Enabled when a Suite was Selected before Launching the Mouse Menu |
| |     Edit Suite Launches the Test Suite Op-up Screen with Associated Suite Data |
| | Delete Follows the Delete Rules Above |
| Filter | Paste Follows the Paste Rules Above |
| | Paste is Disabled if no Object has been Copied to the Clipboard |
| Search Use Commands | Search Filter Operates as a Pop-up, and Follows The Rules Listed in Maintenance> Search |
| | Here the "Tests Only" Option Defaults to "Checked" (X) and is Disabled |
| | Check All and Checkbox Operation for Search Filter Results Follows the Rules Above |
| | "Add"Command |
| |     The "Add" Button is Disabled if no Tests are Selected from the List |
| |     "Add" adds the Selected Test to the Suite. If any Selected Tests are duplicate, they are not |
| |     When the Add Operation is Complete, the Select Tests Pop-up Screen is Closed |
| | "Cancel" Command Closes the Select Tests Pop-up Screen and Changes Nothing |

FIG. 18B
(Continued)

| Operation | Action |
|---|---|
| Select Menu Item | Navigates to menu screen and makes relevant operations available |
| Double Click on Record | For Suite Names only, launches Test Suite pop-up |
| Right-Mouse-Button | For Suite Names and Test Records |

| Suite Design Ribbon | | |
|---|---|---|
| Suite[+] Test[+] Delete[-] | Copy Paste | |
| Add/Delete | Copy/Paste | |

| Test Prefix | | |
|---|---|---|
| Test Prefix | <up to 10 Characters> | |
| Application Name | <Select One> | |
| Prefix Description | <Up to 100 Characters> | ∧ ∨ |
| Test Number Counter | 00032 | |
| Save   Delete   Cancel | | |

| Operation | Action |
|---|---|
| Select Menu Item | Navigates to Menu Screen and Makes Relevant Operations Available |
| Double Click on Record | Launches the test suite pop-up screen |
| Right-Mouse-Button | When Record is Selected |

| Test Prefix Design Ribbon | |
|---|---|
| Add(+) Delete(-) | Copy Paste |
| Add/Delete | Copy/Paste |

FIG. 19
(Continued)

| Rules | | |
|---|---|---|
| Add/Edit/Delete Test Prefix Screen | User Double Clicks on Prefix Record to Edit, Test Prefix Pop-up Screen Launched for Selected Record | |
| | Save Command | |
| | | The Save Button is Disabled if Required Fields are Blank |
| | | The Save Button Saves the Suite with the Revised Test Record List, and then Closes the Pop-up Screen |
| | | If the Prefix Name is a Duplicate of a Previously Saved Suite, Name is Appended with Incremental |
| | | If Incremental Count Takes Field Length > 10 Characters, the Name is Truncated to Acheive 10 Char |
| | Input is Limited to 10 Characters for the Test Prefix Name (Mandatory) | |
| | Application Name Field is a Pulldown Listing Predefined Applications (Mandatory) | |
| | Input is Limited to 100 Characters for the Test Prefix Description | |
| | Test Number Counter Field | |
| | | Not Editable |
| | | Shows the Number of the Last Test Created Under this Prefix |
| | Delete Command (In the Test Prefix Definition Screen) | |
| | | The Delete Button is Disabled on the Test Prefix Definition Screen if the Test Prefix is used in any Sin |
| | | Deletes the Test Prefix Record |
| | Delete(-) Ribbon Command or Mouse Menu | |
| | | And the Prefix Definition is in use |
| | | | The Test Definition Deletion Blocked Pop-up Screen is Launched |
| | | | "OK" Closes the Pop-up Screen |
| | | And the Prefix Definition is not in use |
| | | | The Test Prefix Definition Record is Deleted |
| Add | The Cancel Command Closes the Screen and Changes Nothing | |
| | User Clicks on any Record and Selects Ribbon "Add (+)" | |

FIG. 19
(Continued)

| | | |
|---|---|---|
| Delete | The Test Prefix Pop-up Screen is Launched | |
| | The "Delete(-)" Option is Disabled if the Prefix is in use by any Test | |
| Mouse Menu | Deletes the Prefix Record | |
| | Add Launches a Fresh Test Prefix Pop-up Screen | |
| | Edit Only Enabled when a Suite was Selected Before Launching the Mouse Menu | |
| | | Edit Launches the Test Prefix Op-up Screen with Associated Suite Data |
| | Delete Follows the Delete Rules Above | |

FIG. 19
(Continued)

Add/Edit Object pop-up

`Required Fields`

Object Instance Name

| | |
|---|---|
| Application | `<Select One>` |
| Object Type | `<Select One>` [Icon] |
| Object Name | `<Up to 50 characters>` |
| Engine | `<Pull-down Defaulted to Primary Engine>` |

Level  Page      ○   Level # 2
         Object    ○   Level # [ ]  (3-6)

Executable  [                    ⌃]
            [                     ]
            [                    ⌄]

[ Save ]  [ Delete ]  [ Cancel ]

Object Instance Name

| | |
|---|---|
| Application | `<Select One>` |
| Object Type | `<Select One>` [Icon] |
| Object Name | `<Up to 50 characters>` |
| Engine | `<Pull-down Defaulted to Primary Engine>` |

Level  Page      ○   Level # 2
         Object    ⊙   Level # [3]  (3-6)

Executable  [                    ⌃]
            [                     ]
            [                    ⌄]

[ Save ]  [ Delete ]  [ Cancel ]

FIG. 20B

Trace Object pop-up

Trace Object

<Object Type Description>     <Object Name/Tag>

| | | |
|---|---|---|
| Test ABC000( | Test Description | Test Step 002 |
| Test ABC000( | Test Description | Test Step 005 |
| Test ABC000( | Test Description | Test Step 013 |
| Test ABC0002 | Test Description | Test Step 003 |
| Test ABC0004 | Test Description | Test Step 008 |
| Test ABC0003 | Test Description | Test Step 004 |

[OK] [Print] [Export]

Tables

| Object Instance Table | The Keys are Used to Look up and Assemble Relevant Data on the Screen |
|---|---|
| Application Name (key) | |
| Object Name ID (*) | Object Name ID is a Generated Numeric Key that Doesn't Change to Support an Object Name that could Change |
| Engine Name (key) (*) | |
| Object Name | |
| Object Type Name (key) | |
| Outline Level (1....6) | |
| Executable | |

FIG. 20C

| Operation | Action |
|---|---|
| Select Menu Item | Navigates to Menu Screen and Makes Relevant Operations Available |
| Double Click Object | Launches Object Pop-up Screen |
| Trace Object | Launches Trace Object Pop-up Screen |
| Right-Mouse-Button | For All Objects - Pop-up Menu (See Below) |

Navigation Map Ribbon

Add(+)
Delete(-)

Add/Delete

FIG. 20D

| Rules |
|---|
| +/- Collapsing a Header will Hide All Child Listings |
| +/- Expanding a Header will Expand All Child Object Listings |
| "+/-" Options are Disabled where Lines have no Children |
| > Increasing Indent for a Line Will Move it One Unit to the Right and Make it a Child |
| < Decreasing Indent for a Line will Move it One Unit to the Left and Make it a Parent of Indented Lines Below it |
| "<>" Indentation Options are not Available for Application or Page Objects |
| Add |
|     Double Click Anywhere on the Screen not on a Record |
|     Invoke the Add(+) Command on the Ribbon |
|     Add from the Mouse Menu |
| Delete (Record Must be Selected) |
|     Hit the <DEL> key |
|     Invoke the Delete(-) Command on the Ribbon |
|     Delete From the Mouse Menu |
|     If the Object isn't in use-it's Deleted |
|     If the Object is in use Or has Child Records |
|         The Object Instance Deletion Blocked Pop-up is Launched |
|         "OK" Closes the Pop-up and Nothing is Deleted |
| Add/Edit/Delete Object screen |
|     User Clicks on Object to Edit |
|     User Clicks on Parent Object to Add Child Object (See Below) |
|         Applications Cannot be Added on this Screen- See Developer >Application Definition |
|         Screens Can be Added Only One Outline Level Below Application (2) |
|         Page Objects Can be Added at Outline Levels 3-6 |
|         Outline Level is Inherited From the Object Type Definition, With 3 as The Default for Page Objects |
|     One and Only One Object type May be Selected from the Pulldown |
|     Engine Defaults to Primary Execution Engine Name as Specified in Options |
|     One and Only One Engine can be Selected |
|     Input is Limited to 50 Characters for Name/tag |
|     Save Button on the Add/edit Object Pop-up Screen |

| | | |
|---|---|---|
| Ⓐ Ⓑ | | Ⓒ |
| Add/Edit/Delete Object Screen | The Save Button is Disabled if Required Fields are Blank or Incomplete (Pulldowns with "Select One") | |
| | For New Objects, One Instance for Each Named Engine is Added Using Object Type and Name/tag Values | |
| | If Object Name is a Duplicate of a Previously Saved Object, Name is Appended with Incremental Count _# | |
| | If Incremental Count Takes Object Name Length Over 50 Characters, the Name is Truncated to Achiere 50 Ch | |
| | The Application Name is Saved to The Application Name Tables as well (for Application Name Pull Downs) | |
| | For Display, all Objects (Application, Screen, Object) are Displayed with Icon to the Left of Name | |
| | Icons are Stored in the Object Repository with the Object Type Description | |
| | Icon is Displayed in the Pop-up and Changed when a New/different Object Type is Selected | |
| | Input is Limited to 500 Characters Under Executable for Each Engine Type | |
| | Application and Screen Objects May be Deleted Only when they Have no Child Objects | |
| | The Delete Command | |
| | | The Delete Command is Disabled if the Object has Child Objects or is Used in Any Single Test |
| | | Delete Deletes the Object Record |
| | | If the Application Object is Deleted, it is Deleted from the Application Name Table as well |
| | The Cancel Command Closes the Pop-up and Nothing is Changed or Added | |
| Trace Object Screen | Trace Object Operation-selection "Trace" with an Object Selected Lists Test Filtered by that Object | |
| | Trace Object Pop-up Screen: Test Steps Hyperlink to Actual Test Step on test Edit Screen | |
| | Trace Object Pop-up Screen: Hyperlink Selection Closes Pop-up, and Test Edit Screen is Served | |
| | If no Tests are Found (Filtered Listing is empty), the Message "No Tests Found" is Displayed | |
| | Upon Selection of "OK" Trace Object Pop-up Screen is Closed | |
| | Print Command Triggers Printing Operations and the Entire List is Printed | |
| | Export Command Triggers the Export Operation to Save list in a CSV Formatted Flat File | |
| Mouse Pop-up Menu | Copy: Copies Object Data onto the Screen Clipboard | |
| | Add: Launches Fresh Add/Edit Object Pop-up Screen (No Data) | |
| | Edit: Launches Add/Edit Pop-up Screen with Associated Default Data | |
| | The Delete Command Follows the Rules Above for "Delete Command" | |
| | Paste: Adds Clipboard Object to the End of the List at the Same Level, | |
| | | Appends Added Object Name with Incremental Count'_##" |
| | | Adds One Instance for each Named Engine Using Appended Name with Count |
| | Trace: Launches Trace Object Pop-up Screen for the Object Selected | |
| | Operates Only when an Object is Selected | |
| | Paste is Disabled if no Object has been Copied to the Clipboard | |

FIG. 20E (Continued)

Object-Method (OM) Definition pop-up screen

Required Fields

OM Narrative Definition

Object Typ: \<Select One and Only One\>
Method: \<Up to 50charachers\>
Language: Get One - Default is Primary Language Tokens [+]: (Object Instance)

Narrative: \<Combination of text & token tag(s)\>

[ Save ] [ Delete ] [ Cancel ]

Examples:

OM Narrative Definition

Object Typ: Data Entry
Method: Enter
Language: English

Tokens [+]: (Object Instance) (Data)

Narrative: Enter (Data) into the (Object Instance Name) field.

[ Save ] [ Delete ] [ Cancel ]  *Scriptlet Released on YYYYMMDD HH:MM*

Example of above Narrative in use in test step definition

For Table Address List, search column <u>3</u> for <u>Mary Smith</u> and get the row number.
In column number <u>4</u>
Of that row, enter <u>1342 Allen Ave</u>

FIG. 21B

Token pop-up screen

Token Name & Type

Token Name: (Up to 30Characters)
Type: (Select One)
Hidden: ☐ (Boolean)
Field Length: [    ]

[Save] [Cancel]

Token Type Pulldown
- Character String
- Integer
- Float
- Boolean

<u>Java Var Type</u>
- Char (up to 5000 characters)
- Int (4 bytes)
- Double Float (8 bytes)
- Boolean (T/F, 1 Byte)

Tables

OM Narrative Definition Table

- Object Type (key)(*)
- Method ID (*)
- Language (key) (*)
- Method Name
- Tokens
- Narrative Note, likely there needs to be a transform for token words in the DB to create screen objects Method ID is a generated numeric key that doesn't change to support a Method Name that could change

FIG. 21C

| Operation | Action |
|---|---|
| Select Menu Item | Navigates to Menu Screen and Makes Relevant Operations Available |
| Double Click on Record | Launches the Test Suite Pop-up Screen |
| Right-Mouse-Button | When Record is Selected |

Test Prefix Design Ribbon

Add(+)
Edit
Delete(-)

Add/Delete

FIG. 21D

| Rules | | |
|---|---|---|
| Object Method Screen | Double Click on the OM Narrative Definition to Edit and the Definition Screen is Launched | |
| | Access Actions by Launching the Right-mouse Click Menu Anywhere on the Screen | |
| | Object Type Filter | |
| | | Select at least one Pull-down Item to Define what Gets Filtered |
| | | The methods for Selected Object Types are Listed |
| | ∧∨ | Choosing the Up or Down Arrow Allows the User to Sort by the Column High>Low or Vice Versa |
| | Object Types are Listed Alphabetically | |
| Add | Click on Ribbon "Add (+)" | |
| | A Fresh OM Narrative Definition Screen is Launched | |
| Delete | Delete on the Ribbon is Enabled when a Record is Selected | |
| | Delete on the Definition Screen is Enabled only when the Default Language Record is Dispayed | |
| | Deletes the Following Associated Data: | |
| | | All Language Instances of the OM Definition |
| | | All Tool Scriptlets of the OM Definition |
| | Records in use Cannot be Deleted | |
| | | The OM Definition Deletion Blocked Popup is Launched, if any Related Narrative or Scriptlet Record is in us |
| | | Delete Error Pop-up Screen Announces the Record can't be Deleted Because it's in use |
| | | "OK" Clears the Pop-up Screen |
| Mouse Menu | Add Launches a fresh OM Narrative Definition Screen | |
| | Edit Only Enabled when a Record was Selected Before Launching the Mouse Menu | |
| | | Edit Launches the OM Narrative Definition screen with Associated Data |
| | Delete Follows the Delete Rules Above | |
| | Object Type Field Allows One and Only One Object Type to be Selected | |
| | | The Object Type Icon is Displayed to the Right of the Field for the Selected Object Type |
| | Method Fields Allows up to 50 Characters | |
| | Language | |
| | | Defaults to Language set as Default Language in Options |
| | | Allows One and Only One Language to be Selected |
| | If Object Type, Method and Language Entered on Fresh Screen Matches Exiting Record, that Record is Display | |
| | Tokens Field | |
| | | Tokens are Variables<br>There are Two Types of Tokens: |
| | | 1. Object Instance Token (Identifies the Object being Acted Upon) |
| | | 2. Variable Tokens- to Capture and Store Data |

| | |
|---|---|
| OM Narrative Definition Screen | For Variable Tokens |
| |     The First Instance of the Token Captures a Value, All Subsequent Instances Make the Value Availabl |
| |     Variable Tokens are Displayed in the "token" Section with no "x" Option to Delete |
| |     Variable Tokens are Displayed in the Narrative Field With an "x" Option to Delete |
| |     (see 2nd Example to the Left) |
| |     When a Variable Token is Used Once, It Captures the Value Entered In the Test Definition |
| |     The Executable Code (Scriptlet) Determines the Use of the Variable. |
| | They are Defined in the Token Pop-up Screen |
| | Hosts Tokens That May Be Used in Narrative Field |
| | Uses Tag Convention & Formatting (Conventions Tab of this Workbook) |
| | Non-mandatory Tokens have an "x" that (when Clicked On) Allows them to be Deleted |
| | When a Token is Deleted in the Token Field, All Instances of the Token in Narrative are also Deleted |
| | + Button Launches the Token Pop-up Screen |
| | Tokens are Copied to the Narrative Field by Dragging them Down - Dragging Does not Delete them from |
| | There May be Multiple Instances of a Token in the Narrative Field (Except Fort the Object Instance tok |
| | There May be Only One Instance of the Object Instance Token in the Narrative Field |
| | Tokens are Colored in Accordance with the Colors of the Token Type Pulldown Table (below) |
| | Scriptlet Released Status Field |
| |     Scriptlet Record Boolean Value (F) Causes "scriptlet Released" to be Displayed Followed by The Date T |
| |     Scriptlet Record Boolean Value (F) Causes "scriptlet not Released" to be Displayed |
| |     "Save" Button Closes the Screen and Saves the Changes for the Om Narrative Definition |
| |     "Cancel" Button Closes the Screen and Does Nothing Else. |
| |     "Delete" Button Follows the Deletion Rules Above |
| Token Name & Type Screen | Token Name Field Allows Up to 30 Characters |
| | Token Type Field is a Pulldown Field. Requires Selection of One and Only One Value (See Pulldown List be |
| | Hidden (boolean) is True When the Token is to be Hidden (used as a Script Variable) |
| |     Hiddent Tokens are Outlined with a Dashed Line |
| | Field Length Defines the Max Length of Input for Character Fields, Disabled,when Non-charactor Field Typ |
| |     Field Lengths >5000 are not Allowed. |
| | If the Token Name Already Exists, The Data for That Token is Loaded/displayed |
| | "Save" Closes the Screen and Saves the Token Data to the Token Field |
| | Cancel Closes the Screen and Does Nothing Else. |

FIG. 21E
(Continued)

Function Narrative Definition

*Required Fields*

Function Narrative Definition

| | |
|---|---|
| Function Name | <Up to 50charachers> |
| Language | <Select One> |

Tokens [+]  *(Tag Formet)*

Narrative

[ Save ] [ Delete ] [ Cancel ]

Examples
Preconfigured (OOB) Function (Call Test)

Function Narrative Definition

| | | |
|---|---|---|
| Function Name | Call Test | Note disabled fieled & buttons for "call Test" |
| Language | English | |

Tokens [+]

Narrative: Call Test

[ Save ] [ Delete ] [ Cancel ]

User Configured example

Function Narrative Definition

| | |
|---|---|
| Function Name | Wait |
| Language | English |

Tokens [+] (Number x)

Narrative: Wait (Number x) Seconds

[ Save ] [ Delete ] [ Cancel ]

FIG. 22B

Token pop-up screen

| Token Name & Type | | |
|---|---|---|
| Token Name | (Up to 50 Charectors) | |
| Type | (Select One) | |
| Hidden | ☐ (Boolean) | |
| Field Length | ☐ | |

Save  Cancel

| Token Type Pulldown | Java Var Type |
|---|---|
| Character String | Char (up to 5000 characters) |
| Integer | Int (4 bytes) |
| Float | Double Float (8 bytes) |
| Boolean | Boolean (T/F, 1 Byte) |

Tables

| Function Narrative Definition Table |
|---|
| Function Name ID(*) |
| Language (key) (*) |
| Function Name |
| Tokens |
| Narrative |

Note, Likely there Needs to be a Transform for Token Words in the DB to Create Screen Objects Function name ID is a Generated Numeric Key that Doesn't Change to Support a Function Name that could change

FIG. 22C

| Operation | Action |
|---|---|
| Select Menu Item | Navigates to Menu Screen and Makes Relevant Operations Available |
| Double Click on Record | Launches the Test Suite Pop-up Screen |
| Right-Mouse-Button | When Record is Selected |

Test Prefix Design Ribbon

Add(+)
Edit
Delete(-)

Add/Delete

FIG. 22D

| Rules | | |
|---|---|---|
| Double Click on the Function/Language Record to Launch the Definition Screen With Associated | | |
| Functions are Listed Alphabetically | | |
| Add | | |
| | Click on Ribbon "Add(+)" | |
| | A Fresh Function Narrative Definition Screen is Launched | |
| Delete | | |
| | Click on Ribbon "Delete (-)" or Press the Delete Key on Selected Record | |
| | Deletes the Following Associated Data: | |
| | | All Language Instances of the Function |
| | | All Tool Scriptlets of the Function |
| | Records in Use Cannot be Deleted | |
| | | The Function Deletion Blocked Popup is Launched if any Instances of Related Records are |
| | | Delete Error Pop-up Screen Announces the Record Can't be Deleted Because it's in Use |
| | | "Ok" Clears the Pop-up Screen |
| | ∧∨ Choosing the up or Down Arrow Allows the user to Sort by the Column High >Low or Vice Ver | |
| Language Filter | | |
| | Allows Filtering of Function Narrative Records by Language | |
| Add Launches a Fresh Function Narrative Definition Screen | | |
| Edit Only Enabled when a Record was Selected Before Launching the Mouse Menu | | |
| Edit Launches the Function Narrative Definition Screen With Associated Date | | |
| Delete Follows the Delete Rules Above | | |
| Function Name Allows up to 50 Characters | | |
| Language | | |
| | Defaults to Language Set as Default Language in Options | |
| | Allows One and Only One Language to be Selected | |
| Tool is Selected from Pulldown with Tool Names | | |
| Tokens Field | | |
| | Tokens are Variables | |
| | There are Two Types of Tokens: | |

(Left vertical labels: "Function List Screen", "Main menu")

| Function Narrative Definition Screen | |
|---|---|
| | 1. Object Instance Token (identifies the Object Being Acted upon) |
| | 2. Variable Tokens to Capture and Store Data |
| | Only Variable Tokens are Used for Function Narrative Definitions |
| | For Vairable Tokens |
| | The First Instance of the Token Captures a Value, all Subsequent Instances Make the Valu |
| | Variable Tokens are Displayed in the "Token" Section with no "X" Option to Delete |
| | Variable Tokens are Displayed in the Narrative Field with an "X" Option to Delete |
| | (See 2nd Example to the Left) |
| | When a Variable Token is Used Once, it Captures the Value Entered in the Test Definition |
| | The Executable Code (Scriptlet) Determines the Use of the Variable. |
| | They are Defined in the Token Pop-up Screen |
| | Hosts Tokens that May Used in Narrative Field |
| | Uses Tag Convention & Formatting (Conventions Tab of this Workbook) |
| | Non-Mandatory Tokens have an "X" that (when Clicked on) Allows them to be Deleted |
| | When a Token is Deleted in the Token Field, all Instances of the Token in Narrative are also De |
| | • Button Launches the Token Pop-up Screen |
| | Tokens are Copied to the Narrative Field by Dragging them Down Dragging Dose not Delete |
| | There May be Multiple Instances of a Token in the Narrative Field (Except for the Object Insta |
| | There May be Only One Instance of the Object Instance Token in the Narrative Field |
| | Tokens are Colored in Accordance with the Colors of the Token Type Pulldown Table (Below |
| "Save" Button Closes the Screen and Saves the Changes for the Function Narrative Definition | |
| "Cancel" Button Closes the Screen and Does Nothing Else | |
| "Delete" Button Follows the Deletion Rules Above | |

(A)　　　　　　　　　　　　　　　　　　　　　　　　　　　　　(B)

| Tiken Name & Type Screen | |
|---|---|
| | Token Name Field Allows up to 30 Characters |
| | Token Type Field is a Pulldown Field. Requires Selection of One and Only One Value (See Pulldow |
| | Hidden (Boolean) is True when the Token is to be Hidden (used as a Script Variable) |
| | Hiddent Tokens are Oulined with a Dashed Line |
| | Field Length Defines the Max Length of Input for Character Fields, Disabled, When non-charact |
| | Field Lengths > 5000 are Not Allowed |
| | If the Token Name Already Exists, the Data for that Token is Loaded/displayed |
| | "Save" Closes the Screen and Saves the Token Data to the Token Field |
| | Cancel Closes the Screen and Does Nothing Else |

FIG. 22E
(Continued)

| | I-Frame <Project Name> | – ☐ x |
|---|---|---|

Project   Reports   Design   Approve   Maintenance   Developer

| Select | <Import Filename> | | | Adopt |
|---|---|---|---|---|
| Test ID | Application | Test Name | Ready to Adopt | |
| Test ABC00001 | <Application Name> | Test Name............................ | ✓ | |
| Test ABC00002 | <Application Name> | Test Name............................ | ✓ | |
| Test ABC00003 | <Application Name> | Test Name............................ | ✓ | |
| Test ABC00004 | <Application Name> | Test Name............................ | | |
| Test ABC00005 | <Application Name> | Test Name............................ | | |
| Test ABC00006 | <Application Name> | Test Name............................ | | |
| Test ABC00007 | <Application Name> | Test Name............................ | | |
| Test ABC00008 | <Application Name> | Test Name............................ | ✓ | |
| Test ABC00009 | <Application Name> | Test Name............................ | | |
| Test ABC00010 | <Application Name> | Test Name............................ | | |
| Test ABC00011 | <Application Name> | Test Name............................ | | |
| Test ABC00012 | <Application Name> | Test Name............................ | ✓ | |

Select Import File Pop-up

| Select Import | |
|---|---|
| Import Filename | <Select One> |
| | OK    Cancel |

Test Deletion Confirmation Pop-up

| Confirm Staged Test Deletion |
|---|
| To confirm deletion of the staged test, press "OK" below |
| OK    Cancel |

| Operation | Action |
|---|---|
| Select Menu Item | Navigates to Menu Screen and Makes Relevant Operations Available |
| Double Click on Record | Launches Test Definition and Adoption Screen for the Record Selected |

FIG. 23A

| Navigation Map Ribbon | | |
|---|---|---|
| Rules | | |
| | Select Button | |
| | | Launches Select Import File Pop-up Screen to get Staged Filename Test Collection |
| | | Once Selected, All Tests Included in the Import File are Listed as Shown |
| | | Display to Right of Select Button Names the Selected Import Filename |
| | | Clicking on a Test Record Launches the Test Definition Header Screen for the Related Test Definition |
| Test Adoption Staging List Screen | Adopt Button | |
| | | Disabled Until the "Ready to Adopt" Field is true for All Tests |
| | | When Pushed |
| | | | Captures the Date-Time Stamp for the Button Push and uses that Value to Post "Adoption Complete" |
| | | | Copies All Test Data Into the Test Definition Tables |
| | Tests Are Listed with the Following Fields Displayed | |
| | Test ID (Prefix + Test Number) | |
| | Application Name | |
| | Test Name | |
| Delete | Test Deletion is Allowed After Confirmation | |
| | The Test Detection Confirmation Pop-up is Launched | |
| | "OK" Closes the Pop-up and Deletes All Related Test Definition Data, Including Test Steps | |
| | "Cancel" Closes the Pop-up and does Nothing Else | |
| Select Import Screen | Import Filename Pulldown | |
| | Pulldown Filters out All Records with Filled in Adoption Complete Dates | |
| | OK | |
| | | Selects the Import Filename and Filters for the Tests in that File |
| | | Closes the Select Import Pop-up Screen |
| | Cancel Closes the Select Import Pop-up Screen and does Nothing Else | |

FIG. 23A
(Continued)

| Test Definition Screen (Header) |
|---|

Required Fields

Adoption Staging Test Definition Header

| | | | |
|---|---|---|---|
| Test ID Prefix | <Pull Down-One> <Number> | <Full Test ID (Prefix+Number)> | |
| Test Name | <Up to 50 Characters> | Status: New | |
| Application | <Pull Down-One> | | |

| | |
|---|---|
| Test Object | <Up to 500 Characters> |
| Description | <Up to 1000 Characters> |
| Test Type | <Pull Down-One>   Requirement   <Up to 50 Characters> |
| Author ID | <Pull Down-One>   <....Author Name.........>   Requirement Risk   <Pull Down-One> |
| Tags | <Tag Format> |
| Notes | <Up to 1000 Characters> |

Ready to Adopt ☐     [Save] [Delete] [Cancel]

| Test Steps |
|---|
| Test Step screens and rules are defined under "Design> Test Definitions (Home)" |

| Test Definition Header Pulldowns |
|---|

| Test Prefix Pulldown | Application Pulldown | |
|---|---|---|
| (....All Defined Test Prefixes) | (....All Defined Application from Application Name Table) | |
| (Dynamic) | (Dynamic) | |

| Test Type Pulldown | Test Author Pulldown | Requirement Risk Pulldown |
|---|---|---|
| | Defaults to Current Use | |
| System | (....All Defined User IDs) | 3-High |
| UAT | | 2-Moderate |
| Smoke | (Dynamic) | 1-Low |
| SIT | | 0-None |
| Regression | | (From Options) |
| (Dynamic) | | |

FIG. 23B

| Rules For Staged Test Header Screen | | |
|---|---|---|
| Staged Test Header Screen | Test ID | |
| | | Prefix |
| | | Prefix is Mandatory and One and Only One Prefix Value may be Selected |
| | | Test Prefix is Automatically Added as a Tag in the "Tags" Field |
| | | Test Number |
| | | Is Auto-Generated from the Test Prefix Record for Up to 99,999 Tests |
| | | Full Test ID |
| | | Combines Prefix+Number |
| | Test Objective Field Allows up to 500 Characters | |
| | Description Field Allows up to 1000 Characters | |
| | Test Type is a Pulldown Field where One and Only One Record Must be Selected-Default to BLANK O | |
| | Author ID is a Pulldown Field where One and Only One Record Must be Selected-Defauts to User | |
| | Author Name is Displayed to the Right of Author ID and is Changed When the ID is Changed | |
| | Requirement Field Allows up to 50 Characters and Uses the Auto-Text Field to List Matches to Existing | |
| | Requirement Risk Field is a Pulldown Field where One and Only One Record Must be Selected-Defaut | |
| | Tags is a Tag Field where up to 100 Tags Can be Defined/Reused | |
| | Notes Field Allows up to 1000 Characters | |
| | Ready to Adopt Checkbox | |
| | | Checked when Import Maintenance is Complete for the Test (Displayed on List Screen) |
| | Save | |
| | | Saves the Header Record, Collapses the Header Display and Opens the Test Steps Section |
| | | If the Test Prefix was Changed: |
| | | The Next Test Number is Generated and Included in the File & Increment in the Prefix Record |
| | | All Test Steps are Updated with the New Test ID, Prefix and Test Number |
| | Delete | |
| | | "OK" Closes the Pop-up and Deletes the Staged Test Records |
| | Cancel Closes the Test Definition Header Screen and Nothing else Happens | |

FIG. 23B
(Continued)

| Tables (Header) |
|---|
| Adoption Staging Test Definition Header (Tab) |
| Import Filename (*) |
| Test ID (*) |
| Adoption Complete Date |
| Test Prefix |
| Test Number |
| Test Name |
| Application |
| Status |
| Test Objective |
| Description |
| Test Type |
| Author ID |
| Author Name |
| Requirement |
| Requirement Risk |
| Notes |
| Ready to Adopt (Boolean) |

| Adoption Staging Test Definition Header Tab |
|---|
| Import Filename (*) |
| Test ID (*) |
| Tag (*) |

FIG. 23C

| Tables Test Steps |
|---|
| Adoption Staging Test Definition Test Steps |
| Import Filename (*) |
| Test ID (*) |
| Test Step Number (*) |
| Function Name (Partial Key) |
| Function Name ID (key) |
| {Language - not included} |
| Object Instance (Partial Key) |
| Application Name (key) |
| Object Name ID (key) |
| {Engine Name (key) - not included} |
| OM Narrative Definition (Partial Key) |
| Object Type (key) |
| Method ID (key) |
| {Language - not included} |
| Test Step Narrative |

| Adoption Staging Test Definition Test Steps-Token |
|---|
| Import Filename (*) |
| Test ID (*) |
| Test Step Number (*) |
| Token Name (*) |
| Data |

FIG. 23C (Continued)

| TEST HEADER | |
|---|---|
| Test ID: | TestPrefix+Test Number (Generated) |
| Test Title: | 50 Char (ALM allows 255 characters for test name) |
| Callable (Y/N): | Y |
| Test Status: | New, In Progress, Tier 1Res, Tier 2 Res, Tested OK, Production |
| Test Issue: | (for Tier 2 Res Only) |
| Last Generated: | Configured date-time stamp (Options) |
| Last Run: | Configured date-time stamp (Options) |
| Last Outcome: | Pass/Fail/Incomplete |
| Test Objective: | 500 Characters |
| Description: | 1000 Characters |
| Requirement ID: | 50 Char (ALM?) |
| Requirement Description: | 500 Characters |
| Requirement Risk Level: | (5-Highest to 0-No Risk) |
| Author ID: | |
| Test Type | System, UAT, Smoke, SIT, Regression, (at least one) |
| Application: | |
| Suite Tags: | |
| Tags: | Inherits Test Prefix Tags, Duplicate Tags Not Allowed |
| Notes: | |
| Submit for Review(Y/N): | |
| Review Status: | N/A, Draft, Submitted, Approved, Rejected |
| Review Rejection Comment | 500 Characters |

FIG. 23D

| | |
|---|---|
| Reviewer/Approver ID: | |
| Review Date/Time: | Configured Date-Time Stamp (Options) |
| Input Summary (pop-up): | (See Below) |
| TEST STEPS | |
| Test Step ID | Test Case Prefix-Test Number-step 0000# |
| Test Step Type | Blank (executable), O=Orphan, R=Remark/Comment |
| Test Step Body | Text or Object Instance::Method Instance with Test Data or Test Case (with Input Data) to Perform |
| | |
| | |
| | |

FIG. 23D
(Continued)

| Input Summary (Pop-up) | |
|---|---|
| | This is an Aggregation of All Test Steps Needing Data Inputs (Verification Steps not Considered) for Example |
| | Lookup: |
| | AppModA-Test00001Login user (Acct Summary) |
| | AppModA-Test00002 Sign Out User |
| | AppModA-Test00003 Reset Password |
| | AppModA-Test00004 Add User Profile |
| | AppModA-Test00005 Add User Access |
| | |
| | The user Clicks on the Test Case they Want to Execute and the Next Test Step is Displayed: |
| | Step00002-Function,Execute Test AppModA-Test 00001Login User (Acct Summary) |
| | Step00001-ID- |
| | Step00002-Password- |
| | |
| | This is Displayed in the Test Step of a Calling Operation to Execute a Test Case as a Test Step |
| | |
| | |

FIG. 23D
(Continued)

| |
|---|
| Test ID, Including prefix form the Test Naming Prefix Repository |
| Test Title |
| Callable (Y/N) |
| Test Status (New, In Progress, Tier 1 Res, Tier 2 Res, Tested Ok, Production) |
| Test Issue |
| Last Generated (Date/Time) |
| Last Run Date-Time |
| Last Outcome (Pass/Fail/Incomplete) |
| Test Objective |
| Description |
| Requirement ID |
| Requirement Description |
| Requirement Risk Level |
| Author ID |
| Test Type (System, UAT, Smoke, SIT, Regression - at least one) |
| Application |
| Suite Tags |
| Tags: |

FIG. 23E

| | |
|---|---|
| Notes | |
| Submit for Review (Y/N) | |
| Review Status(N/A, Draft, Submitted, Approved, Rejected) | |
| Review Comment | |
| Reviewer/Approver ID | |
| Review Date/Time | |
| | |
| Test Step IDs (with Test ID Prefix-test Number-step Number) | |
| Test Step Type (Blank(Executable), O=Orphan, R=Remark/Comment | |
| Specific, Named Object Instances Pulled from the Object Navigation Tree(e.g.Screen Identification, Gender Pull-down, Address Field, First Name Field, Service Option Radio Button) | |
| The Method to Act upon the Object[(e.g.Enter [data], Verify [data], Check [checkbox], Select [Radio-button or Pull-down Value]] | |
| Input Data for Test Execution(e.g.Data to be Entered into a Field, Data Value to be Verified, which Checkbox to Check). | |
| What Subtest to Invoke | |
| What Data to Pass to the Sub-test(If Method is to Execute Reusable Test) | |
| | |

FIG. 23E
(Continued)

| | | | | | |
|---|---|---|---|---|---|
| Jim Canter 2019 All Rights Reserved INTELLIFRAME CONFIDENTIAL & PROPRETARY |||||||
| 🖫⇄ | | I-Frame <Project Name> | | | - ☐ x |
| Project | Reports | Design | Approve | Maintenance | Developer |
| Tests Approved/Awating Approval by <User ID> ||||||
| Test III | Test Title | | Author | Status | Date |
| <TestID> | <Test Title................................> | | <Author ID.......> | Rejected | 5/18/19 |
| <TestID> | <Test Title................................> | | <Author ID.......> | Rejected | 5/20/19 |
| <TestID> | <Test Title................................> | | <Author ID.......> | Submitted | 5/21/19 |
| <TestID> | <Test Title................................> | | <Author ID.......> | Submitted | 5/18/19 |
| <TestID> | <Test Title................................> | | <Author ID.......> | Submitted | 5/30/19 |
| <TestID> | <Test Title................................> | | <Author ID.......> | Approved | 4/16/19 |
| <TestID> | <Test Title................................> | | <Author ID.......> | Approved | 3/12/19 |
| <TestID> | <Test Title................................> | | <Author ID.......> | Approved | 12/15/18 |
| <TestID> | <Test Title................................> | | <Author ID.......> | Approved | 11/24/18 |
| <TestID> | <Test Title................................> | | <Author ID.......> | Approved | 11/24/18 |
| <TestID> | <Test Title................................> | | <Author ID.......> | Approved | 11/24/18 |
| <TestID> | <Test Title................................> | | <Author ID.......> | Approved | 11/24/18 |
| Test Definition Header (For Approval) ||||||

Test Definition Header

Test ID Prefix *Banking*        00043       *Banking00043*            Callable ☐
Test Name    *Verify Account Balance*   Status *Progress*    Called By
Application  *Internet Banking*                                       0 Tests Test Objective | *To Verify the account balance for customer J Johnson after a transfer out of $30*
Description    | *One in a sequence of balance transfer tests that are run in sequence. Verifies that the account transfer function yields proper account balances due to accurate calculations*

Test Type *System*              Requirement *Transfer Funds 029*
Author ID *Amelia*        *Amelia Jones*        Requirement Risk *2-Moderate*

Tags    ( Banking )  ( Customer )  ( Transfer )  ( Calculation )
Suite
Notes   *Test is awaiting approval before being added to Suites.*

Operation Events.... .... .... .... .... .... .... .... .... .... .... .... .... .... .... .... .... .... .... ....
Last Generate          Last Run              Last Outcome

Review.... .... .... .... .... .... .... .... .... .... .... .... .... .... .... .... .... .... .... .... .... ....
[Submit]         Submitted for Review        Review Status
Reviewer ID      Days since submission       Date Reviewer Feedback  | *<Up to 500 Characters>*

☐ Approve   ☐ Reject                    [Steps]  [Save]  [Cancel]

FIG. 24A
(Continued)

| Operation | Action |
|---|---|
| Select Menu Item | Navigates to Menu Screen and Makes Relevant Operations Available |
| Double Click on Reco | Launches the test Suite Pop-up Screen |
| Right-Mouse-Button | When Record is Selected |

| Test Definition Approval |
|---|
| Rules |
| The Approval Screen Lists All Tests that are Pending Approval or were Approved by the Current us |
| The Approver can open up any of the Tests Listed and Edit the Approval Status & Feedback Comm |
| To Open a Test, Click on the Test ID |
| To Sort the List by any Header, Press the ∨ or ∧ Symbol to the Left of the Header |
| All Fields are Displayed and all are Disabled Expect for Three: |
|     Reviewer Feedback which Limits Input to 500 Characters |
|     Approve (Boolean) Checkbox |
|     Reject (Boolean) Checkbox |
| Note that Escalation Fields are not Displayed |
| Steps Button |
|     When Pressed, the Header Screen is Compressed as shown, and |
|     The Test Steps are Displayed Below, and |
|     The Three Approval Fields Remain Active and Editable Except for the "Reject" Checkbox |
|     The "Reject" Button is Disabled Until There are at least 10 Characters Entered into the Feedback Field |
|     The "Steps" Button is Disabled after Steps are Displayed |
|     The "Save" and "Cancel" Buttons Remain Enabled |
| ↓  The Down Arrow Button is Enabled |
|     When Pushed The Header Screen is Restored, and |
|     The Steps Screen is Hidden |
| The Save Button Saves the Approver's Input |
|     If the the Test is Saved as "Approved" the Review Status is Set to "Approved"(If in any othe |
|     If the Test is Saved as "Rejected" the Review Status Is Set To "rejected"(if In Any Other Stat |
|     If The Review Status Is Changed, The Review Status DTS is Updated To The Current Time(to |
|     When "approved"is Set And Email Is Sent To The Author Stating That The Sutite Was Approved |
| The Cancel Button Closes The Screen (header & Steps As Applicable) And Nothing Else Happe |
|     This Is True Whether The Steps Screen is On Display Or Not |
| The Test Step Bar Buttons To Add/delete/insert/move A Test Are Disabled |
| +  Add Test Step |
| -  Delete Test Step |
| ∧  Move Test Step Up One Position |
| ∨  Move Teststep Down One Position |
| >  Insert New Test Step Above |
| The Approver Can Move The Field Of Test Steps Up And Down To See All Tests Using The Slider |

FIG. 24A (Continued)

Test Steps Display [For Approval]

Test Defintion Header

Test ID   Prefix  *Banking*          00043       *Banking 00043*            Callable ☐
Test Name   *Verify Account Balance*       Review status *Submitted*  Called By
Reciever   *<Up to 500charachers>*
Feedback ☐ Approve ☐ Reject                                    Steps   Save   Cancel ↓ Test Header

| Test Step | + | - | ∧ | ∨ | > |

00001 Call Test Banking0002 Login User
       Launch IE Browser
       Navigate to URL https://www.intenetbankingsite.com
       Verify Internet Banking Login Page
       Verify Text "welcome to the Internet banking site"
       Enter User ID Jamaca1
       Enter Password zWK243#
       Press Login button
       Verify Internet Banking Main Menu Page
       Verify Text "Internet Banking Main Menu"
00002 Select Hypertext Display Accounts
00003 Verify Checking Account Balance of $400.00
00004 Select Text Logout

Tables

See Test Definition Tables

FIG. 24B

JIM Lanter 2019 All Hights Heserved INIELLIFHAMELUNFIUENIIAL & PHUPHEIARY

I-Fram < Project Name>    — □ ×

Project   Reports   Design   Approve Maintenance Developer

Test Suites Approved/Awating Approvals for <Approver ID>

| ᴧᵥSuite Name | ᴧᵥSuite Desoription | ᴧᵥApproved |
|---|---|---|
| +/- <Suite Name> | <Test Suite Desoription ......................> | |
| Test ABC00001 | <Test Title ..................................> | |
| Test ABC00002 | <Test Title ..................................> | |
| Test ABC00008 | <Test Title ..................................> | |
| Test ABC00024 | <Test Title ..................................> | |
| Test ABC00045 | <Test Title ..................................> | 3/12/19 |
| +/- <Suite Name> | | 12/15/18 |
| +/- <Suite Name> | | 11/24/18 |
| +/- <Suite Name> | | |

Test Suite Definition Approval Screen

Test Suite Definition

Test Suite Name   *Banking Calculations*

Test Suite Descriptions   *All Tests That touch Banking Calculations*

[+] [-]

☐ Check All

| ☐ *Banking00032* | <Test Title..........................> |
| ☐ *Banking00033* | <Test Title..........................> |
| ☐ *Banking00034* | <Test Title..........................> |
| ☐ *Banking00035* | <Test Title..........................> |
| ☐ *Banking00036* | <Test Title..........................> |
| ☐ *Banking00037* | <Test Title..........................> |
| ☐ *Banking00038* | <Test Title..........................> |

Review- - - - - - - - - - - - - - - - - - - - - - - - - - - - -

[Submit] *JGL xxx*   Submited for Review *20190523 1542*   Review Status *Sumitted*

Submit ID *CAKLondon*   *Cavcy McClendon*   Days since submission Date *30150535 1542*

Reviewer Feedback | <Up to 500 Characters> |

☐ Approve   ☐ Reject

[Save] [Delete] [Cancel] [Print]   Suite Last Executed   ddmmyyyy hhmm

Test Suite Definition Approval Screen

See tables for Test Suite Definition

FIG. 25

| Operation | Action |
|---|---|
| Select Menu Item | Navigates to Menu Screen and Makes Relevant Operations Available |
| Double Click on Record | Launches the Text Suite pop-up Screen |
| Right-Mouse -Button | When Record is Selected |

| Test Defined Approval |
|---|

| Rules | | |
|---|---|---|
| The Approval Screen Lists all Test Suites that are Pending Approval or were Approved by the Curr | | |
| The Approvar Can Open up any of the Test Suites Listed and Edit the Approval Status & Feedback | | |
| To Open a Test Suite, Click on the Test Suite Name | | |
| To Sort the List by any Header, Press the ∨ or ∧ Symbol to the Left of the Header | | |
| Test Definition Header (Approval) | All Fields are Displayed and all are Disabled Except for Three: | |
| | | Reviewer Feedback which Limits Input to 500 Characters |
| | | Approve (Boolean) Checkbox |
| | | Reject (Boolean) Checkbox |
| | The Save Button Saves the Approver's Input | |
| | | If the Test is Saved as "Approved" the Review Status is Set to "Approved" (if in any Othe |
| | | If the Test is Saved as "Rejected" the Review Status is Set to "Rejected" (if in any Other Stat |
| | | If the Review Status is Changed, the Review Status DTS is Updated to the Current Time (to |
| | | When "Approved" is Set and Email is Sent to the Submitter Stating that the Suite was Approv |
| | The Cancel Button Closes the Screen and no Changes are Saved | |
| | The Delete Button is Disabled | |

FIG. 25
(Continued)

I-Frame <Project Name>  — □ ×

Project   Reports   Design   Approve   Maintenance   Developer

Test Definition Search Filter

| Filter Name | <Up to 50 charachers> |
|---|---|

Prefixes: Tag Format

|  |  | ---Dates--- | Boolean | 1st Date | Boolean | 2nd Date |
|---|---|---|---|---|---|---|
| Application | At Least 1PullDown | Generated | | | and | |
| Status | At Least 1PullDown | Executed | | | and | |
| Last Outcome | At Least 1PullDown | Approved | | | and | |

Callable Only ☐

Req'm't: Tag Format

Requiretment Risk: At Least 1PullDown

Tags: Tag Format

| Test Autho | <Pulldown - One> | Object Type | At most 1pulldown Value |
|---|---|---|---|
| Test Type | At Least 1PullDown | Method | At most 1pulldown Value |

Obj Name: Tag Format

Test Names Only ☐ (uncheck to include test steps)    [Load] [Apply] [Save] [Delete]

Filter Applied Display

I-Frame <Project Name>  — □ ×

Project   Reports   Design   Approve   Maintenance   Developer

Test Definition Search Filter

↓ <Filter Name> Applied (or Unsaved Filter Applied)

TestABC00( Test Description Step 00003
TestABC00( Test Description Step 00015
TestABC00( Test Description Step 00023
TestABC00( Test Description Step 00014
TestABC00( Test Description Step 00005
TestABC00( Test Description Step 00091

FIG. 26A

Delete Filter Confirmation Pop-up

| Confirm Search Filter Deletion |
|---|
| To Confirm Deletion of the Test Definition Search Filter, Press "OK" Below |
| OK  Cancel |

Pull Downs

| Boolean Operator |
|---|
| > |
| < |
| = |
| >= |
| <= |

*(From Options)*

| Test Status Pulldown |
|---|
| All |
| New |
| In Progress |
| Tier 1 Resolution |
| Tier 2 Resolution |
| Tested OK |
| Production |

*(From Options)*

| Last Test Outcome Pulldown |
|---|
| All |
| No run |
| Pass |
| Fail |
| Incomplete |

*(From Options)*

| Requirement Risk Pulldown |
|---|
| All |
| 3- High |
| 2- Moderate |
| 1- Low |
| 0-None |

*(From Options)*

Note: 1st Pulldown value defined

| Test Review Status Pulldown |
|---|
| All |
| Submitted |
| Approved |
| Rejected |

*(From options)*

| Test Type Pulldown |
|---|
| All |
| System |
| UAT |
| Smoke |
| SIT |
| Regression |

*(Dynamic) See Test Type Table*

| Object Type Puuldown |
|---|
| Page |
| Entry Field |
| Check Box |
| Radio Button |
| (... All Defined Object Types) |

*(Dynamic)*

| Method Pulldown |
|---|
| (... All Defined Methods for Selected Object Type) |

*(Dynamic)*

| Author Pulldown |
|---|
| (... All Defined User ID's) |

*(Dynamic)*

FIG. 26B

Tables

| Test Filter Definition Table | These Tables are Used to Account for Unlimited Entries for One Filter | | | |
|---|---|---|---|---|
| Test Filter Name (*) | Test Filter Prefix Tag Table | Test Filter Application Table | | Test Filter Status Table |
| Application Name | Test Filter Name (*) | Test Filter Name (*) | | Test Filter Name (*) |
| Callable Only (Boolean) | Prefix Tag ID | Application Name | | Test Status |
| Author | Test Filter Outcome Table | Test Filter Reqmt Table | | Test Filter Reqmt Risk Table |
| Object Type | Test Filter Name (*) | Test Filter Name (*) | | Test Filter Name (*) |
| Method | Last Outcome | Requirement Name | | Requirement Risk Tag |
| Test Names Only (boolean) | Test Filter Tags Table | Test Filter Test Type | | Test Filter Object Name Table |
| | Test Filter Name (*) | Test Filter Name (*) | | Test Filter Name (*) |
| | Test Tag | Test Type Name | | Object Name |

FIG. 26B (Continued)

| Operation | Action |
|---|---|
| Select Menu Item | Navigates to Menu Screen and Makes Relevant Operations Available |

Note: This Filter Screen can be Called for Other Operations in the Application It Serves as a Pop-up (Yellow Screen With Light Blue Header)

| Navigation Map Ribbon |
|---|
| None |

FIG. 26C

| Rules | | |
|---|---|---|
| | Filter Name Field | |
| | | Up to 50 Characters are Permitted for Input |
| | | Filter Name Defaults to Blank |
| | | As the User Types in the Filter Name, Options Appear Below The Field- See Auto Text in Conventions Tab |
| | Prefixes: Prefix Count Is Limited to the Number of Prefixes Defined. See Data Tag Conventions | |
| | Application: | |
| | | Defaults to All |
| | | First Pulldown Value is "all" Followed by Those Listed in the Pull Down Table on this Page |
| | | Multiple Values may be Selected |
| | Status: | |
| | | Defaults to All |
| | | First Pulldown Value is "all" Followed by Those Listed in the Pull Down Table on this Page |
| | | Multiple Values may be Selected |
| | Last Outcome: | |
| | | Defaults to All |
| | | First Pulldown Value is "all" Followed by those Listed in the Pull Down Table on this Page |
| | | Multiple Values may be Selected |
| | Callable: Test can be Called and Executed by Another Test (checkbox Field) | |
| Field edit rules | Dates: | |
| | | Boolean: Pulldown of Boolean Operators- User may Choose One and Only One Operator |
| | | 1st & 2nd Date: Resolves to Format Defined in Options |
| | | No Edit Logic Employed for Infeasible Date Combination Selections |
| | | Generated: Date Test Script was Last Generated - Found in Test Header Data |
| | | Executed: Date Test Script was Last Executed - Found in Test Header Data |
| | | Approved: Date Test Script was Approved by SME- Found in Test Header Data |
| | Req'm't: Requirement Names Limited to the Number of Requirement Names Defined. See Tag Convention | |
| | Requirement Risk (Pulldown): | |
| | | Defaults to All |
| | | First Pulldown Value is "all" Followed by those Listed in the Pull Down Table on this Page |
| | | Multiple Values may be Selected |
| | Tags: Tags are Defined in Test Header Field for Tags. Limited to the Number of Tags Defined. See Tag | |
| | Test Author ID: Pulldown from User ID's One and Only One ID can be Selected, Including Blank | |

FIG. 26D

| | |
|---|---|
| Test Type: | |
| | Defaults to ALL |
| | First Pulldown Value is "ALL" Followed by One Value for Test Type Defined. |
| | Multiple Pulldown Values May be Chosen |
| Object Type: | |
| | Defaults to BLANK |
| | First Pulldown Value is BLANK, Followed by a Value for Each Defined Object type |
| | One and Only one Pulldown Value May be Chosen. |
| Method: | |
| | Defaults to BLANK |
| | First pulldown Value is BLANK, Followed by all Methods Defined for Selected Object Type |
| | If Object Type is Changed, Method Pulldown is set to BLANK |
| | One and Only one Pulldown Value May be Chosen. |
| Object Names: | Limited to 50 Object Names. See Data Tag Convention, this page. |
| Test Names Only: | Checkbox. When Checked Test Steps will not be Included in the List |
| Load: | |
| | Load is Disabled if the Filter Name is Blank and no Filter Configuration has been Entered/Defined |
| | Load is Enabled if a Valid Filter Name is Entered and Matches an Existing Filter |
| | When Load is Executed the Related Filter is Loaded and Displayed |

FIG. 26E

| | |
|---|---|
| Apply: | |
| | Hides the Search Configuration, Replacing it with a One-line Display of the Filter Name and "Applied" |
| | Lists the Tests in the list Section Below the line with <Filter Name>+Applied |
| | If Filter Name is Blank, just "Unsaved Filter Applied" is displayed |
| | → The Arrow on the Left is the Unhide Command. When Clicked the Filter Config is Re-Displayed |
| Save: | |
| | The Save command is Disabled if the "Filter Name" Field is Blank |
| | Executing "SAVE" |
| | Applies the Filter Configuration and the Apply Behavior Described Above Occurs. |
| | Saves the Filter Configuration Under the Name Entered in "Filter Name" |
| Delete: | |
| | The Delete Command Button is Enabled ONLY at this Location |
| | When the Test Definition Search Filter is Employed as a Pop-up Elsewhere in the Application it is ALV |
| | The Delete Command Button is Disabled here When the Filter Configuration on Display hasn't been Sa |
| | When Delete is Executed |
| | The Confirmation Pop-up Screen is Launched |
| | When Ok'd, the Confirmation Pop-up Closes, the Filter is Deleted, and a Fresh Filter Screen is Displa |
| | When Cancelled, the Confirmation Pop-up Closes, and the Original, Undeleted Filter Config Remain |

FIG. 26E (Continued)

| | I-Frame<Project Name> | - □ x |
|---|---|---|

| Project | Reports | Design | Approve | Maintenance | Developer |
|---|---|---|---|---|---|

| Application | <Select Application> | | Replace | <Select Replace Filter> | YYYYMMDD-HHMM |
|---|---|---|---|---|---|
| Text ABC00001 | Application Name........ | | | Text Name.............. | |
| Text ABC00002 | Application Name........ | | | Text Name.............. | |
| Text ABC00003 | Application Name........ | | | Text Name.............. | |
| Text ABC00004 | Application Name........ | | | Text Name.............. | |
| Text ABC00005 | Application Name........ | | | Text Name.............. | |
| Text ABC00006 | Application Name........ | | | Text Name.............. | |
| Text ABC00007 | Application Name........ | | | Text Name.............. | |
| Text ABC00008 | Application Name........ | | | Text Name.............. | |
| Text ABC00009 | Application Name........ | | | Text Name.............. | |
| Text ABC00010 | Application Name........ | | | Text Name.............. | |
| Text ABC00011 | Application Name........ | | | Text Name.............. | |
| Text ABC00012 | Application Name........ | | | Text Name.............. | |
| Text ABC00013 | Application Name........ | | | Text Name.............. | |

OM Combination or Function Replace Screen

Replace

Filter Name [Up to 50 Characters]  ⊙ OM Replace
Application  Internet Banking       ○ Function Replace

Example of an Object / Method Replace

[Required Fields]
Selecting a Target Object Instance

Replace

Filter Name [Up to 50 Characters]  ⊙ OM Replace
Application  Internet Banking       ○ Function Replace

Target Object Instance

Target Method          <Select One>
Target Steps Matching

[                                                ]

Replace with Instance    ▤ Primary Address
Replace with Method     <Select One>
Replace with step

[                                                ]

[Replace All]  [Save Filter]  [Delete Filter]  [Close]      Timeout : 0:00min

FIG. 27A

| Operation | Action |
|---|---|
| Select Menu Item | Navigates to Menu Screen and Makes Relevant Operations Available |

Note: Narrative Replacements are Conducted in the Default Language

Navigation Map Ribbon

None

Rules

The Screen Displays an Unfiltered Listing of Defined Tests Without Test Steps When Launched Initially Replace Filter Pulldown
- Lists all Defined Filters for Selection in the Pulldown Only When a Filter is Selected, the Tests and Test Steps Targeted by the Filter are Listed The Date-time Stamp of the Replacement Action (if the Filter has Been Expended) is Displayed to the Right Time-out operation
- The Filter Remains Active for the Period of Time Defined in Options(Replace Filter Time Out)
- When the Time-Out Clock>0 all Target Tests are Locked (i.e. Can't Be Edited)
- When the Time-Out Clock=0, The Target Tests are Re-locked

Replace Screen Rules(OM Replace Selected)

Replace Screen (with OM Replace Selected):

- Filter Name Field
  - Up to 50 Characters are Permitted for Input (Mandatory Field)
  - Filter Name Defaults to Blank
  - As The User Types in the Filter Name, Options Appear Below the Field - See Auto Text in Convention

- Radio Buttons For OM & Function Replace
  - The OM Replace Radio Button Is Selected as the Default
  - Based on Radio Button Selection the Screen Works with Object/Method Targets or Function Targets

- Target Object Instance
  - When selected, launches the Select Object Instance Pop-up
  - User will have Added the New Object instance to the Object Navigation Tree so it Can be Seen here

- Target Method (Pulldown)
  - Lists all Methods Associated with the Target Object Instance Object type
  - One and Only One Method Must be Selected to Proceed

- Target Steps Matching
  - Follows the Same Rules in Construction as Creating a Test Step in Test Definition Functionality

- Replace with Instance
  - Launches Select Object Instance Pop-Up for Selection of the Replacement Object Instance

- Replace With Method (Pulldown)
  - Lists all Methods Associated with the Target Object Instance Object type
  - One and Only One Method Must be Selected to Proceed

- Replace Step
  - Follows the Same Rules in Construction as Creating a Test Step in Test Definition Functionality
  - User May Edit Step as Needed to Define Replacement Step

- Read Only

FIG. 27A (Continued)

Select Object Instance Pop-up

Analyst selects "Old" fields to be changed

Select Object Instance <Application Name>

☐ Customer Profile
    ☐ First Name
    ☐ Last Name
    ☐ Street Address
    ☐ City
    ☐ State
    ☐ Zip
    ☑ Primary Address (old)
    ☐ Primary Address
    ☑ Instore Customer
    ☑ Online Customer
    ◉ Active Customer

[ Select ]  [ Cancel ]

Replace

Filter Name | Swap Primary Address Checkbox for Pulldown | ◉ OM Replace
Application   Internet Banking                                    ○ Function Replace
Target Object Instance ☑ Primary Address[Old]
Target Method      <Select One>
Target Steps Matching   Check
                       Un-check
                       Verify Checked
                       Verify Un-checked

Selecting a replacement Object Instance and Method

Replace

Filter Name | Swap Primary Address Checkbox for Pulldown | ◉ OM Replace
Application   Internet Banking                                    ○ Function Replace

Target Object Instance ☑ Primary Address[Old]
Target Method      Check
Target Steps Matching Check the Primary Address checkbox

Replace with Instance    Primary Address
Replace with Method    <Select One>
Replace with step    Select Yes
                 Select No
                 Verify Yes
                 Verify No

[ Replace All ]   [ Save Filter ]   [ Delete Filter ]   [ Close ]      Timeout : 0:00min

FIG. 27B

| Rules for Replaces All, Load Filter, Save Filter, Delete Filter, Close Filter |
|---|
| Replace All Button |
|   Disabled Untill Filter is First Saved |
|   Disabled if Time Out has Expired Before Replaces All is Executed |
|   Enabled while Time Remains on the Filter Time-Out clock |
|   Executes the Replacement of Matching Target Test Steps with the Replacement Test Step |
|   Once Steps have been Replaced, the Replace Complete Pop-up is Launched |
| Save Filter button |
|   Disabled Untill all Required Fields have Eentries |
|   Saves all Filter Data and Activates the Time Out Clock |
|   Refreshes the Filtered Target Test List |
| Refresh Filter Button |
|   Disabled when the Value of the Time- out Clock>0 |
|   Enabled when the Value of the Time- out Clock=0 and the Filter has been Saved |
|   Re-Filters Data, Refreshing the Target Test List |
|   Restarts the Time-Out Clock (i.e Locks All Target Tests) |
| Delete Filter Button |
|   Disabled Untill Filter Record is First Saved |
|   Deletes the Filter and all Associated Targets and Replaces Data |
|   Closes the Replace Screen |
| Close |
|   Closes the Replace Screen |
|   If the Filter has Been Saved, it is Not Deleted |

FIG. 27B
(Continued)

Filter ready to be saved

| Replace | | |
|---|---|---|
| Filter Name | *Swap Primary Address Checkbox for Pulldown* | ⦿ OM Replace |
| Application | *Internet Banking* | ○ Function Replace |

Target Object Instance    ☑ Primary Address[Old]
Target Method    Check
Target Steps Matching Check the primary Address checkbox Replace with Instance    ▯ Primary Address
Method    Select Yes
Replace with step For Primary Address pulldown list, select Yes

[Replace All] [Save Filter] [Delete Filter] [Close]    Timeout : -0:00min

---

Filter Saved, Time Out Clock Started

| Replace | | |
|---|---|---|
| Filter Name | *Swap Primary Address Checkbox for Pulldown* | ⦿ OM Replace |
| Application | *Internet Banking* | ○ Function Replace |

Target Object Instance    ☑ Primary Address[Old]
Target Method    Check
Target Steps Matching Check the Primary Address checkbox Replace with Instance    ▯ Primary Address
Method    Select Yes
Replace with step For Primary Address pulldown list, select Yes

[Replace All] [Save Filter] [Delete Filter] [Close]    Timeout : -4:56min

FIG. 27C

| Launched when Test Step is Selected |
|---|

| Before "Replace" Command |
|---|

Test Definition Header

Test ID   Prefix  *Banking*   *00012*   *Banking00012*               Callable ☐
Test Name *Set Primary Address for Customer Jim Smith* Profile   Status *Production*  Called By ⬇ Test Header Test Step + −   ∧ ∨ >

00001 Enter <u>Jim</u> into the First Name Field
00002 Enter <u>Smith</u> into the Last Name Field
00003 Enter <u>1340 Jones St</u> into the Street Address Field
00004 Enter <u>Scranton</u> into the City Field
00005 Enter <u>PA</u> into the State Field
00006 Enter<u>18504</u> into the Zip Field
| 00007 Check the Primary Address check box |
00008 check the lastore Customer check box
00009 Uncheck the Online Customer check box            Save  Cancel Analysts can't change test steps while Replace filter is active and unexecuted. The test records are locked
All targeted tests identified by the filter remain locked untill Replace has been applied
This prevents Invalidation of the replace filter
Replace filter time out according to the time set into the options

| After "Replace" Command |
|---|

Test Definition Header

Test ID   Prefix  *Banking*   *00012*   *Banking00012*               Callable ☐
Test Name *Set Primary Address for Customer Jim Smith* Profile   Status *In Preview*  Called By ⬇ Test Header Test Step + −   ∧ ∨ >

00001 Enter <u>Jim</u> into the First Name Field
00002 Enter <u>Smith</u> into the Last Name Field
00003 Enter <u>421N Main Av</u> into the Street Address Field
00004 Enter <u>Scranton</u> into the City Field
00005 Enter <u>PA</u> into the State Field
00006 Enter<u>18504</u> into the Zip Field
| 00007 for Primary Address pulldown list,select Yes |
00008 check the lastore Customer check box
00009 Uncheck the Online Customer check box Save  Cancel Once the replace has been executed, the test analysis may adjust test steps, but not add, insert, delete
or move steps. This is intended to accommodate individual corrections in mass replacements

| Example of a Function Replace |
|---|

| Replace |
|---|

Filter Name  Change Wait 3 to Wait 15            ○ OM Replace
Application  *Internet Banking*                            ⊙ Function Replace
  Target Function       Select One Call Test
  Target Steps Matching    Close Browser
                               Launch Chrome Browser
                               Launch IE Browser
                               Log System Time
                               | Wait |

FIG. 27E

| | Rules for Replace Function |
|---|---|
| Replace Screen (with Function Replace Selected) | User Overrides Default by Selecting Function Replace Radio Button |
| | Traget Function(Pulldown) |
| | Lists All Functions Excepts for Cell Test |
| | One and Only One Function Must be Selected to Proceed |
| | Target Steps Matching |
| | Follows the Same Rules in Construction as Creating a Test Step in Test Definition Function |
| | Replace with Function(Pull down) |
| | Lists All Function Except for Call Test |
| | One and only one Function Must be Selected to Proceed |
| | Replace with Step |
| | Follows the Same Rules in Construction as Creating a Test Step in Test Definition Function |

FIG. 27E
(Continued)

```
                                Replace
Filter Name  [Change Wait 3 to Wait 15]      ○ OM Replace
                                             ⊙ Function Replace
Applications  Internet Banking Target Functions        [Wait]
  Target Stops Hatching
  ┌─────────────────────────────────────────┐
  │ Wait 3 Seconds                          │
  │                                         │
  └─────────────────────────────────────────┘

Replace with Function   [Wait]
  Replace with Stop
  ┌─────────────────────────────────────────┐
  │ Wait 15 Seconds                         │
  │                                         │
  └─────────────────────────────────────────┘

[Replace All] [Save Filter] [Delete Filter] [ Close ]    Timeout: xxxxxxx
```

FIG. 27F

Tables

Replace FilterTable
- Replace Filter Name (*)
- Replace Filter Type (O or F)
- Target Object Instance ID
- Target Method ID
- Replace Object Instance ID
- Replace Method ID
- Target Function ID
- Replace Function ID
- Target Test Step
- Replace Test Step
- Test Step Count Replaced
- Replace Complete DTS

Replace Test Steps-Token Values
- Replace Filter Name (*)
- Replace Token Name
- Replace Data

Target Test Steps
- Replace Filter Name (*)
- Test ID (Key)
- Test Step Number (Key)

Target Step (From Test Definition Tables)

Test Definition Test Steps
- Test ID (*)
- Test Step Number (*)
- Function Name (Partial key)
  - *Function Name ID (key)*
  - *(Language not Included)*
- Object Instance (Partial Key)
  - *Application Name (key)*
  - *Object Name ID (key)*
  - *(Engine Name(Key)- not Included)*
- OM Narrative Definition (Partial key)
  - *Object Type (key)*
  - *Method ID (key)*
  - *(Language - not Included)*
- Test Step Narrative

Test Definition Test Steps-Token
- Test ID(*)
- Test Step Number(*)
- Token Name(*)
- Data

FIG. 27F
(Continued)

| 🖫⟳ | I-Frame <Project Name> | — 🗗 ▢ |

| Project | Reports | Design | Approve | Maintenace | Developer |

| Application | <Select Application > | Impact | < Select Impact Filter > |

Test ABC0000 Application Name....... Test Name............................
Test ABC0000 Application Name....... Test Name............................
Test ABC0000 Application Name....... Test Name............................
Test ABC0000 Application Name....... Test Name............................
Test ABC0000 Application Name....... Test Name............................
Test ABC0000 Application Name....... Test Name............................
Test ABC0000 Application Name....... Test Name............................
Test ABC0000 Application Name....... Test Name............................
Test ABC0000 Application Name....... Test Name............................
Test ABC0001 Application Name....... Test Name............................
Test ABC0001 Application Name....... Test Name............................
Test ABC0001 Application Name....... Test Name............................

[Print]   Impacted Tests:0   Impacted Test Steps:0

Impact Filter Screen

Impact Filter

Impact Filter Name [ <Up to 50 Characters> ]

↳ ☐ ☐ Customer Profile
　　☐☒ First Name
　　☐☒ Last Name
　　☐☒ Street Address
　　☐☒ City
　　☐☒ State
　　☐☒ Zip
　　☐◉ Instore Customer
　　☐◉ Online Customer
　　☐◉ Active Customer
　　☐◉ Inactive Customer
　　☐◉ Save

[Save Filter] [Delete Filter] [Cancel]

FIG. 28A

| Operation | Action |
|---|---|
| Select Menu Item | Navigates to Menu Screen and Makes Relevant Operations Available |
| Note: This Filter Screen Can be Called for Other Operations in the Application. It Serves as a Pop-Up (Yellow Screen with Light Blue Header) ||
| Navigation Map Ribbon ||
| None ||
| Rules ||
| The Screen Displays an Unfiltered Listing of Defined Tests without Test Steps when Launched Initi ||
| Impact Filter Pulldown ||
| | Lists all Defined Filters for Selection in the Pulldown |
| Only when a Filter is Active, the Tests and Test Steps Selected by the Filter are Listed ||
| | Print Button is Active when a Filter is Active, Disabled Otherwise |
| | Impacted Test & Test Steps Count is Displayed According to the Active filter (Counts are Zero) |
| Impact Button ||
| | When no Application Name is Selected, the Impact Button is Disabled |
| | When an Application Name is Selected, it is Enabled |
| | When a Filter is Selected, Launches the Object Selection Impact Screen |
| | When a Filter is not Selected, Launches Fresh Object Selection Impact Screen |
| Impact Filter Screen | Impact Filter Name |
| | Allows up to 50 Characters to be Entered |
| | Checkboxes |
| | When Checking or Unchecking a Page Object All Child Objects are Selected / Unselected |
| | Page Child Objects are Selected Individually for Unselected Pages |
| | Save Filters |
| | Save the filter name & object selections |
| | Closes the Impact Filter Screen |
| | Activates the filter on the base srceen |
| | Delete Filter |
| | Deletes Filters and Data |
| | Closes the Impact Filter Screen |
| | Deactivates any Live Filter |
| | Cancel |
| | Closes the Impact Filter Screen and Does Nothing Else |

FIG. 28A (Continued)

Impact Filter

Impact Filter Name: Release 23 - Address Changes

- ☐ Customer Profile
  - ☐ First Name
  - ☐ Last Name
  - ☒ Street Address
  - ☒ City
  - ☒ State
  - ☒ Zip
- ☐ Customer Fields Box
  - ☐ Instore Customer
  - ☐ Online Customer
  - ☐ Active Customer
  - ☐ Inactive Customer

[Save Filter] [Delete Filter] [Cancel]

Filter Applied Display (Filtered for Impacted Test Steps)

I-Frame < Project Name >

Project | Reports | Design | Approve | Maintenance | Developer

Application: Internate Banking | Impact: Release 23-Address Changes

| Test ID | Name | Step |
|---|---|---|
| Banking00012 | Set Primary Address for Customer Jim Smith Profile | Step 00007 |
| Banking00013 | Set Primary Address for Customer Mary Turner Profile | Step 00007 |
| Banking00014 | Set Primary Address for Customer Peter Jennings Profile | Step 00007 |
| Banking00015 | Set Primary Address for Customer Kathy Marion Profile | Step 00007 |
| Banking00016 | Set Primary Address for Customer Ginger Rogers Profile | Step 00007 |
| Banking00017 | Set Primary Address for Customer Kate Smith Profile | Step 00007 |

[Print] Impacted Tests: 6  Impacted Tests Steps: 6

Tables

Impact Filter Table

Filter Name (*)
Object Instance ID

FIG. 28B

| Operation | Action |
|---|---|
| Select Menu Item | Navigates to Menu Screen and Makes Relevant Operations Available |
| Double Click on Record | Launches the Test Suite Pop-up Screen |
| Right-Mouse-Button | When Record is Selected |
| Object Type Definition Maintenance Ribbon | |
| Add (+) Edit Delete (-) Add/Delete | |
| Rules | |
| Object Type Screen | Double Click on the Object Type Definition to Edit and the Definition Screen is Launched |
| | Access Actions by Launching the Right-mouse Click Menu Anywhere on the Screen |
| | Object Types are Listed Alphabetically |
| Add | Click on Ribbon "Add (+)" |
| | A Fresh Object Type Definition Screen is Launched |
| Delete | Click on Ribbon "Delete (-)" or Press the Delete Key on Selected Record |
| | Deletes the Selected Object Type Definition Record |
| | Records in Use Cannot be Deleted |
| |    Delete Error Pop-up Screen States the Record Can't be Deleted because it's in Use |
| |    "Ok" Clears the Pop-up Screen |
| Mouse Menu | Add Launches a Fresh Object Type Definition Screen |
| | Edit Only Enabled when a Record was Selected Before Launching the Mouse Menu |
| |    Edit Launches the Object Type Definition Screen with Associated Data |
| | Delete Follows the Delete Rules Above |
| Object Type Definition Screen | Object Type Name Field Allows Entry up to 40 Characters |
| | Object Icon Field is a Pull Down, Requires Selection of One and Only One Icon |
| | Short Name Field Allows Entry up to 15 Characters |
| | Application, Page & Sub-page Radio Buttons |
| |    Default is Application |
| |    Denotes the Outline Level of the Object in a Navigation Tree |
| | "Save" Closes the Object Type Definition Screen and Saves the Data |
| | "Delete" Follows the Delete Rules Above |
| | "Cancel" Closes the Object Type Definition Screen and Does Nothing Else |

FIG. 29
(Continued)

| I-Frame<Project Name> | – ☐ x |

Project   Reports   Design   Approve   Maintenance   Developer

Test Type Defnitions

<Test Type>    <Description>
    <Test Type>    <Description>
    <Test Type>    <Description>
    <Test Type>    <Description>
    <Test Type>    <Description>
    <Test Type>    <Description>
    <Test Type>    <Description>

Right-Mouse Click Pop-Up Menu

Add
Edit
Delete

Text Type Deletion Blocked Pop-Up

Text Type Definition Deletion Blocked

The Text Type Definition cannot be deleted as it is in use.

[ OK ]

Object Type Pop-Up Screen

[ Required Fields ]

Object Type

Text Type Name   <Up to 40 Characters>
                      <Up to 100 Characters>

( Save )  ( Delete )  ( Cancel )

Tables

| Text Types |
|---|
| Text Type Name (*) |
| Description |

FIG. 30

| Operation | Action |
|---|---|
| Select Menu Item | Navigates to Menu Screen and Makes Relevant Operations Available |
| Double Click on Record | Launches the Test Suite Pop-up Screen |
| Right-Mouse-Button | When Record is Selected |

Text Prefix Design Ribbon

Add (+)
Edit
Delete (-)
Add/Delete

Rules

| | | |
|---|---|---|
| Test Type Screen | | Double Click on the Test Type Definition to Edit and the Definition Screen is Launched |
| | | Double Click Anywhere on the Screen NOT a Record and a Fresh Definition Screen is Launched |
| | | Access Actions by Launching the Right-mouse Click Menu Anywhere on the Screen |
| | | Test Types are Listed Alphabetically |
| Add | | Click on Ribbon "Add (+)" |
| | | A Fresh Test Type Definition Screen is Launched |
| Delete | | Click on Ribbon "Delete (-)" or Press the Delete Key on Selected Record |
| | | Deletes the Selected Text Type Definition Record |
| | | Records in Use Cannot be Deleted |
| | | Delete Error Pop-up Screen States the Record Can't be Deleted Because it's in Use |
| | | "Ok" Clears the Pop-up Screen |
| Mouse Menu | | Add Launches a Fresh Object Type Definition Screen |
| | | Edit Only Enabled when a Record was Selected Before Launching the Mouse Menu |
| | | Edit Launches the Test Type Definition Screen with Associated Data |
| | | Delete Follows the Delete Rules Above |
| Test Type Definition Screen | | Test Type Name Field Allows Entry up to 40 Characters |
| | | Description Field Allows Entry up to 100 Characters |
| | | If the Test Type Name Entered Matches an Existing Record, That Record is Loaded |
| | | "Save" Closes the Test Type Definition Screen and Saves the Data |
| | | "Delete" Follows the Delete Rules Above |
| | | "Cancel" Closes the Test Type Definition Screen and Does Nothing Else |

FIG. 30 (Continued)

Users

| | | | |
|---|---|---|---|
| User ID | <20 Characters> | | |
| First Name | <40 Characters> | City | <30 Characters> |
| Last Name | <40 Characters> | State | TX |
| Primary Phone | 20 Digits | Zip | 5 Digits |
| Secondary Phone | 20 Digits | Email Address | 50 Char |

Design ☐ (Check All)  Reports ☐ (Check All)  Maintenance ☐ (Check All)  Developer ☐ (Check All)  Project ☐ (Check All)

- ☐ Test Definitions
- ☐ Object Instance Navigation
- ☐ Test Suite Definitions
- ☐ Test Prefix Definitions
- ☐ OM Narrative Definitions
- ☐ Adopt

- ☐ Narrative Scripts
- ☐ Executable Scripts
- ☐ Text Results
- ☐ Error Logs

Approve ☐ (Check All)
- ☐ Test Definitions
- ☐ Test Definitions

- ☐ Search
- ☐ Replace
- ☐ Assess/Estimate
- ☐ Object Type Definition
- ☐ Test Type Definitions
- ☐ Users
- ☐ Replicate (Narrative)
- ☐ Languages

- ☐ Engine Definitions
- ☐ Method Definitions
- ☐ Function Definitions
- ☐ Executable Scriptlets
- ☐ Common Functions
- ☐ Inheritance Maps
- ☐ O::M Synch Analysis
- ☐ Replicate (Executable)
- ☐ Icon Library

- ☐ New
- ☐ Open
- ☐ Print
- ☐ Generate
- ☐ Save
- ☐ Save As
- ☐ Export
- ☐ Share
- ☐ Options Language <Select One - Default Is Primary Language>

[Cancel] [Save] [Delete]

FIG. 31A
(Continued)

| Operation | Action |
|---|---|
| Select Menu Item | Navigates to Menu Screen and Makes Relevant Operations Available |
| Double Click on Record | Launches the Test Suite Pop-up Screen |
| Right-Mouse-Button | When Record is Selected |

Test Prefix Design Ribbon

Add (+)
Edit
Delete (-)
Add/Delete

Rules

Add
- Double click anywhere on the screen NOT on a record
- Invoke the Add[+] command on the ribbon
- Add from the mouse menu Delete (Record must be selected)
- Hit the <DEL> ,key
- invokethe Delete(-) command on the ribbon
- Delete from the mouse menu
- Any delete command launches the Delete User Confirmation pop-up
- "OK" closes the pop-up and deletes the user record
- "Cancel" closes the pop-up and deletes nothing Add/Edit/Delete User
- User double clicks on record to edit
- User ID limits input to 20 Characters
- First Name limits input to 40 Characters
- Last Name limits input to 40 Characters
- Primary Phone input is country code (area code) Prefix-Number - allows 20 digits
- Secondary Phone field permits equivilant to Primary
- City limits input up to 30 characters
- State accepts a two digit abberviation
- Email address limits input to 50 Characters
  - Email format error pops up if email string does not contain an @ with at least one "." to the right
- Checkboxes
  - When Checked user can access the menu item
  - When not Checked menu item is hidden from the user
  - Checking the header checks or clears checks for all related elements
- The Delete Command deletes the user Mouse menu
- Add: Launches fresh Add/Edit/Delete User Screen (no Data)
- Edit: Launches Add/Edit pop-up screen with associated default data (disabled if no record selected)
- The Delete Command follows the rules above for "Delete Command"

FIG. 31A (Continued)

| Pulldowns |
|---|
| Language Pulldown |
| (List of Define-xxx) |
| (Dynamic) |

| Tables |
|---|
| User Table |
| User ID(*) |
| First Name |
| Last Name |
| Primary Phone |
| Secondary Phone |
| City |
| State |
| Zip |
| Email Address |
| Language |
| Design-Test Definitions(Boolean) |
| Design-Object Instance Navigation (Boolean) |
| Design-Test Suite Definitions(Boolean) |
| Design-Test Prefix Definitions(Boolean) |
| Design-OM Narrative Definitions(Boolean) |
| Design-Adopt (Boolean) |
| Reports-Narrative Scripts (Boolean) |
| Reports-Executable Scripts(Boolean) |
| Reports-Test Results (Boolean) |
| Reports-Error Logs (Boolean) |
| Approve-Test Definitions(Boolean) |
| Approve-Test Definitions(Boolean) |
| Maintenance-Search(Boolean) |
| Maintenance-Replace(Boolean) |
| Maintenance-Assess/Estimate (Boolean) |
| Maintenance-Object Type Definitions(Boolean) |
| Maintenance-Test Type Definitions(Boolean) |
| Maintenance-Users(Boolean) |
| Maintenance-Replicate(Narrative)(Boolean) |

FIG. 31B

| |
|---|
| Maintenance-Languages(Boolean) |
| Developer-Engine Definitions(Boolean) |
| Developer-Method Definitions(Boolean) |
| Developer-Function Definitions(Boolean) |
| Developer-Executable Scriptlets (Boolean) |
| Developer-Common Functions(Boolean) |
| OM Narrative Definition Table |
| Object Type (Key)(*) |
| Method Definition(Key)(*) |
| Developer-Icon Library(Boolean) |
| Project-New (Boolean) |
| Project-Open(Boolean) |
| Project-Print(Boolean) |
| Project-Generate (Boolean) |
| Project-Save(Boolean) |
| Project-Save As(Boolean) |
| Project-Export (Boolean) |
| Project-Share(Boolean) |
| Project-Options(Boolean) |

FIG. 31B
(Continued)

| I-Frame<Project Name> | – ☐ x |
|---|---|
| Project  Reports  Design  Approve  Maintenance  Developer | |

| Languages | |
|---|---|
| Languages Name | Last replicated |
| English | (Default) |
| <Languages> | EngineYYYYMMDD-HHMM |
| <Languages> | EngineYYYYMMDD-HHMM |

Mouse Pop-Up Menu

Add
Edit
Delete

Languages Deletion Blocked Pop-Up

Language Definition Deletion Blocked
The Language Definition cannot be
deleted as it is in use.

[ OK ]

Languages screen

| Language | Required Fields |
|---|---|
| Language  <Up to 30 Characters> | |

Replicate OM Narratives ☐
OM Narratives Last Replicated on Engine YYYYMMDD - HHMM

[ Save ]  [ Delete ]  [ Cancel ]

Tables

| Languages Table |
|---|
| Language (*) |
| Replicate OM Narratives (Boolean) |
| OM Narratives Last Replicated DTS |

FIG. 32

| Operation | Action |
|---|---|
| Select Menu Item | Navigates to Menu Screen and Makes Relevant Operations Available |
| Double Click on Record | Launches the Test Suite Pop-up Screen |
| Right-Mouse-Button | When Record is Selected |
| Test Prefix Design Ribbon | |
| Add (+) <br> Edit <br> Delete (-) <br> Add/Delete | |
| Rules | |
| *Languages* | Double Click on the Language to Edit and the Language Screen is Launched |
| | Double Clicking Anywhere on the Screen (not on a Record) Launches a Fresh Language Screen |
| | Access Actions by Launching the Right-mouse Click Menu Anywhere on the Screen |
| | Languages are Listed Alphabetically |
| *Add* | Click on Ribbon "Add (+)" |
| | A Fresh Language Screen is Launched |
| *Delete* | Click on Ribbon "Delete (-)" or Press the Delete Key on Selected Record |
| | Deletes the Selected Language Record |
| | Records in Use Cannot be Deleted |
| | Delete Error Pop-up Screen Announces the Record Can't be Deleted because it's in Use |
| | "Ok" Clears the Pop-up Screen |
| *Mouse Menu* | Add Launches a Fresh Language Screen |
| | Edit Only Enabled when a Record was Selected Before Launching the Mouse Menu |
| | Edit Launches the Language Screen with Associated Data |
| | Delete Follows the Delete Rules Above |
| *Language Screen* | Language field allows entries up to 30 characters |
| | If the language entered on fresh screen matches exsiting record, that record is displayed |
| | Replicate OM Narratives Checkbox |
| | When checked, system creates missing instances of OM narratives for the language |
| | Existing default language OM Narratives are copied where no corresponding OM Narrative Ex |
| | The copied record is identical to the default record, but for the Language key |
| | Once missing records have been copied, the Replicate OM Narratives Checkbox is Uncheck |
| | The OM Narratives Last Replicated date-time stamp is set to show the last replication Execut |
| | When unchecked(upon SAVE)nothing is replicated |

FIG. 32 (Continued)

| Operation | Action |
|---|---|
| Select Menu Item | Navigates to Menu Screen and Makes Relevant Operations Available |
| Double Click on Record | Launches the Test Suite Pop-up Screen |
| Right-Mouse-Button | When Record is Selected |
| Test Prefix Design Ribbon | |
| Add (+) <br> Edit <br> Delete (-) <br> Add/Delete | |
| Rules | |
| Engine Definition List | Double Click on the Engine Definition to Edit and the Definiation Screen is Launched |
| Engine Definition List | Double Clicking Anywhere on the Screen (not on a Record) Launches a Fresh definition Screen |
| Engine Definition List | Access Actions by Launching the Right-mouse Click Menu Anywhere on the Screen |
| Engine Definition List | Engine Definitions are Listed Alphabetically |
| Add | Click on Ribbon "Add (+)" |
| Add | A Fresh Engine Definition Screen is launched |
| Delete | Click on Ribbon "Delete (-)" or Press the Delete Key on Selected Record |
| Delete | Deletes the Selected Engine Definition Record and It's associated Common Functions Record |
| Delete | Records in Use Cannot be Deleted |
| Delete |    Delete Error Pop-up Screen States the Record Can't be Deleted because it's in Use |
| Delete |    "Ok" Clears the Pop-up Screen |
| Mouse Menu | Add Launches a Fresh Object Type Definition Screen |
| Mouse Menu | Edit Only Enabled when a Record was Selected Before Launching the Mouse Menu |
| Mouse Menu |    Edit Launches the Engine Definition Screen with Associated Data |
| Mouse Menu | Delete Follows the Delete Rules Above |
| Engine Definition Screen | Engine Name Field Allows Entry up to 30 Characters |
| Engine Definition Screen | Computer is a Boolean field |
| Engine Definition Screen | If the Engine Name Entered on Fresh Screen Matches Existing Record, that record is Displayed |
| Engine Definition Screen | When first Saved (new record) application also adds a blank Engine Common Functions Recx |
| Engine Definition Screen | When Checked, System Creates Missing Instances of Scriptlets for the Engine |
| Engine Definition Screen |    Existing default Engine Scriptlets are copied where a corresponding scriptlet does not exist |
| Engine Definition Screen |    The copied record is identical to the default record, but for the Engine key |
| Engine Definition Screen |    Once missing records have been copied, the Replicate Scriptlets Checkbox is unchecked |
| Engine Definition Screen |    The Scriptlets Last Replicated date-time stamp is set to show the last replication execution C |
| Engine Definition Screen | When unchecked(upon SAVE)nothing is replicated |

FIG. 33 (Continued)

| Operation | Action |
|---|---|
| Select Menu Item | Navigates to Menu Screen and Makes Relevant Operations Available |
| Double Click on Record | Launches the Test Suite Pop-Up Screen |
| Right-Mouse-Button | When Record is Selected |
| Test Prefix Design Ribbon | |
| Add (+)<br>Edit<br>Delete (-)<br>Add/Delete | |
| Rules | |
| Application Definition List | Double Click on the Application Definition to Edit and the Definition Screen is Launched |
| Application Definition List | Double Clicking Anywhere on the Screen (not on a Record) Launches a Fresh Definition SC |
| Application Definition List | Access Action by Launching the Right-Mouse Click Menu Anywhere on the Screen |
| Application Definition List | Application Definitions are Listed Alphabetically |
| Add | Click on Ribbon "Add (+)" |
| Add | A Fresh Application Definition Screen is Launched |
| Delete | Click on Ribbon "Delete (-)" or Press the Delete Key on Selected Record |
| Delete | Deletes the Selected Application Definition Record |
| Delete | Record in Use Cannot be Deleted |
| Delete |   Delete Error Pop-up Screen Announces the Record Can't be Deleted Because it's in Use |
| Delete |   "Ok" Clears the Pop-up Screen |
| Mouse Menu | Add Launches a Fresh Application Definition Screen |
| Mouse Menu | Edit Only Enabled When a Record was Selected Before Launching the Mouse Menu |
| Mouse Menu |   Edit Launches the Application Definition Screen with Associated Data |
| Mouse Menu | Delete Follows the Delete Rules Above |
| Application Definition Screen | Engine Name Field Allows Entries Up to 50 Characters |
| Application Definition Screen | Application Instance Created Field (Hidden Boolean Field) |
| Application Definition Screen |   This Field Defaults to False (New Records) |
| Application Definition Screen |   When False, the Application Object is Saved at Level 1 (See Object Type Definition) |
| Application Definition Screen |   The Boolean Field is Set to True when this is Done |

FIG. 34 (Continued)

Note: Spoken Language Refers to the Native Language of the Reader, Rather than the Script Language

Full Remarked Top-Down Executable Scripts

'Step 1 00001 Call Test Banking 0002 Login User
'Launch IE Browser
    <Default tool executable language to launch IE browser>

'Navigate to URL https: //www.internetbanking site.com
    <Default tool executable language to navigate to url https:// www.internetbankingsite.com>

'Verify Internet Banking Login Page
    <Default tool executable language to verify that the internet banking login page is displayed>

'Verify Text "Welcome to the Internet Banking Site"
    <Default tool executable language to verify presence of quoted text "Welcome to the internet banking site">

'Enter user ID jamaca1
    <Default tool executable language to enter "jamaca1" into the user ID field>

'Enter password zwk243#
    <Default tool executable language to enter password "zwk243#" into the password field>

'Press Login Button
    <Default tool executable language to press/activate the Login Button>

'Verify Internet Banking Main Menu Page
    <Default tool executable language to verify that the Internet Banking Main Menu is displayed>

'Verify Text "Internet Banking Main Menu"
    <Default tool executable language to verify the presence of quoted text "Internet Banking Main Menu" is displayed>

'Step 00002 Select Hypertext Display Accounts
    <Default tool executable language to select/activate hypertext "Display Accounts">

'Step 00003 Verify Checking Account Balance of $400.00
    <Default tool executable language to verify that the value of the "Checking Account Balance" field is $400.00>

'Step 00004 Select Hypertext Logout
    <Default tool executable language to select/activate hypertext "Logout">

'Step 00005 Verify Logout Exit Page
    <Default tool executable language to verify that the Logout Exit Page is displayed

FIG. 39

Narrative Script (English)

Step 1 00001 Call Test Banking0002 Login User
      Launch IE Browser
      Navigate to URL https://www.internetbankingsite.com
      Verify Internet Banking Login Page
      Verify Text "Welcome to the Internet Banking Site"
      Enter User ID Jamaca1
      Enter Password zWK243#
      Press Login Button
      Verify Internet Banking Main Menu Page
      Verify Text "Internet Banking Main Menu"
Step 00002 Select Hypertext Display Accounts
Step 00003 Verify Checking Account Balance of $400.00
Step 00004 Select Hypertext Logout
Step 00005 Verify Logout Exit Page

FIG. 40A

Narrative Script (Spanish)

Paso 1 00001 Prueba de llamada Banking0002 Iniciar Sesion Usuario
      Inicie el navegador IE
      Navegue a la URL https://www.internetbankingsite.com
      Verifique la pagina de inicio de sesion de Banca por Internet
      Verifique el texto "Welcome to the Internet Banking Site"
      Introduzca la ID de usuario Jamaca1
      Ingrese la contrasena zWK243#
      Presione el boton Iniciar sesion
      Verifique la pagina de l menu principal de Banca por Internet
      el texto "Internet Banking Main Menu"
Paso 00002 Seleccionar cuentas de visualizacion de hipertexto
Paso 00003 Verificar el saldo de la cuenta corriente de $ 400.00
Paso 00004 Seleccione Cerrar sesion de hipertexto
Paso 00005 Verificar cierre de sesion Salir de la pagina

FIG. 40B

Narrative Script (Hindi)

चरण 1 00001 कॉल टेस्ट बैंकिंग 10002 लॉगिन उपयोगकर्ता
IE ब्राउज़र लॉन्च करें
Https://www.internetbankingsite.com URL पर नेविगेट करें
इंटरनेट बैंकिंग लॉगिन पेज को सत्यापित करें
पाठ सत्यापित करें "Welcome to the internet Banking Site"
उपयोगकर्ता आईडी jamaca1 दर्ज करें
पासवर्ड दर्ज करें 2WK2.43#
लॉगइन बटन दबाएँ
इंटरनेट बैंकिंग मुख्य मेनू पृष्ठ सत्यापित करें
"internet Banking Main Menu" पाठ सत्यापितकरें

METHODS, SYSTEMS AND COMPUTER PROGRAM PRODUCTS FOR AUTOMATED SOFTWARE TESTING

CLAIM OF PRIORITY

The present application claims priority to U.S. Provisional Application No. 62/854,083, filed on May 29, 2019, entitled Methods, Systems and Computer Program Products for Automation of Software Tests, the content of which is hereby incorporated herein by reference.

FIELD

The present inventive concept relates generally to testing of software applications, more particularly, to methods, systems and computer program products for automation of testing of a software product.

BACKGROUND

Conventional test automation software does not generally include a script framework. In automated software testing, a "framework" is an abstraction in which the framework's software provides generic functionality can be selectively changed by additional user-written code or framework native utilities, thus providing application-specific automated software tests. A software test automation framework provides a standard way to build, deploy, and execute automated tests. Automated tests have large numbers of redundant test steps scattered throughout the test suite. Without a test automation framework, updates and fixes to the automation scripts become virtually impossible, causing abandonment of automated testing. Test automation frameworks help reduce redundancy, improving maintainability. However it fails to mitigate the impact on large automation suites caused by minor application changes. Such changes can instantly render obsolete twenty to fifty percent of all tests. This makes test maintenance inefficient, if not impossible, even with the elimination of redundancy. Even when the test software automation frameworks effectively manage redundancy and improve maintenance, automated test suites generally lag behind development and requires a larger number of patches and rework, which eventually becomes unworkable as fewer and fewer automated tests can be executed.

Conventional automated test scripts are generally created after the code is developed and compiled and passes manual functional tests which are used to test the various features of the compiled code. Thus thorough manual testing is needed to stabilize application software sufficiently to make automated testing possible.

Effective high coverage test design crates a high degree of redundant test steps throughout the test suite. When these manual tests are automated, the automated test suite lags behind the evolution of the application itself. Improved methods of test automation are desired that reduce cost, maintenance man hours as well as the amount of training required to execute these tests.

SUMMARY

Some embodiments of the present inventive concept provide a system for automating testing of a software product. The system, including an automation test framework module, is configured to receive input from the framework to define and maintain test suite modules to test the software product including object requirements for tests based on user stories and/or requirements associated with the software product; build an object instance navigation and automated test scripts based on the received input; and provide an object instance navigation map for the test suite modules, where the automation test framework module receives the input, builds the object instance references and provides the object instance navigation map before or in parallel with coding analysis, design and coding of the software product.

In further embodiments, the object instance navigation map may be consumable by software designers, subject matter experts, and/or developers. The automation test framework module may be further configured to provide common language narrative scripts for validation by subject matter experts.

In still further embodiments, the automation test framework module may be further configured define, refine and execute the test scripts during development of the software product, eliminating the need for preliminary manual testing.

In some embodiments, the automation test framework module may be further configured to provide stabilization testing in a quality assurance (QA) environment once all test cases can run successfully in the developers' unit test environment(s).

In further embodiments, the automation test analysts may periodically analyze the software program and/or requirements to identify object changes and with automation, replace obsolete objects and actions/methods in all occurrences within the automated test suite.

In still further embodiments, the automation test framework module may be further configured to provide a fully remarked script for execution and to convert to the script into native language (narration) scripts for review by non-developer subject matter experts.

In some embodiments, the system may further include a plurality of test engines, each of the engines configured to test different portions of code of the software product.

In further embodiments, the automation test framework module may be further configured to run legacy application and new applications in parallel such that the legacy applications inform the new applications.

Related methods and computer program products are also provided.

BRIEF DESCRIPTION OF THE FIGURES

FIG. 7 is a diagram illustrating "menus" in accordance with some embodiments of the present inventive concept.

FIG. 8 is a diagram illustrating an auto text function in accordance with some embodiments of the present inventive concept.

FIG. 9 is a diagram illustrating various use cases in accordance with some embodiments of the present inventive concept.

FIG. 10 is a diagram of a graphical user interface (GUI) illustrating generating a narrative in accordance with some embodiments of the present inventive concept.

FIGS. 11A through 11F are flowcharts and diagrams illustrating steps in generating a narrative in accordance with some embodiments of the present inventive concept.

FIGS. 12A through 12D are flowcharts and diagrams illustrating steps for replacing filters in accordance with some embodiments discussed herein.

FIGS. 13A and 13B are diagrams illustrating approval of the test definitions entered by the operator in accordance with various embodiments of the present inventive concept.

FIG. 15 illustrates a series of diagrams illustrating "options" in accordance with some embodiments of the present inventive concept.

FIGS. 16A through 16C illustrate the various fields of FIG. 15 including data imported therein in accordance with various embodiments of the present inventive concept.

FIGS. 18A through 18D are diagrams illustrating test suite definitions in accordance with some embodiments of the present inventive concept.

FIGS. 20A through 20E are diagrams illustrating object instance navigation in accordance with some embodiments of the present inventive concept.

FIGS. 21A through 21E are diagrams illustrating OM narrative definitions in accordance with some embodiments of the present inventive concept.

FIGS. 22A through 22E are diagrams illustrating function narrative definitions in accordance with some embodiments of the present inventive concept.

FIGS. 23A through 23E are diagrams illustrating importing (adoption) in accordance with some embodiments of the present inventive concept.

FIGS. 24A and 24B are diagrams illustrating approving test definitions in accordance with some embodiments of the present inventive concept.

FIG. 25 is a diagram illustrating approving test suite definitions in accordance with some embodiments of the present inventive concept.

FIGS. 26A through 26E are diagrams illustrating test definition search filters in accordance with some embodiments of the present inventive concept.

FIGS. 27A through 27F are diagrams illustrating replacement in accordance with some embodiments of the present inventive concept.

FIGS. 28A and 28B are diagrams illustrating impact in accordance with some embodiments of the present inventive concept.

FIG. 30 is a diagram illustrating test type definitions in accordance with some embodiments of the present inventive concept.

FIGS. 31A and 31B are diagrams illustrating user functionality in accordance with some embodiments of the present inventive concept.

FIG. 32 is a diagram illustrating language functionality in accordance with some embodiments of the present inventive concept.

FIG. 39 illustrates an example of fully documented code in accordance with some embodiments of the present inventive concept.

FIGS. 40A through 40C are examples illustrated narrative script in English, Spanish and Hindi, respectively, in accordance with various embodiments of the present inventive concept.

DETAILED DESCRIPTION

Figure 1:
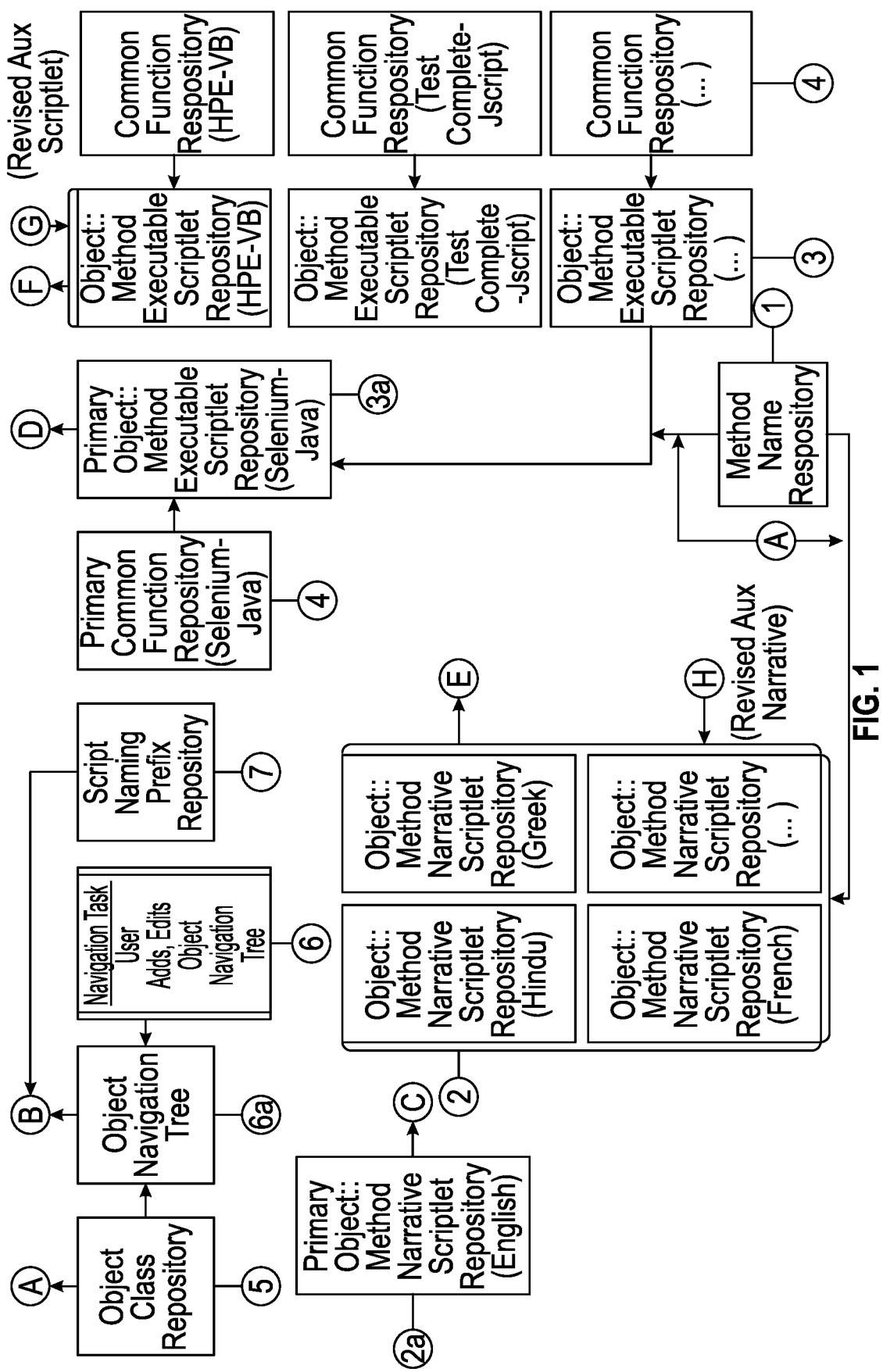
FIG. 1 is a block diagram illustrating script meta data in accordance with some embodiments of the present inventive concept

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, conventional test automation software does not generally include a script framework. In automated software testing, a "framework" is an abstraction in which the framework's software provides generic functionality can be selectively changed by additional user-written code or framework native utilities, thus providing application-specific automated software tests. A "software test automation framework," on the other hand, provides a standard way to build, deploy, and execute automated tests. Automated tests have large numbers of redundant test steps scattered throughout the test suite. Without a test automation framework, updates and fixes to the automation scripts become virtually impossible, causing abandonment of automated testing. Test automation frameworks help reduce redundancy, improving maintainability, however, fail to mitigate the impact on large automation suites caused by minor application changes. Such changes can instantly render obsolete twenty to fifty percent of all tests. This makes test maintenance inefficient, if not impossible even with the elimination of redundancy. Even when the test software automation frameworks effectively manage redundancy and improve maintenance, automated test suites generally lag behind development and requires a larger number of patches and rework, which eventually becomes unworkable as fewer and fewer automated tests can be executed.

Conventional automated test scripts are generally created after the code is developed and compiled and passes manual functional tests which are used to test the various features of the compiled code. Thus thorough manual testing is needed to stabilize application software sufficiently to make automated testing possible.

Effective high coverage test design creates a high degree of redundant test steps throughout the test suite. When these manual tests are automated, the automated test suite lags behind the evolution of the application itself. Improved methods of test automation are desired that reduce cost, maintenance man hours as well as the amount of training required to execute these tests.

Manual tests precede automation with highly redundant test steps that are then automated. Accordingly, some embodiments of the present inventive concept provide methods, systems and computer program products for automated software testing using an automation script framework application. Thus, automation script framework modules as discussed herein enable immediate and maintainable automation testing with redundant test steps and can likely eliminate, or greatly reduce, the need for manual testing to stabilize the software in order to accept/run automated tests.

As will be discussed further below, test automation framework in accordance with embodiments discussed herein addresses critical vulnerabilities of test automation suites. For example, some embodiments of the present inventive concept address the following: Erosion of working test counts as test maintenance falls behind software package evolution (represents erosion of return on investment (ROI)); lack of agility needed to respond to high volumes of content and processing flow changes (especially found in e-commerce); high maintenance overhead attributable to a full staff of experienced automation engineers; the need to start automation from scratch when an automation tool goes out of support; and the need to have stable code before tests can be authored and executed (lowered ROI).

Thus, unlike conventional software test systems, embodiments of the present inventive concept provide reusable tools that can be employed before and during programming of the code and not just after it is compiled. These tools can be used in both the development environment as well as QA environments. Use of the tools in accordance with embodiments discussed herein may allow cost savings by, for example, virtually eliminating the need to precede automated testing with manual tests, as well as reducing the number of automation engineers needed to perform automated tests of a particular product and reducing the amount of time it takes to test of product before rolling the product to market.

In other words, in accordance with some embodiments discussed herein, test analysts ignorant of automation scripting can automate tests wherein they cannot with conventional systems, for example, as little as half an hour indoctrination in the framework with very little support from one automation engineer. Furthermore, using methods, systems and computer program products in accordance with embodiments discussed herein, tests can be automated before the code to be tested is written, offering Test-Driven Development, and meaningful automated testing immediately after code compilation (little-to-no manual pre-testing). Test analysts can quickly reconcile automated tests to delivered code without knowledge of the scripting language, increasing test and development team collaboration and cohesion.

Software test automation suites in accordance with embodiments discussed herein can adapt to a high volume of content and flow changes in an hour, for example, 200 tests per hour, depending on the distribution of impacted tests per analyst. Automation Test Administrators can identify and purge obsolete tests using search filters, as well assess change impact. They can correlate user acceptance testing (UAT) or production faults with test coverage, and actively engage business subject matter experts (SMEs) in test reviews. As many as fifteen test analysts can be supported by one test automation engineer. Business analysts can review and propose revisions to test cases rendered in their native tongue.

As used herein, a "test automation engineer" refers to a senior engineer with a significant amount of test automation experience. Thus, by definition, test automation engineers are highly skilled and highly compensated. By reducing the number of test automation engineers needed to test a particular product, embodiments of the present inventive concept may help significantly reduce staff costs associated with a project.

Embodiments of the present inventive concept provide test automation framework that addresses the largest and most expensive challenges to test automation. The first of these is the development of a Test Automation Framework. Commercial framework applications have not been developed in the past because the combination of unique application approaches especially considering the wide variability of automation engines on the market. Frameworks written in the language of an automation engine will not accommodate competitor engines. Automated testing generally requires a sophisticated framework to achieve its value proposition. Custom frameworks, costing at least twice the price of testing engines have assured success. These frameworks are characteristically built in the language of the test tool with a nod to the specific processing dynamics of the application under test. For example, a banking application can differ significantly from a manufacturing application or from an insurance application. As well user interface screen engineering can vary greatly from one software manufacturer to another.

Access to sophisticated frameworks has largely been limited to the large Offshoring/Outsourcing service companies. Unless a company has an existing contract with one of these companies, they must build the framework themselves. In the last five years test automation frameworks have emerged as distinct products.

The next challenge addresses keeping pace with the functional evolution of the application under test and has two dimensions: the volume of daily or weekly market-driven content and logic path change makes it difficult to keep up (typically in e-commerce); and the long-term evolution of applications requires equivalent evolution by the automated test suite. The first situation is coupled to a ROI of the automated test suite as it would support daily business operations through both regression testing along with the inclusion of new tests for functionality demanded by the business to remain competitive. Automated test suites traditionally do not attempt this reach. Some embodiments of the present inventive concept accommodate this additional ROI opportunity.

The discipline of maintaining test automation for flowing changes assists in defining the disciplines and process for rapid delivery of changes while maintaining quality.

The second situation is longer term. It has to do with a framework's agility in adapting to major changes in application behavior that could involve longer development changes to automated testing suites.

Embodiments of the present inventive concept provide for shorter development changes to suites because embodiments discussed herein provide built-in utilities to identify components of the framework that are impacted by large application changes. This is critical in that large application changes become foundational for later changes. If missed by the automation suite and its framework, technical debt escalates, and the value of the investment in test automation degrades steadily. This is especially true in complex applications with long life spans.

At one of the largest U.S. banks the internet banking automation suite that drove the customer-facing banking client module, had eroded by 60% in only three years. This was during the largest growth of the application, wherein 60,000 new users and significant new behaviors were added monthly. The banking team realized that recovery required building a new automation suite accompanied by a new framework from scratch.

Automation frameworks were developed to enable test automation engineers to modularize their scripting approach in order to reduce redundancy. The amount of work required to maintain automated test scripts varies directly with the degree of redundancy in test scripts. Simply put, given a framework with high redundancy, a bug or fault in the framework likely exists in multiple places that cannot be located with a direct query. Frameworks characteristically do not offer diagnostic services to let you know you've found and fixed the fault in every location. Nor do they offer any form of automated script maintenance. Redundancy can't be eliminated, simply because objects on a page are likely used by multiple tests and test steps. A successful framework restricts redundancy to the object and method level. Even at this, framework design does not extend functionality to automated script maintenance methods.

Generally, only seasoned experts are qualified to build test automation frameworks from scratch, and even they cannot eliminate redundancy—the Achilles heel of maintaining automated automation frameworks and scripts.

Hence companies stepping into automation must identify and hire the right talent to create frameworks that marry the proclivities of the company's software to be tested with the vagaries of an automation engine. Engines differ in capabilities. They differ in required support. Here are some framework facts: no single automated testing engine can test everything; sometimes specialized market niche engines can be found to cover those gaps; not all user interface (U/I) conventions are covered by more mature engines (Gartner upper right quadrant); moving to a new automated engine isn't trivial, as the framework must be rebuilt from scratch, then the test scripts; frameworks are built from execution engine scripts; framework approaches for different engines don't allow for movement or adaption of existing test scripts from one engine to another; automated test execution coverage generally always erodes as applications under test evolve; there is no process in frameworks to accommodate screen object changes; frameworks can't generally be queried to understand the impact of an object change; test engines don't generally operate effectively without a framework; building a framework can cost 150% of the cost of a test engine, or more; building a framework can take anywhere from 3-6 months to achieve basic operability; expert automation engineers who understand test design generally build a framework; and business SMEs generally do not review the viability and effectiveness of automated tests.

With the focus on agile and iterative approaches to enhancing applications, speed is the objective. Speed is not achieved by cutting corners, as defective releases risk productivity (significantly increased cost) and reputation (market share). Speed is achieved with lean, effective, and uniform process—hence an importance is correctly placed on automation.

Automated tests are only as effective as their underlying design. Effective engagement of Business SMEs is critical to test design. It is only through SME feedback that business can be assured that tests "fit" the business processes they verify. Hence keeping a test suite current generally requires constant review cycles wherein the right tests are obsoleted (discarded), revised and added to the suite. Business SMEs are not engaged to review test automation suites—where the rubber meets the road in testing. Rather they review the precursor designs to test automation. Traditionally, when tests have been executed manually, they are then automated. It is often that the original design intent is not carried forward by automation engineers who were separate from the original test design function. In other words, all parties need to be involved at all levels to produce the best product. Shifting automation to business or test analysts who traditionally do not know automation languages solves this problem.

A global enterprise resource planning (ERP) application suite built an automated test suite 50,000+ tests against 300 applications. Only one defect was discovered for every 300-500 tests executed. The company's clients were finding more defects than all of their testing combined. The company had no test design discipline, feedback loop on test effectiveness, or a way to correlate production faults to test coverage.

Embodiments of the present inventive concept address many of the problems with existing testing methods. For example, embodiments of the present inventive concept provide the capability to support iterative cycles in test reviews by business SMEs by providing test narratives in their native language. In other words, the subject matter experts may be involved because the narratives are not provided in computer code, but in a language they can understand. The review practice enabled culls obsolete tests, keeping the automation suite relevant.

Test design automation is a sector of the market that is developing. Embodiments of the present inventive concept also provide for the import tests created using automated design tools, so that the automation team can multiply execution coverage with solid design coverage.

Correlating UAT or Production defect leakage by mapped business processes is a feedback that informs business, development, test and project teams where an application is vulnerable. Vulnerability data points not only to needed software fixes but gaps in test coverage. Embodiments of the present inventive concept allow traceability of tests, not just to requirements, but to business process maps (L1, L2, L3, L4). This improves test coverage and lifts quality.

One of the largest challenges that faces an effective and well-maintained test automation suite occurs when the test execution engine can no longer serve its purpose. There are two typical causes. In one, the information technology (IT) team generally must re-platform an application wherein their business practices change is from small to significant.

The challenge is deepened when the execution engine in use on the legacy platform isn't compatible with the new platform. Alternately, the test execution engine company withdraws support for their tool and the team must find another execution tool which is driven by its own unique scripting language.

Embodiments of the present inventive concept support multiple execution engines, it provides a path for the conversion of legacy regression tests—whether automated or manual. Converting legacy regression tests into this framework allows for continued execution of legacy tests, as new tests are coded for the same scripts against the new execution engine. This reduces or possibly eliminates the need to start from scratch.

As used herein, the term "task" refers to an activity driven by a user through a user interface (U/I); an "operation" refers to an automated activity; a "repository" refers to a container for metadata that forms data components uses as building blocks for scripting; and "data" refers to data that comprises actual script or application security information.

Some embodiments of the present inventive concept will now be discussed with respect to the figures. Referring first to FIGS. 1 through 5, it will be understood that these figures illustrate high level block diagrams illustrating user tools, software modules/operations, reports that may be generated and data that may be stored. Some of the figures also illustrate other pages (high level diagrams) that connect to the blocks of that particular figure, which will be discussed further below with respect to each of the figures.

Referring first to FIG. 1, a block diagram illustrating high level script metadata in accordance with some embodiments of the present inventive concept will be discussed. The various elements of FIG. 1 will be defined hereafter.

Method Name Repository 1 is a repository that holds the common methods (actions) used across the framework, for example, third party test engines, narratives and executable scriptlets. Common methods may include, but are not limited to, Enter, Check, Uncheck, Select, Verify.

Object::Method Narrative Scriptlet Repositories 2 For each Object, a human readable narrative may be authored by the user in the configured primary language, for example, English, Hindu, French, Russian, Greek. The user may enter delimited object names in the narrative to describe the method operating on the object class. For example, the Object::Method Field::Enter: "The user enters {data} into the {Field Name} [Field]." Individual narrative scriptlet records carry a status as follows: New—No content (automatic); In Progress—Some Content (automatic); Verification Pending—Unverified Scriptlet Language (manual); and Verified OK—Scriptlet Language Verified and Passed (manual). The date-time stamp and ID of the last user to save the record is recorded as well.

Primary Object::Method Narrative Scriptlet Repository 2a where multiple Object::Method Narrative Repositories are in use, one is configured as the primary repository.

Object::Method Executable Scriptlet Repositories 3 each testing tool supported by the framework has an Object:: Method repository. This repository hosts script segments (scriptlets) in the testing tool's language. The script segment's scope covers the Object::Method for which the scriptlet is named. A user with developer powers designated technical support resource for the tool enters the programming lines so that a fully executable scriptlet can be generated and used to drive the testing tool's behavior. Tokens are entered into the script to represent the object, for example, [Field] and the appropriate scripting verb to represent the Object::Method being defined. Execution Scriptlet records carry a status as follows: New—No content (automatic); In Progress—Some Content (automatic); Test Pending—Untested Scriptlet (manual); Effective—Scriptlet Tested and Passed (manual); Tier 2 Fix—Scriptlet undergoing Tier 2 maintenance (manual); and the date-time stamp and ID of the last user to save the record is recorded as well.

Primary Object::Method Executable Scriptlet Repository 3*a* where two or more automation tools are supported, one Scriptlet Repository is designated for the primary tool being supported.

Common Function Repository 4 Each testing tool supported by the framework is also supported by a function repository. Scripts hosted by the tool's Object::Method repository invoke these common functions to complete their functionality. The function repository thus provides support mechanism to support for modular script design, minimizing redundancy and maximizing maintainability. Common global functions are supported, including error and test result trapping, as well as script headers and footers as required by the execution engine.

Object Class Repository 5 This repository acts as the library of defined object classes, for example, Application, Page, Pop-up, Text, Input Field, Checkbox, Radio button, and Operation. The objects are classified as physical (observable on a U/I) or Functional (an operation that doesn't occur through a U/I). Physical objects are pulled into the Object Navigation Tree and become instances when they are named and linked to an application, page or pop-up.

Navigation Task—User adds, edits Object Navigation Tree 6 The user builds and edits the object navigation tree, naming the application under test, its pages, pop-ups, and visual objects. In this task the user chooses and object class and creates a specific instance of that object in the application or on an application page or screen. The user deletes, moves, and adds objects and tree branches. The user elects to add a new element from a pull-down menu. The element is added at the relevant branch level and the user gives the element a name. Duplicate names within the same page/screen are generally not permitted.

Object Navigation Tree 6*a* The object navigation tree is authored by the user in the Navigation Task and captures the structure of screens/pages and the object classes to be tested on those pages (see Object Class Repository 5 definition above). The application name or application module name is at the top of the hierarchy, pages/screens are at the second level of branching, and object classes are at the third and final level of branching. The tree size is limited by storage capacity.

Script Naming Prefix Repository 7 The naming prefix repository provides user-standardized script name prefixing so that test identification by application-under-test modules or functionality can be separately identified and grouped into test suites—and/or be uniquely identified after their import into test management tools such as HP-ALM or IBM Test Manager. In some embodiments, each prefix can have up to 50 tags, which are inherited by the tag field in test headers.

Thus, the various data elements 1, 2, 2*a*, 3, 3*a*, 4, 5, 6*a* and 7 communicate with the user task and integrate with other pages in the software module A, B, C, D, E, F, G and H as will be discussed further below.

Figure 2:
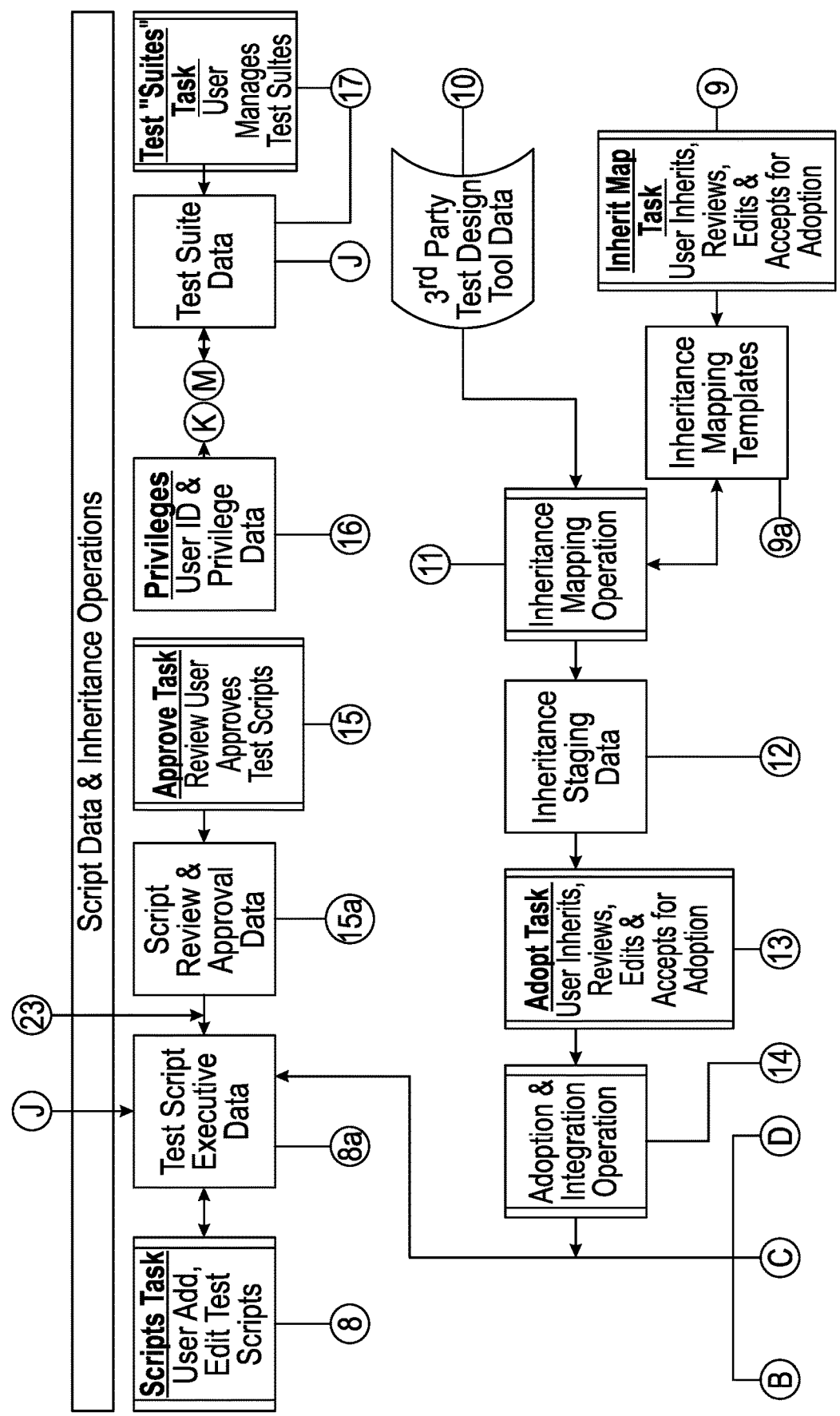
FIG. 2 is a block diagram illustrating script data and inheritance operations in accordance with some embodiments of the present inventive concept.

Referring now to FIG. 2, a high level block diagram illustrating script data and inheritance operations in accordance with some embodiments of the present inventive concept will be discussed. Definitions of the various blocks are provided below.

Scripts Task—User add/edit Test Scripts 8 The user adds new, deletes, builds, edits and executes test scripts. For a New Script, the user fills in script header information includes Test ID, including prefix; Test Title; Description; Objective; Requirement ID; Requirement Description; Requirement Risk Level; Submit for Review (Y/N); and Tags. The user may add test steps including select an object from the tree; selects a method associated with the object class; enter test data required to exercise the method; and the test steps are automatically saved. User tests scripts are entered by generating and executing test script. The script is saved automatically when the user exits the edit screen. The user may edit existing items including user selects an existing screen from the screen index; the application displays all of the test steps; user adds, deletes, or modifies test steps; the script is saved automatically when the user exits the edit screen. The user may also delete and execute Scripts. Script tags are used to corelate scripts with L1-L5 functional business maps. Traceability to functional maps allows Test Administrators to correlate UAT and production faults with the functional coverage contained in the automated test suite. This is critical in improving both test coverage and the quality of vulnerable functionality, i.e., functionality that experiences the highest frequency of UAT or production faults). All additions, revisions, and deletions are saved to Test Script Executive Data. See Execution Operation.

Test Script Executive Data 8*a* This data the comprises the blueprint for each test script. Test Header Data: Test ID, including prefix form the Test Naming Prefix Repository; Test Title; Callable (Y/N) [Y—Test can be executed as a test step in another test]; Test Status (New, In Progress, Tier 1 Fix, Tier 2 Fix, Test Pending, Effective); Test Issue (required for Tier 2 Fix status only); Last Generated (Date/Time); Last Run Date-Time *; Last Outcome (Pass/Fail/Incomplete) *; Test Objective; Description; Requirement ID; Requirement Description; Requirement Risk Level; Author ID; Test Type (System, UAT, Smoke, SIT, Regression—at least one); Application; Suite Tags; Tags; Notes; Submit for Review (Y/N); Review Status (N/A, Draft, Submitted, Approved, Rejected); Review; Comment; Reviewer/Approver ID; and Review Date/Time. Test Step Data: Test Step IDs (with Test ID prefix—test number—step number); Test Step Types (Blank (executable), O=Orphan, R=Remark/comment; Test Step Body: Text or Object Instance::Method Instance with Test Data or Test Case (with input data) to Perform. The * indicates that these fields are blanked when a script is generated.

For example:

Step 00001—Enter 370806 in the User ID field

Step 00002—Enter Jim in First Name Field

Step 00003—This test proves that the user can login

Inheritance Mapping Template 9*a* Data that comprises and defines a template employed in receiving Inheritance data and transforming it into a compatible structure for consumption by the framework application. The template is used in the "Inheritance Mapping Operation" to import test scripts generated by a third-party automated test design tool. Each supported third party automated test design tool has its unique template.

3rd Party Test Design Tool Data 10 Exported data from test design sessions in a third party automated test design tool. This data passes through the Inheritance Mapping Operation and User review, edit, acceptance and Adoption operations to become active tests in the Test Script Executive.

Inheritance Mapping Operation 11 This operation takes in and stores data from third Party Test Design Tools according to mapping instructions represented in Inheritance Mapping Data, and delivers the refined data to the Inheritance Staging Data tables.

Inheritance Staging Data 12 This data is accessed by the user through the User Adoption functionality. It is edited and then accepted by the user.

Adopt Task—User Review, Edit, and Accept for Adoption 13 In this task the user reviews the Inheritance staging data, re-orders test steps as needed, reconciles orphan objects to the Object Navigation Tree either by matching a tree object to the test step or by creating a missing tree object. This task creates a list of orphaned methods, which can be used to set up a backlog list of object::methods and functions needed. After review and completion of correction of mandatory revisions, the user can opt to import all tests. If in options, the application is configured to allow orphans, the orphans are flagged, and the inherited tests are adopted.

Adoption & Integration Operation 14 Once the user completes the adoption task which accepts the inherited data from a 3rd Party Test Design Automation Tool, this integration operation adds the scripts to Script Executive Data.

Approve Task—Reviewer User approves test scripts 15 In this task, the reviewer user reviews and approves test scripts. This task is intended to verify that business users have reviewed and approved test scripts. Where the user rejects a test script, he or she is prompted to enter review comments to advise the test design analyst of required remediation of script deficiencies to gain approval. This task also allows for approval by Quality Control agents. All approvals require the approver to electronically sign employing their login ID and password. Approvals are date-timestamped when the users ID and password are accepted. Approvals can be applied to individual test scripts or to defined batches of test scripts. When the review cycle is complete, data is integrated with Test Script Executive Data.

Review and Approval Data 15a Review and approval data consist of the Reviewer's User ID, Name, Role, Date-Time of verdict, verdict (approve/reject), and Rejection advice. This data is integrated with Test Script Executive Data upon completion of the approval process.

User ID & Privilege Data 16 This data collection consists of User ID's, User Names, Role, encrypted password, and access privileges for menu item access. Menu items not in the user's access list are hidden during his or her work session. The architecture provides for implementation of Active Directory.

Test Suite Repository & Test Suite Task 17 Test Suite collections are Named in this task. Test scripts are added or deleted to Named Test Suite Collections. From this task selected tests and collections are executed. The Test Suite Repository hosts data that defines test suites, including execution status (date-time executed and test result). Each test suite defines the specific order in which its tests are executed.

Thus, the various data elements 8, 8a, 9, 9a, 10, 11, 12, 13, 14, 15, 15a, 16 and 17 communicate with the user task and software operations and integrate with other pages in the software module B, C, D, J, K and M as will be discussed further below.

Figure 3:
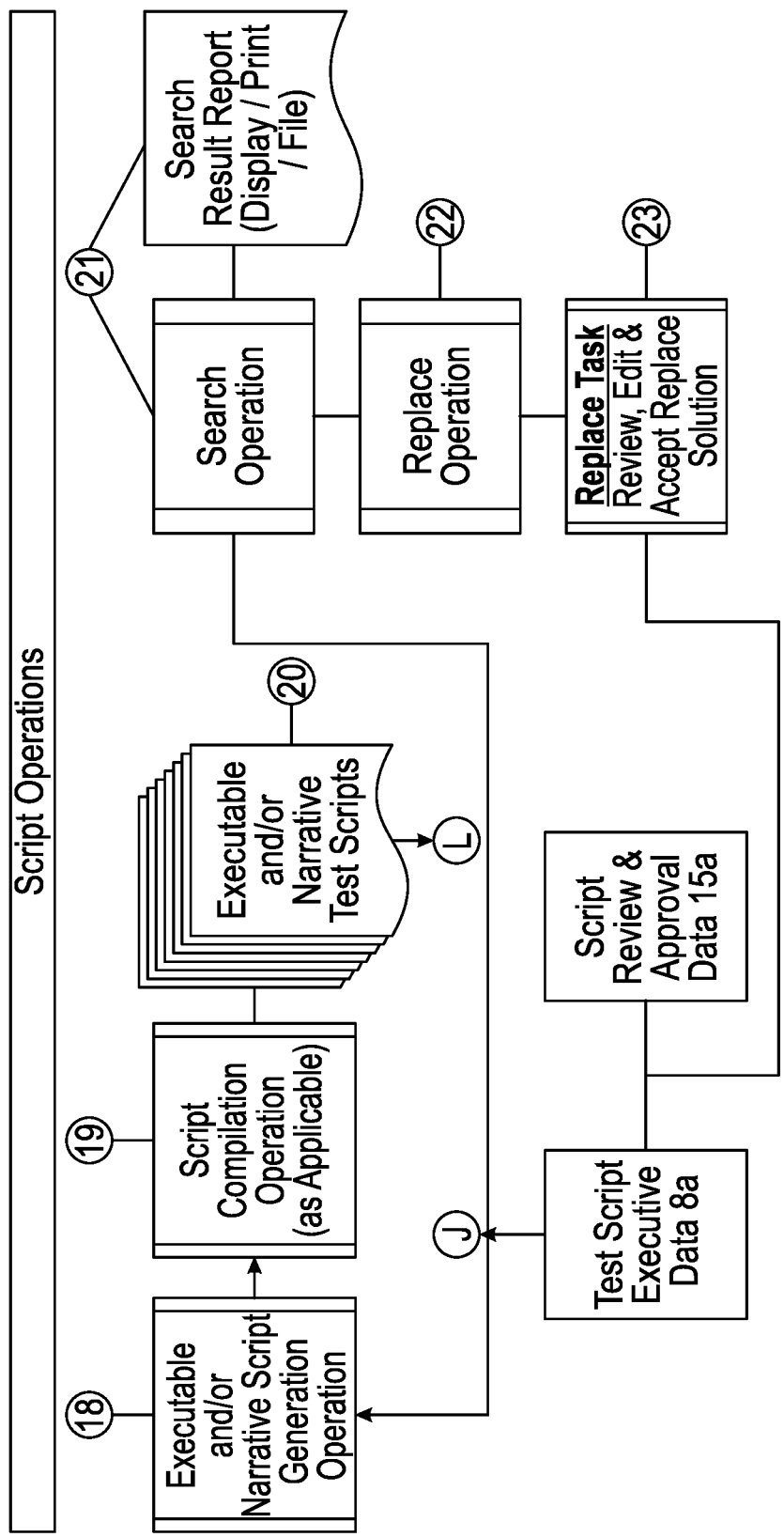
FIG. 3 is a block diagram illustrating script operations in accordance with some embodiments of the present inventive concept.

Referring now to FIG. 3, a block diagram illustrating various script operations will be discussed. The various blocks illustrated in FIG. 3 will be defined below.

Executable and/or Narrative Script Generation Operation 18 This operation consumes Script Executive Data and its links to Method executable scripts and Narrative script instances, replicating the script and replacing script tokens with the real of the token class data residing in Script Executive Data. One or two files are generated. If the user picks Narrative Scripts, only the Narrative script is generated and saved with the suffix of ".txt." If the user picks Executable Scripts, both the Narrative and Executable file is generated. When the Executable Script is generated, each step is delimited by a programming remark statement that contains the narrative accompanying that test step. The files are deposited in the drive directory specified by Options in the Project menu. If the test engine consumes the uncompiled script with its command interpreter, the executable script is suffixed as required by the test engine application. If the test engine requires a separate application object structure file, it is generated in the format and syntax required by the engine. When scripts are generated, the new version (date-time stamp) is added to Test Execution Data, so that users can distinguish whether a newer version of the test has been executed.

Script Compilation Operation (as applicable) 19 If the test engine for which the script is being generated requires compilation, a third, compiled file is created with the same naming convention. The source file is suffixed with ".src", and the compiled executable file is suffixed as required by the test engine application.

Executable and/or Narrative Test Scripts 20 The framework application generates between 1 and 4 script related files for each test script. These are written into the directory designated in Options: (1) Narrative (colloquial language) script files; (2) Source file scripts; (3) Non-compiled executable scripts are suffixed as required by the test engine's command interpreter; and (4) Compiled executable scripts: comply to the test engine's naming convention for the source code script and the complied executable script.

Search Operation and Report 21 The search operation permits the identification of test headers and/or test steps within a project. Search filters can be configured and saved to identify (non-limiting examples): Test Steps that contain shared object instances. (used to assess change impact); Orphaned Test Steps; Test Cases that need Tier 2 Issue Resolution; Test Cases that are undergoing Tier 1 Issue Resolution; Test cases promoted to production; Automation Engineer's work backlog; and Tests with Failed test runs. The report lists all information for tests and test steps that meet the search criteria. The report is initially displayed with an option to save a digital copy or print. When the report is displayed, users may hyperlink to specific test cases or test steps.

Replace Operation 22 The replace operation replaces a targeted Object::Method combination with revised Object::Method combination across all test steps where the target occurs. The operation creates a proposed substitution report that takes effect in Test Script Executive Data when accepted by the user.

Replace Task User Review, Edit, & Accept Replace Solution 23 In this task, the user reviews the proposed revisions from the Replace operation, edits the results and then accepts or abandons the proposed revisions. Once accepted, the revisions are incorporated into Executive Test Data.

Thus, the various data elements 18, 19, 20, 21, 22 and 23 communicate with the user tasks, software operations and integrate with other pages in the software module J and L and can generate various reports, for example, executable and/or narrative test scripts and search result reports (display print/file) as will be discussed further below.

Figure 4:
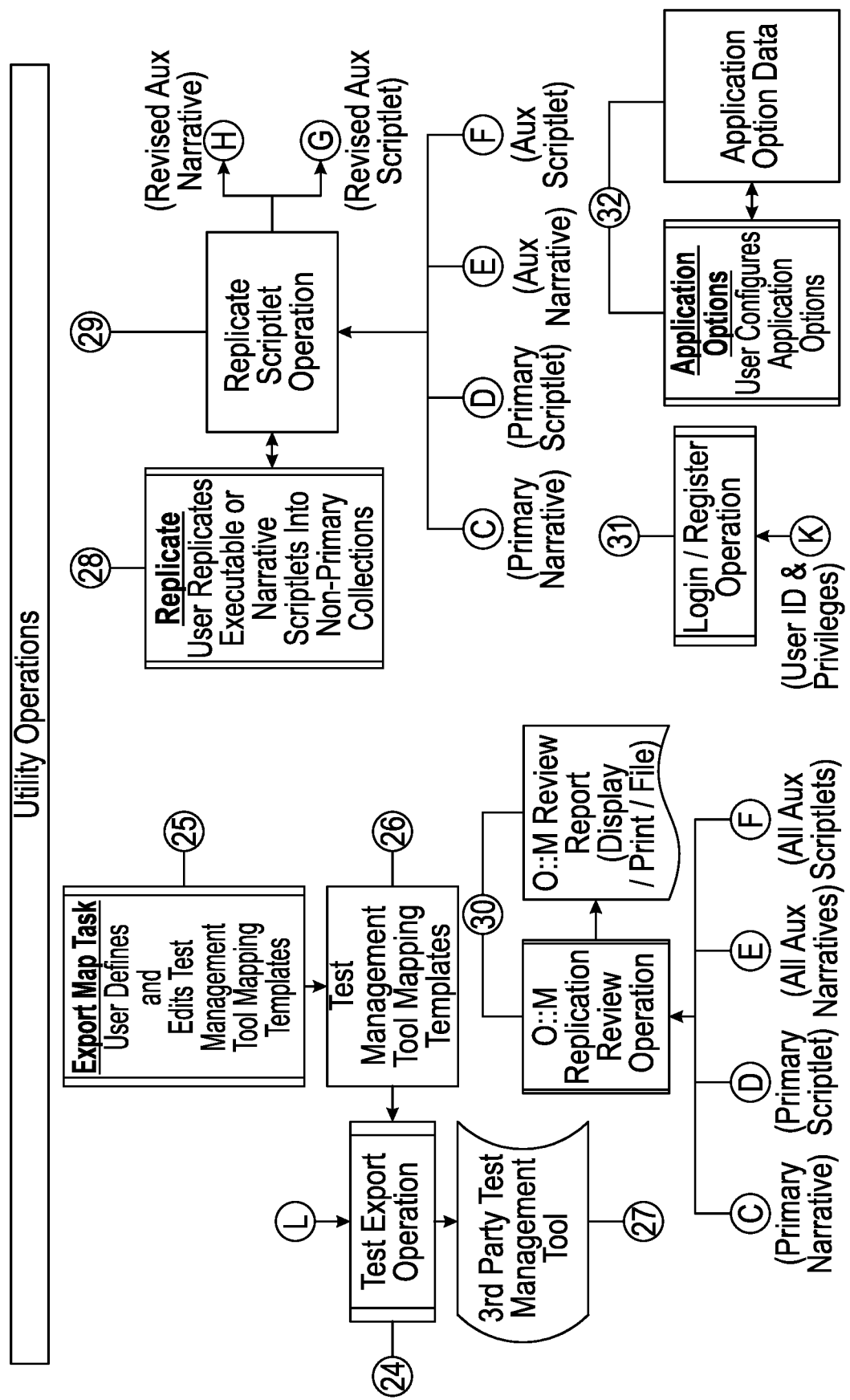
FIG. 4 is a block diagram illustrating utility operations in accordance with some embodiments of the present inventive concept.

Referring now to FIG. 4, a block diagram illustrating utility operations in accordance with various embodiments of the present inventive concept will be discussed. The various elements of FIG. 4 will be defined below.

Test Export Operation 24 Generated test scripts can be exported to third party test tools for test execution, reporting, and approval.

Export Map Task 25 User defines and edits test management tool mapping templates. In this task, the user defines or refines the mapping template to transform test framework script data into values and formats compatible with the import function of the third party test tool.

Test Management Tool Mapping Templates 26 These templates define the data mapping and transforms used by the Test Export Operation to compose a file that can be imported by the third party tool. The export file is placed according to the configured option for this operation.

Third Party Test Management Tool 27 The Third party test management tools include HP-ALM, IBM Test Manager, and others. This framework application supports the export and translation of test related data to these 3rd party platforms through configurable templates that transform exported data into formats that can be consumed by the tools' import utility.

Replicate Task 28 In this task, the user picks from a list of non-primary Narrative or Executable scriptlets and pulls the selected scriptlet to the screen. The corresponding primary scriptlet is displayed alongside. Fore Narrative Scriptlets, the user translates the language of the primary scriptlet, or verifies the synthetic translation in the target non-primary scriptlet, sets the state of the translation, and saves. For Executable Scriptlets, the primary scriptlet acts as a reference for scripting the non-primary executable scriptlet in the language of the target test execution engine; the user continues, selecting the next target; and the user has the option to filter tasks by scriptlet status, language, tool, object, and/or method.

Replicate Scriptlet Operation 29 This is the functionality that supports the user's interaction with scriptlets in the replication effort. The operation lists all non-primary scriptlets for a target language or test engine, flagging scriptlets' status (Blank, In Progress, Pending, Tested [Executable] or Verified [Language]). Non-primary scriptlets are re-listed each time the user changes filtering parameters or saves a scriptlet with a different status. For all scriptlets in the "Blank" status, it accesses the translation application programming interface (API) and posts a synthetic translation to the target scriptlet, changing the state to "In Progress."

O::M Review Operation and Report 30 Where only the primary Object::Method Executable (3a) and Narrative (4a) scriptlets are used, this utility is hidden. If there are two or more instances of narrative or executable scriptlets this operation lists O::M instances for review. It allows for filtering of blank or keyword (include/exclude) records in non-primary instances of scriptlets. The Developer uses this report to close gaps and make corrections. The report is initially displayed with an option to save a digital copy or print Login/Register Operation 31 The login operation identifies the user and assigns the access privileges from user ID and privilege data (Privileges) to be used in his or her login session. The register operation uses the same component and U/I, wherein the password entered by the user is adopted by the application, unless the application is supported by Common Directory.

Configure Options Task 32 The Test Administrator Configures Application Options here. Application Options Include the following: Timestamps (pulldown—one and only one); YYYYMMDD HHMM 24 Hour; YYYYMMDD HHMM am/pm 12 Hour; Requirements Risk (pulldown— one and only one); High/Med/Low (text); 0 (no risk) to 5 High risk (numeric); Test Type Pulldown Values (up to 10 values—defaults shown); System; UAT; Smoke; SIT and Regression. The various user tasks, software operations, data and reports interact with another as shown in FIG. 4.

Figure 5:
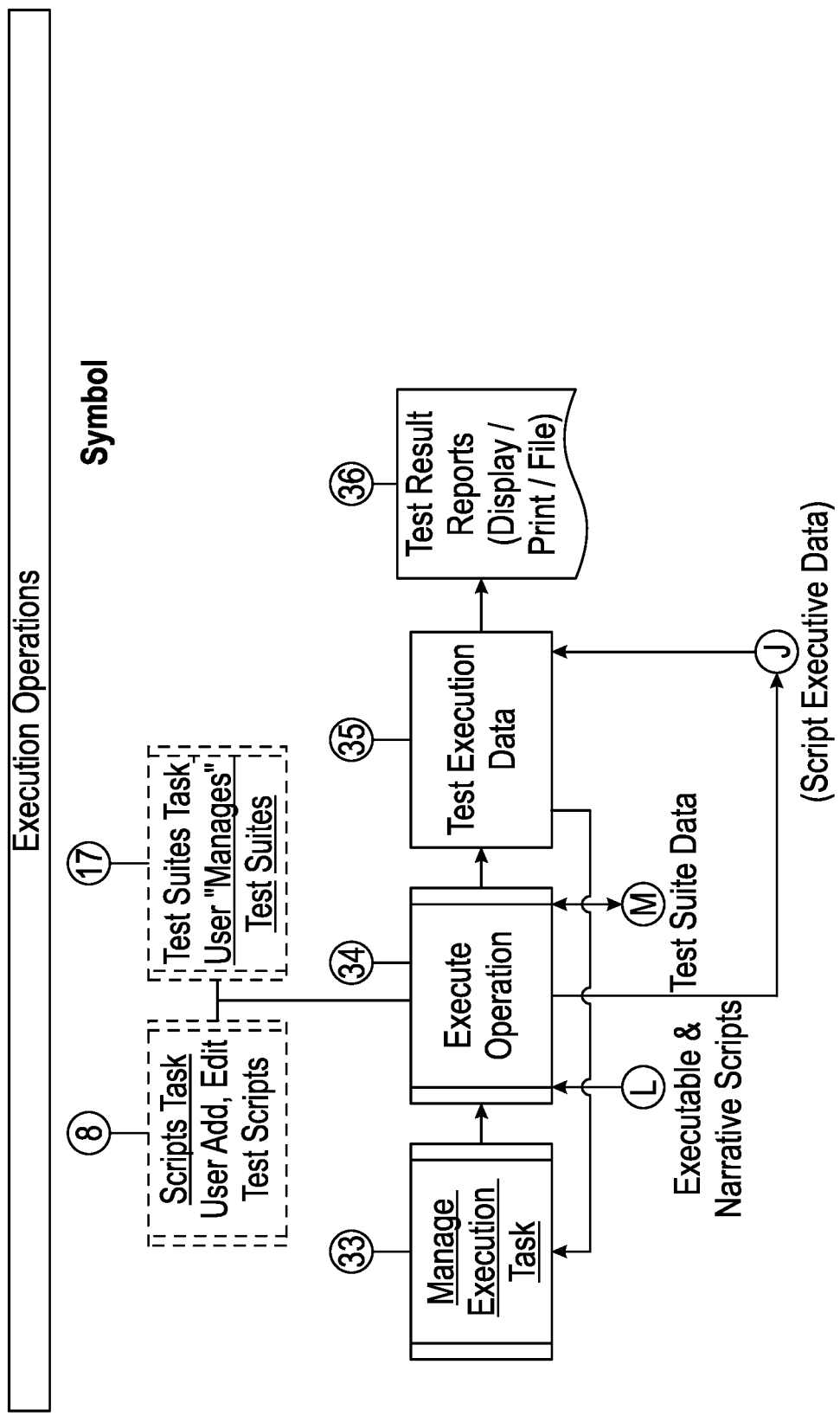
FIG. 5 is a block diagram illustrating execution operations in accordance with some embodiments of the present inventive concept.

Referring now to FIG. 5, a block diagram illustrating execution tasks in accordance with some embodiments of the present inventive concept will be discussed. The various elements of FIG. 5 will be defined below.

Manage Execution Task 33 In this task the user selects individual tests, collections of selected tests, and/or test suites to execute in a specified sequence. The user filters test execution results by run date-time, pass/fail outcome, run status (run/no run), by object instance and/or by method instance.

Execute Operation 34 The execute operation can be invoked from the Script Task, the Test Suites Task or the Manage Execution Task. When evoked from the Script Task, the operation executes the test script being accessed. When evoked from the Test Suites Task, the operation executes selected test suites.

Test Execution Result Data 35 Each time a test is executed it fails (doesn't execute to the last step due to a script error, or executes to the last step, yielding unexpected results) or passes (all test steps are executed, achieving expected results). These outcomes are logged as test execution result data in flat files. Script ID; Script Name; Script Version (Date-Time); Execution (Initiation Date-time); Errors logged (if any); and Result (Pass/Fail).

Test Result Reports 36 Test results are filtered by suite, execution date, execution time, script prefix, object instance, method instance, result. The filter results are displayed and can be printed or saved to a flat file.

Details and definitions with respect to the various elements 1 through 36 of FIGS. 1 through 5 will now be discussed. Registers user (block 31): once a user is assigned an ID by the tool administrator, the user goes to the login screen. If the application is supported by Common Directory, the user logs in using their established password. If not, the user is prompted to enter a new password. They are then registered. Login User (block 31): the application captures and validates the user's input ID and password values against those on record. It fails the login where credential don't match records and grants access to the home screen if credentials are valid.

Manage Object Classes (block 5) Supports the creation, revision, and deletion of object classes, which consist of an icon and an object name, for example, Entry Field. If the user attempts to delete an object class in use, an error message is issued with the option to display all tests and/or methods that use the object class. Where the object class is revised, the revision is inherited by all subordinate usage instances.

Manage Method Names (block 1) Supports the creation, revision, and deletion of methods (actions) that are assigned to specific object classes. The user must first select an object class, and then add methods that can act upon that class of object. For example, for Entry Field, the user can add methods "Enters", "Erases", "Validates Value", "Validates enabled", "Validates disabled", "Validates displayed", "Validates hidden". Method definition includes the designation of user inputs needed to execute the method, if any. Prevents the user from deleting methods in use by test scripts by issuing an error message with an option to display the tests and object::method scripts and narratives that employ the method. Where the method is revised, the revision is inherited by all subordinate usage instances.

Manage Object Navigation (block 6): Supports the creation, revision, and deletion of screen and application object class instances in a navigation tree with branches for applications, application pages and dialog boxes. Prevents the user from deleting screen object instances in use by test scripts by issuing an error message with an option to display the tests that employ the object instance. Where object instances are revised, the revision is inherited by all subordinate usage instances.

Manage Script Prefixes (block 7): Supports the creation, revision, and deletion of test naming prefixes, used to sort tests into groups. Prevents the user for deleting prefixes by issuing an error message with an option to display the tests that employ the prefix. Up to 50 tags can be assigned to a single prefix. These tags are inherited by the test case assigned the prefix. Where prefixes are revised, the revision is inherited by all subordinate usage instances.

Maintain Common Functions (block 4) Supports the construction of a library for callable functions in the native execution engines programming language. For example, error trapping, test result capture, test execution reporting/logging into a flat file. Other callable functions could include the location of a specific cell in a table, table operations, and others. Callable functions names are included in generated test scripts where not specifically invoked in methods.

Maintain Object::Method Narrative Scriptlets (blocked 2, 2*a*): Supports the creation, revision, and deletion of application default language for narrative test Scriptlets. This capability can be accessed by designated test analysts or automation engineers. Narratives must be defined as a prerequisite to creation of related executable Scriptlets (Use Case #8). Users choose objects from the Object Class Repository, and associate methods compatible with the chosen object. Language narratives link the operation of these objects to the selected method with token placeholders < > that will be used when a test step is defined. For example:

User Enters <data description> into Entry Fieldname

Narrative Scriptlets carry the following status: New—No content (automatic); In Progress—Some Content (automatic); Verification Pending—Unverified Scriptlet Language (manual); and Verified OK— Scriptlet Language Verified and Passed (manual). The application sets the status to "New" when the scriptlet is established and there is no content. When the user saves the scriptlet with any content, the status migrates automatically to "In Progress." When the user finishes the scriptlet he or she manually migrates the status to "Verification Pending." This puts the scriptlet in the reviewer's work backlog. When the reviewer verifies the language, he or she migrates the status to "Verified OK." This signals to all analysts the scriptlet can be consumed in test steps. The date-time stamp and ID of the last user to save the record is recorded as well.

Maintain Object::Method Executable Scriptlets (blocks 3, 3*a*) Supports the execution scripting for an object::method pair. The test automation engineer. Tokens for the object, data, and method are inserted with scripting aids to ensure proper referencing into the script by the author for later replacement in test step definitions and test generation. Execution Scriptlet records carry a status as follows: New— No content (automatic); In Progress—Some Content (automatic); Test Pending—Untested Scriptlet (manual); Effective—Scriptlet Tested and Passed (manual); and Tier 2 Fix—Scriptlet undergoing Tier 2 maintenance (manual). The application sets the status to "New" when the scriptlet is established and there is no content. When the user saves the scriptlet with any content, the status migrates automatically to "In Progress." When the user finishes the scriptlet he or she manually migrates the status to "Test Pending." When the user completes a satisfactory test of the scriptlet, he or she set the status to "Effective." This signals to all analysts the scriptlet can be consumed by test steps. If an analyst's test script fails due to an error in the scriptlet, the analyst must set the test script to "Tier 2 Fix" status. When the automation engineer opens the scriptlet to fix, he sets the scriptlet to the same status. When the scriptlet has been tested, the automation engineer sets the scriptlet status to "Effective" and the test case to status "In Progress." The date-time stamp and ID of the last user to save the record is recorded as well.

Manage Users & Privileges (block 16) The tool administrator sets up user groups and privileges for access to application menu items. Where a user does not have access authorization, the menu item does not display on the application U/I for that user. The administrator defines a user group, and then selects the privileges to be associated to that group. For new users, the administrator assigns a user ID and designates the group for which the ID belongs. This functionality also supports the deletion of a user ID (which also deletes the associated, encrypted password if Common Directory is not in use).

Maintain Test Scripts (block 8, 8*a*) Test analysts create, revise, and delete test scripts and Test Steps. Test Scripts are collections of Test Steps. Child Use Cases Include: Maintain Test Header and Maintain Test Steps.

Maintain Test Header (blocks 8, 8*a*) Test Analysts maintain test headers assigning field values for the data listed in "Test Header" field map. A test header allows assignment of up to 100 tags per test, including the tags associated with the assigned test prefix. The application does not allow duplicate tags, nor does it allow the deletion or alteration of prefix related tags from test headers. Test headers are a collection of test attributes used to filter tests for reporting and management activities.

Maintain Test Step (block 8, 8*a*) Test analysts create, edit, and delete test steps to complete a test case against targeted functionality in the application under test. Here the analyst calls up an existing test step for modification or deletion or adds a test step. When adding a test step, the analyst chooses an object instance from the Object Navigation Tree. Thereafter the analyst is presented with a list of methods associated with the object's class. Once the method is accepted, the default language script is displayed with blanks wherein the analyst can fill in related test data. For example, for a "First Name" field, the analyst fills in the first name data to be used in the test. Where a test step is to be changed, the analyst can pick a different object instance and/or method. For test intended test steps not supported by existing Object::Method combinations, the analyst can add an "orphan" test step, which is rendered in red font. These will become a work queue/backlog for the Automation Engineer (see use case "Identify Orphans").

Call Existing Test: The analyst wants to execute an existing test as a test step in the current script (e.g. Login User), before continuing with new test steps. Each test stores data driven test steps in their header, which is used as an API for that test. For example, the test "Login User" will have two data inputs, with Step 1 calling up the login page. Step 2 would have the object::method of "User ID"::"Enter", step 3 would have "Password"::"Enter". This would show up in the test step when the user chooses "Function" as the Object, and "Execute Test" as the method. The system lists all tests with the field "Callable (Y/N)" set to "Y" and test status set to "Effective." The test step would be rendered as follows on the screen:

Step 0003-Function Execute Test AppModA—Test 00001 Login User (Acct Summary)
   User ID: _____
   Password: _____

The analyst would enter the values to be passed to the Login User Test in step 00003.

Generate Test Scripts (block 18, 19 and 20): The analyst opts to generate a test script in the execution languages provisioned in the tool. The action generates narrative scripts in the provisioned languages and executable test scripts for all provisioned executable languages. The executable scripts are remarked in the default language with the test step number and narrative. If a provisioned tool operates on compiled scripts, the application generates a source code file and then compiles it.

Search Test Scripts (block 21): The analyst is able to search and filter test scripts by several criteria: Object Class, Object Class Instance (taken from the Object Navigation Tree), Method, Method Test Data, Test Attributes, including but not limited to tags, title, description. The purpose of searches is to lay out object change impacts, page change impacts, isolate legacy object instances so that object instance changes can be replaced in the "Replace Test Script" use case. As well it is to establish traceability to or from test cases and requirements or L1-L5 Business Processes.

Replace Test Script Elements (blocks 22 and 23): The analyst is able to target a single object instance and method across all test cases that employ it—replacing the object instance and method test step with a new test step. This supports the rapid adaptation of test scripts to new application releases that impact page content or flows.

Export Test Scripts (blocks 24, 25, 26, 27): The analyst uses this functionality to export narrative test scripts to supported test management tools, such as HP-ALM or IBM's Test Manager. The export of executable scripts is also supported.

Replicate Object::Method (blocks 28 and 29): The analyst or automation engineer can target replication of all Object::Method combination definitions in the default language to a new narrative language. Automated translation is optional. If not automated the default language instances are replicated and then translated manually. Alternately, the analyst or automation engineer can target replication of all Object::Method coding for a new execution tool. The utility replicates the coding used to support the default tool. The coding is then manually translated into the programming/scripting language for the tool being implemented.

Replicate Test Scripts (blocks 28 and 29): The analyst or automation engineer uses this functionality to replicate existing narrative test scripts into a new language to be supported, provided the Object::Method combinations have been set up for the new language (i.e. translation is complete). This is the same functionality that generates narrative tests. It builds all of narrative scripts in the new language, leveraging the translation for each Object::Method combination. Alternately the automation engineer uses this functionality to replicate all executable scripts in the language of the new automation tool. This is the same functionality that generates executable/compiled tests. It builds all test scripts in the new execution language.

Review O::M Replications (block 30): The automation engineer uses this report to review non-primary O::M execution instances to identify those instances that need further work. The user can filter for blank (no executable) or keywords, and keyword combinations (include/exclude).

Import Test Scripts (Blocks 9, 9*a*, 10, 11, 12, 13 and 14): The Test Administrator defines inheritance templates (mapping from tool generated tests to Object::Method primary instances) Here the user kicks off the import of the test script file from a third party test design tool or a test management tool.

Maintain Import Inheritance Templates (blocks 9, 9*a*): The Test Administrator, Test Analyst, or Automation Engineer establish new templates, and update or delete existing templates. A template is a mapping document unique to each import tool, and is used to translate test text into existing object::method test steps according to the object instance in the Object Navigation Tree. The template supports parsing of the inbound script in the identification of keywords that map to Object::Method combinations.

Adopt Imported Scripts (blocks 13 and 14): The Inheritance Mapping Operation parses inbound scripts in accordance with the Import Inheritance Template. The product of this operation is written to Inheritance Staging Data. Here test scripts that mapped successfully are shown in Intelliframe Tool's standard test step display convention. Test Scripts that were not successfully converted are displayed in a text format in red, showing that further manual work is needed for them to be adopted. In this functionality, the user adds a conventional test step as they would in the "Maintain Test Step" module. The user inserts a new test step below the red test step using the red narrative as a guide. Once the test step is completed, the user deletes the red test step. Upon completion of a test case, the user can elect to "Adopt" the test case. Upon adopting the test case, it is copied from the staging area into Test Script Executive data, then deleted from the staging area.

Test cases with red test steps can be adopted. This would usually happen if Object::Method records do not exist for the intended test step. These red test steps are called "orphans." The Automation Engineer or Analyst then uses the Identify Orphan use case to list all orphans for adoption into newly configured Object::Method combinations.

Identify Orphans (block 21): The Automation Engineer uses search functionality to identify all orphan test steps, then works with Analyst to develop the Object::Method combination needed to support the new test step. Analysts use the search functionality to identify orphan test steps flagged as ready for adoption by the Automation Engineer, where new Object::Method combinations have been defined for the orphaned test steps. For "Ready" orphaned tests, the user can hyperlink to the test in Test Executive data from the orphan ready report.

Manage Test Suites (block 17: The Test Administrator can call up or define a new Suite Tag collection. To define a new suite collection for tests, the Administrator navigates to "Suites" and is presented with a menu of existing Suite tags. The Admin can select or delete an existing tag or define a new tag. In this screen, the Administrator can select at least one test from the dialog pop-up triggered by the ADD command to add the test to the suite. Once added the Test ID and Title are displayed. Other users may access the Suite Tag screen but are not allowed to modify the test list for the suite. They can hyperlink to the test edit screen to review or edit steps if they have permission. From the test script screen, authorized users may add or delete suite tags from the test header attribute "Suite Tags." This adds or removes the test to/from the associated test suite.

Manage Test Execution (blocks 8, 17, 33, 34, 35 and 36): Users are cleared to execute test scripts they authored so that they are empowered to perform Tier 1 maintenance on scripts that fail. Otherwise the user must be authorized to conduct general execution of automated scripts. Authorized users my initiate execution of a single test, selected tests, or selected test suites. For test suites, tests will be executed in the order listed in the test suite, and suites executed in the order selected on the execution management screen. The user names the test run, which is appended with the date/time YYYYMMDD HH:MM (24 hr. clock) the execution starts. Test results are logged to the test step level with Pass or Fail outcomes. Where errors occur, the test under execution is halted and the error captured. Execution proceeds with the next test case listed. Test execution and error logging is defined with callable functions defined in the Common Function Library. This functionality writes to a flat file execution result file with the Test Run Name & YYYYMMDD HH:MM as the file name. When a test fails, the test status is set to Tier 1 Fix, so that the author an perform Tier 1 fix.

Manage Script Faults (blocks 33, 34, 35 and 36): When a user is authorized to execute tests (aside from the tests they author) they can perform Tier 1 maintenance on scripts that fail (or notify the test author to perform the maintenance). All tests being maintained under Tier 1 maintenance can be flagged as "Tier 1 Fix." If the user is unable to resolve an issue encountered in an execution attempt, the test status "Tier 2 Fix" can be set. This will generate an email notification to the Automation Engineer and add the issue to his or her work backlog. When "Tier 2 Fix" status is set, the user must describe the issue to be resolved. When the Automation Engineer resolves "Tier 2 Fix" issues, the test status is set to "In Progress" and an email is generated to the test author.

Display Work Queue (block 21): Users can generate a work queue for Automation Engineers, Test Analysts, and Test Administrators. From the search display screen, the user can link to the work item.

Configure Options (block 32): The Test Administrator completes option configurations in the Option screen.

Figure 6:
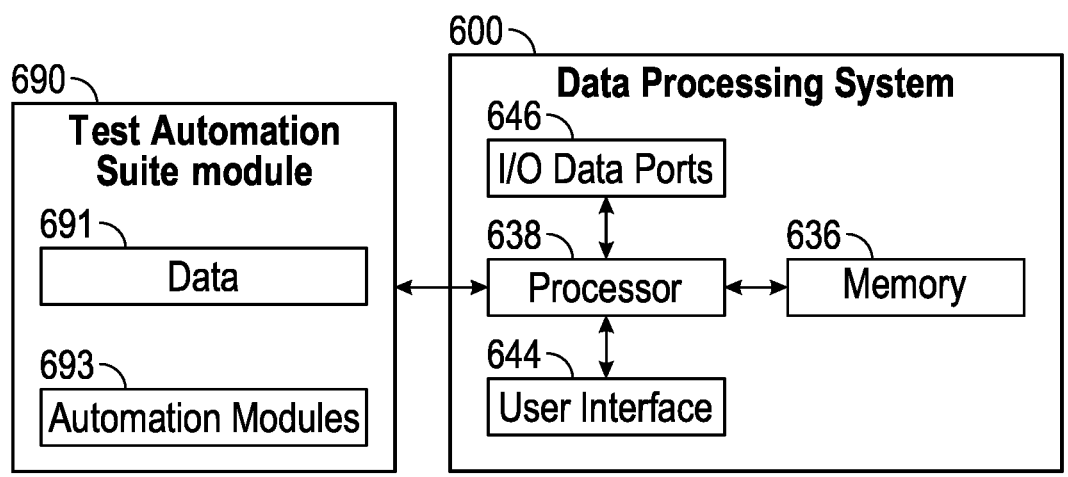
FIG. 6 is a block diagram of a data processing system that can be used in accordance with some embodiments of the present inventive concept.

As discussed above, embodiments of the present inventive concept are performed in as system configured to run tests on software. As discussed above, embodiments of the present inventive concept provide a framework for automation of testing so that an automation engineer does not have to recreate the wheel each time a new project is being tested. FIG. 6 illustrates an example embodiment of a data processing system 600 suitable for use in accordance with some embodiments of the present inventive concept will be discussed. As illustrated in FIG. 6, the data processing system 600 includes a user interface 644 such as a display, a keyboard, keypad, touchpad or the like, I/O data ports 646 and a memory 636 that communicates with a processor 638. The I/O data ports 646 can be used to transfer information between the data processing system 600 and another computer system or a network. These components may be conventional components, such as those used in many conventional data processing systems, which may be configured to operate as described herein. This data processing system 600 may be included any type of computing device without departing from the scope of the present inventive concept.

As further illustrated in FIG. 6, embodiments of the present inventive concept provide a test automation suite module 690 including data 691 and plurality of test modules 693. As used herein, a "test automation suite module" refers to groupings of tests executed together. Test suite modules may be directed to, for example, billing, deposits, reports, shopping cart and the like. Various example, of data 691 and modules 693 of the test automation module 690 will be illustrated and discussed below with respect to FIGS. 7 through 34. For example, the module 693 may include a search module and a replace module (not specifically shown) to perform the search and replace functions in accordance with embodiments discussed herein. However, it will be understood that embodiments of the present inventive concept are not limited to the examples illustrated in these figures.

Referring first to FIG. 7, a diagram illustrating "menus" in accordance with some embodiments of the present inventive concept. The menus may be provided on a user interactive graphical user interface (GUI) and the selection of each link on the menu may take the user to a different page of the automated software test module in accordance with embodiments discussed herein. The "design tool maps" under the "developer" menu may be defined based on the testing modeling tool. Furthermore, the various reports, for example, narrative scripts, executable scripts, test results, error logs, impact reports and the like, can be produced during the pilot. FIG. 7 provides an example of the menus in accordance with embodiments discussed herein, however, embodiments of the present inventive concept are not limited thereto.

FIG. 8 is a diagram illustrating conventions related to print commands, export operations, tag convention and formatting, auto text, date-time stamps and installation in accordance with some embodiments of the present inventive concept. As illustrated, some embodiments of the present inventive concept have an "auto-complete' when searching. When a user types the keyname to call up a record, the system searches for the term types in the search field, here "filter name." When the term "module" is searched, the various records including the term are returned. A user may select these links to get the details of these records. In some embodiments, the date-time stamp is based on a 24 hour clock and has the format of yyyymmdd-hhmm (year (y), month (m), date (d), hour (h), minute (m)). However, it will be understood that this convention may be changed. An installation script in accordance with embodiments discussed herein sets a default language, for example, English; sets a default execution engine; sets a replace filter time to, for example, 5 minutes and sets and import path.

FIG. 9 is a diagram illustrating various use cases in accordance with some embodiments of the present inventive concept. Each of the use cases illustrated in FIG. 9 will have a corresponding set of rules associated therewith.

FIG. 10 is a diagram of a graphical user interface (GUI) illustrating a step in generating a test narrative in accordance with some embodiments of the present inventive concept. In particular, as illustrated in FIG. 10, the test to be run must be defined, to this end, embodiments of the present inventive concept provide test definition tables so that the test can be easily defined. For example, FIG. 10 illustrates the test definition header (table) tab expanded and the details of the test header are illustrated. The various fields, for example, test objective, test description, test type, notes, etc. can be providing by the operator. It will be understood that this is provide for example only and embodiments of the present inventive concept are not limited thereto. More or less information may be provided in the test definition tables without departing from the scope of the present inventive concept.

FIGS. 11A through 11F illustrates further steps in generating a narrative in accordance with some embodiments of the present inventive concept. Referring first to the flowchart of FIG. 11A, operations for generating a narrative begin at blocks 1101/1102 where the user/operator can select a language for the narrative, for example, the language may default to English, but other languages such as Japanese, Chinese, German and the like may be available. The operator may select the language that is native to the operator.

In addition to the test definition header, module in accordance with embodiments discussed herein provide a table for test definition test steps, an example of which is illustrated in FIG. 11B. The operator provides the information in the test definition test steps (block 1102) and is prompted to do so until all steps are completed (blocks 1122 and 1132). Operations proceed to blocks 1103 and 1104 where test step and OM definition data is supplied. An example object, function and OM definition table is provided in FIG. 11C. If the OM or function key is present (block 1123), operations proceed to blocks 1113 and 1133, respectively. The test definition function (block 1143) and function narrative definition (block 1144) feed into function definition data (block 1133) which is discussed further below.

Figure 11A:
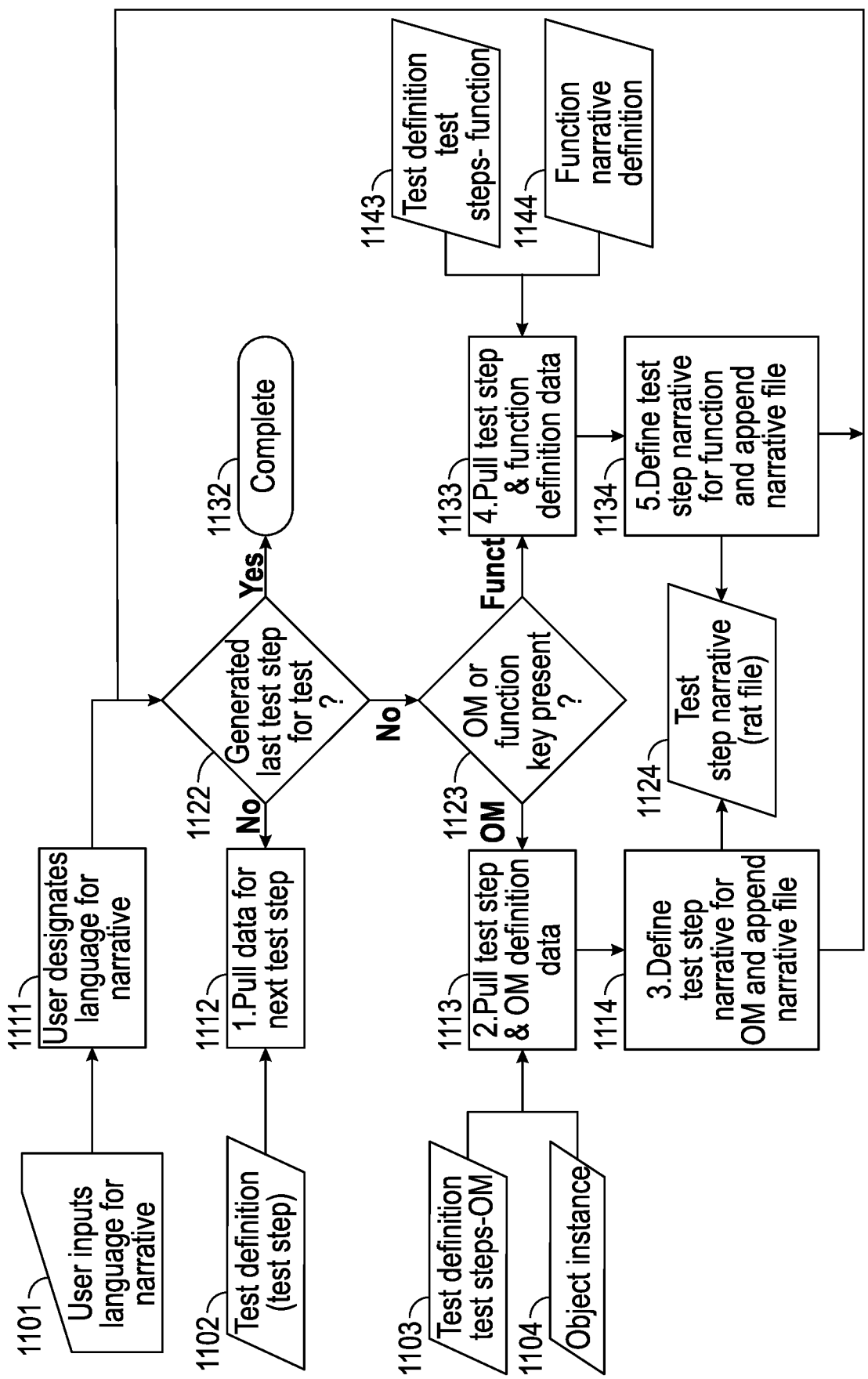
Figure 11D:
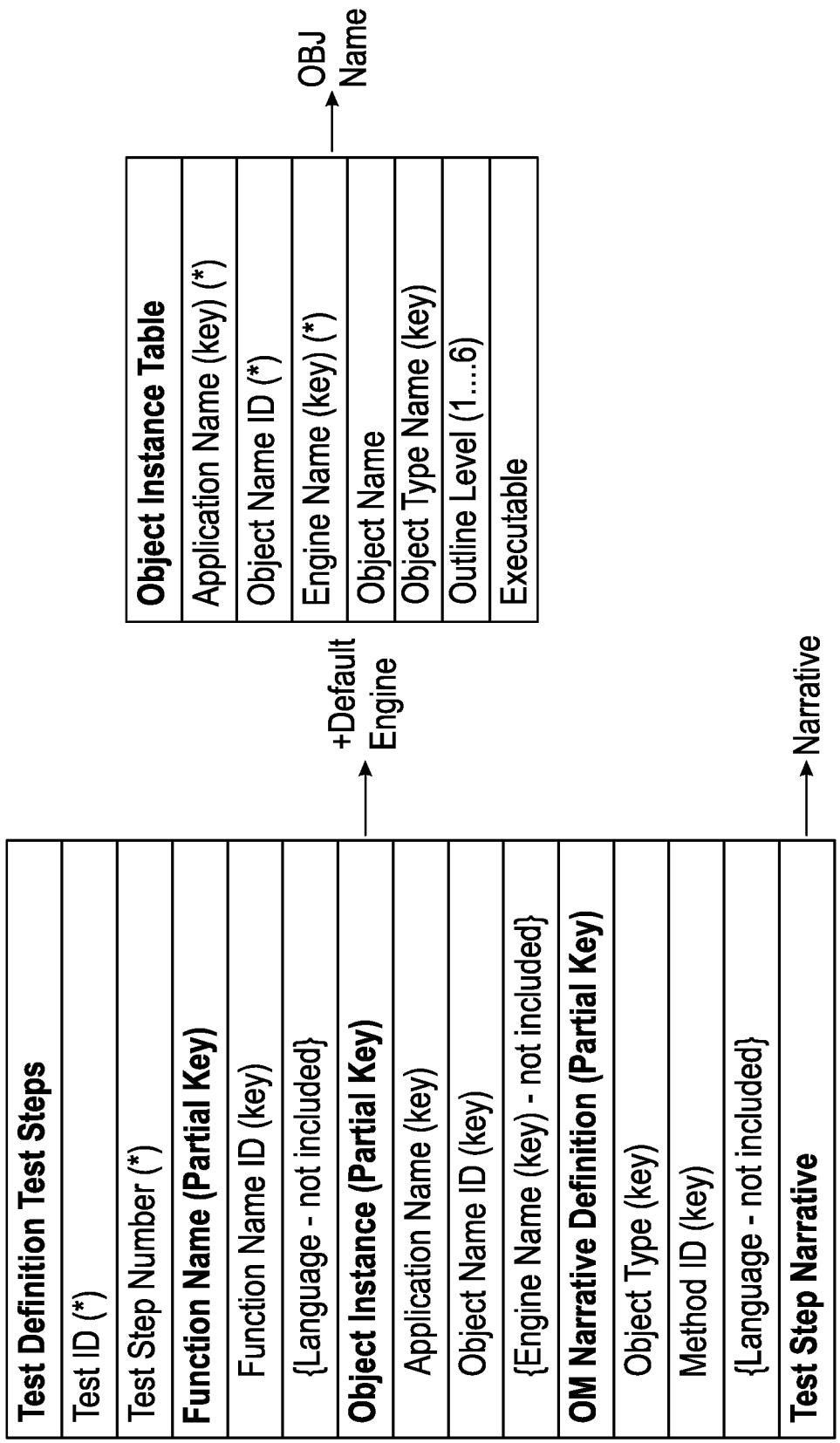
Figure 11E:
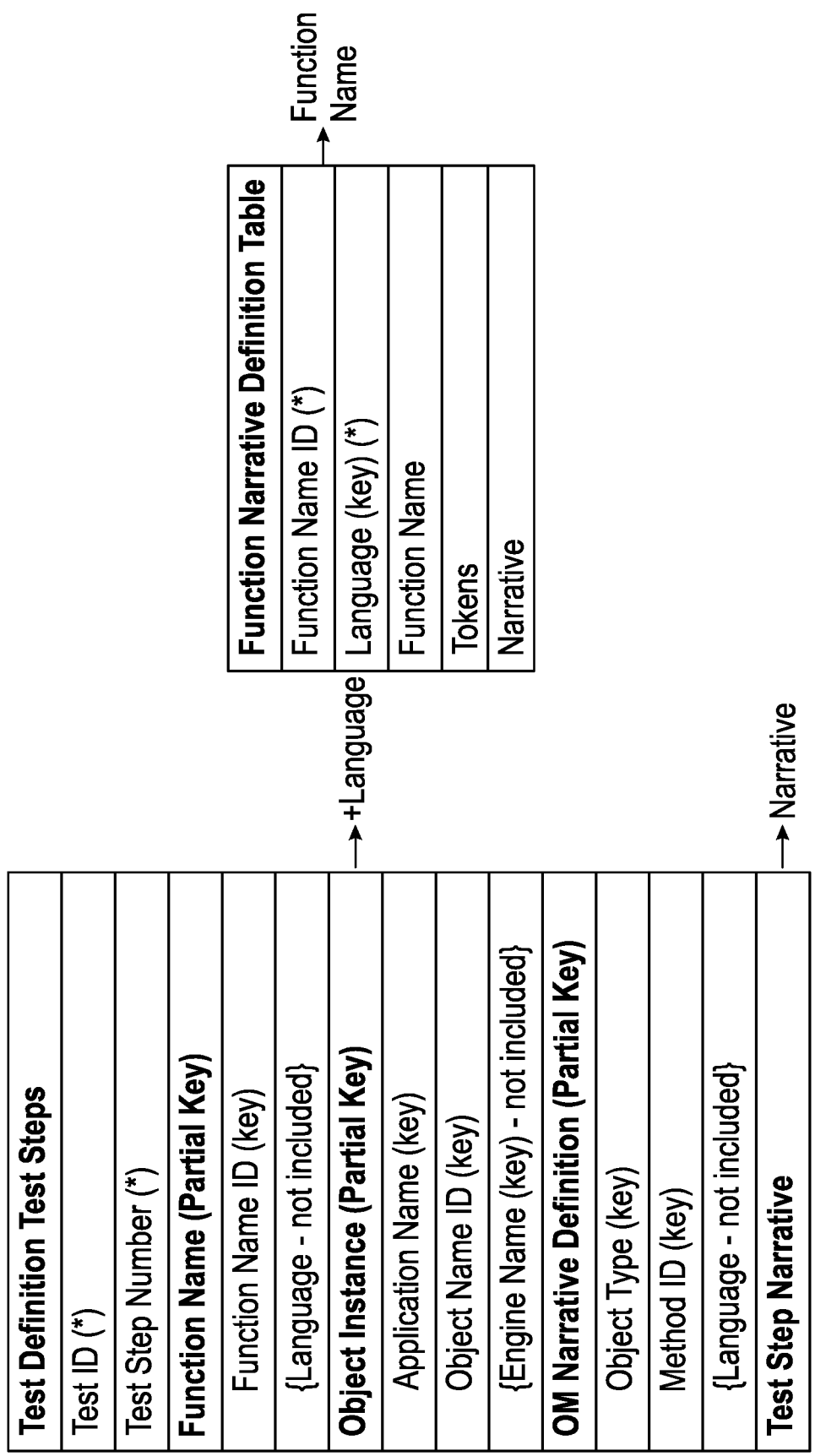

If OM is present (block 1123), the narrative for OM and append file narrative may be completed (block 1114). An example of this data is illustrated in FIG. 11D. If function key is present (block 1123), operations proceed to blocks 1133 and 1134 where the narrative for function and append narrative file are defined (block 1134). An example of this data is provided in FIG. 11E. A completed table include processing data for an OM narrative is provided in FIG. 11F. This is provided as an example only.

Figure 12A:
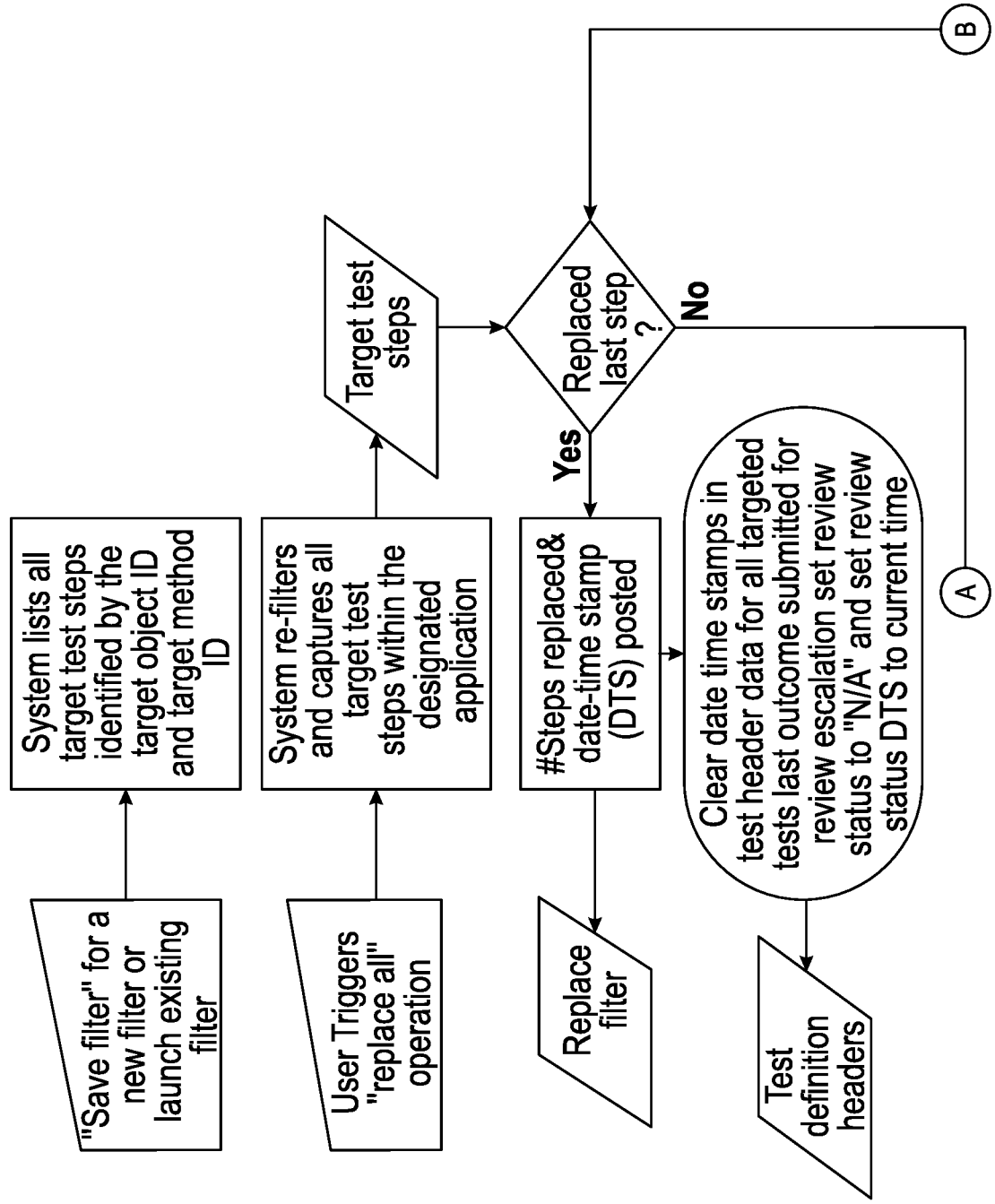
Figure 12A:
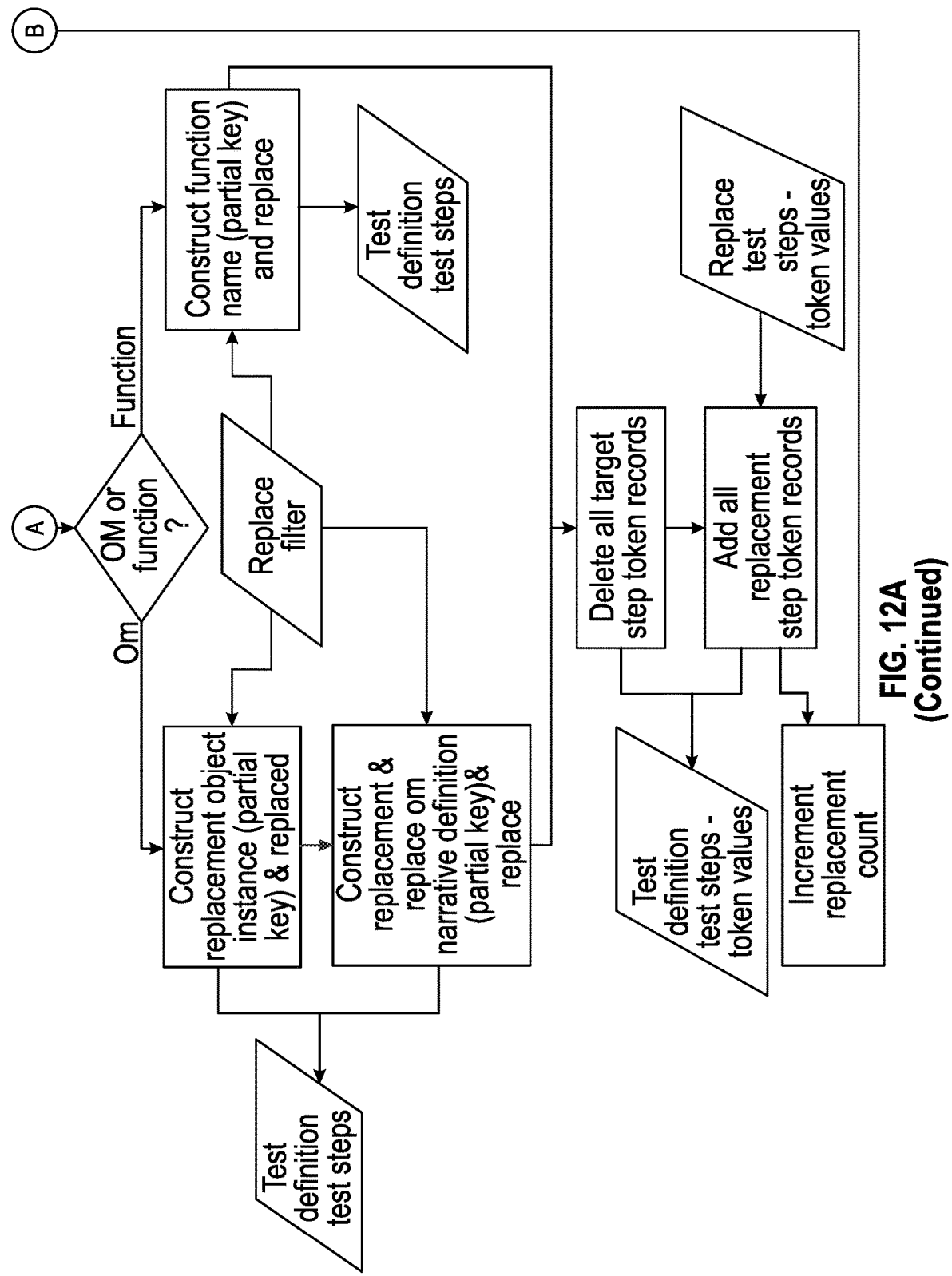

Referring now to FIGS. 12A through 12D, flowcharts and diagrams illustrating replacing filters and related actions in accordance with some embodiments discussed herein will be discussed. FIG. 12A is a flowchart illustrating operations related to the tables of FIGS. 12b through 12C. It will be understood that the flowchart illustrated one particular method with one particular order, this method and the order of the steps therein can be changed without departing from the scope of the present inventive concept.

Figure 13A:
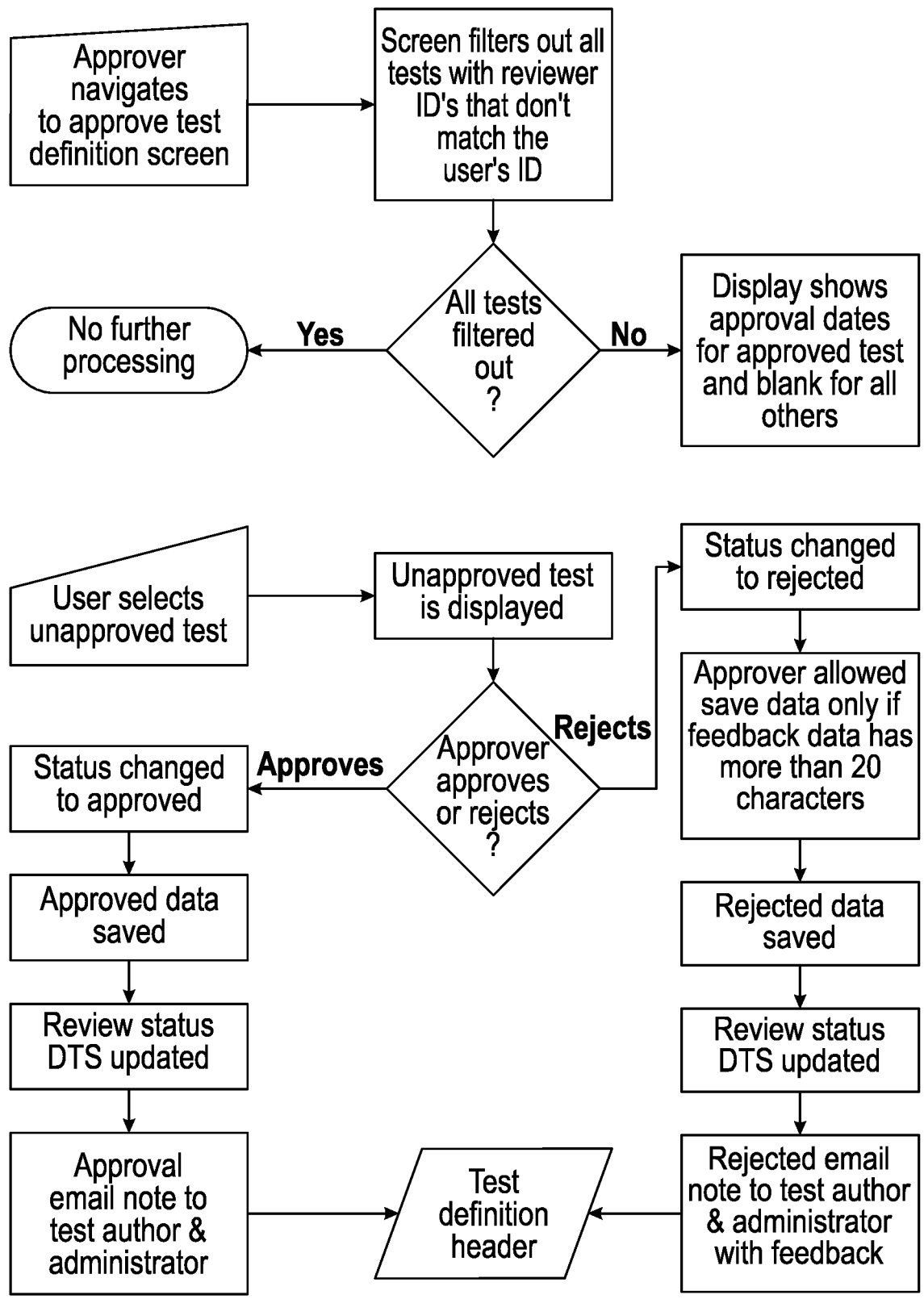

FIGS. 13A and 13B are a flowchart and diagram illustrating approving the test definitions entered by the operator. It will be understood that the flowchart illustrated one particular method with one particular order, this method and the order of the steps therein can be changed without departing from the scope of the present inventive concept.

Embodiments of the present inventive concept may use a standard for implementing automation for software testing. Such a standard is provided by Object Management Group (OMG) and the standard is entitled Test Information Interchange Format. The details of this document are incorporated herein by reference as if set forth in its entirety.

Figure 14A:
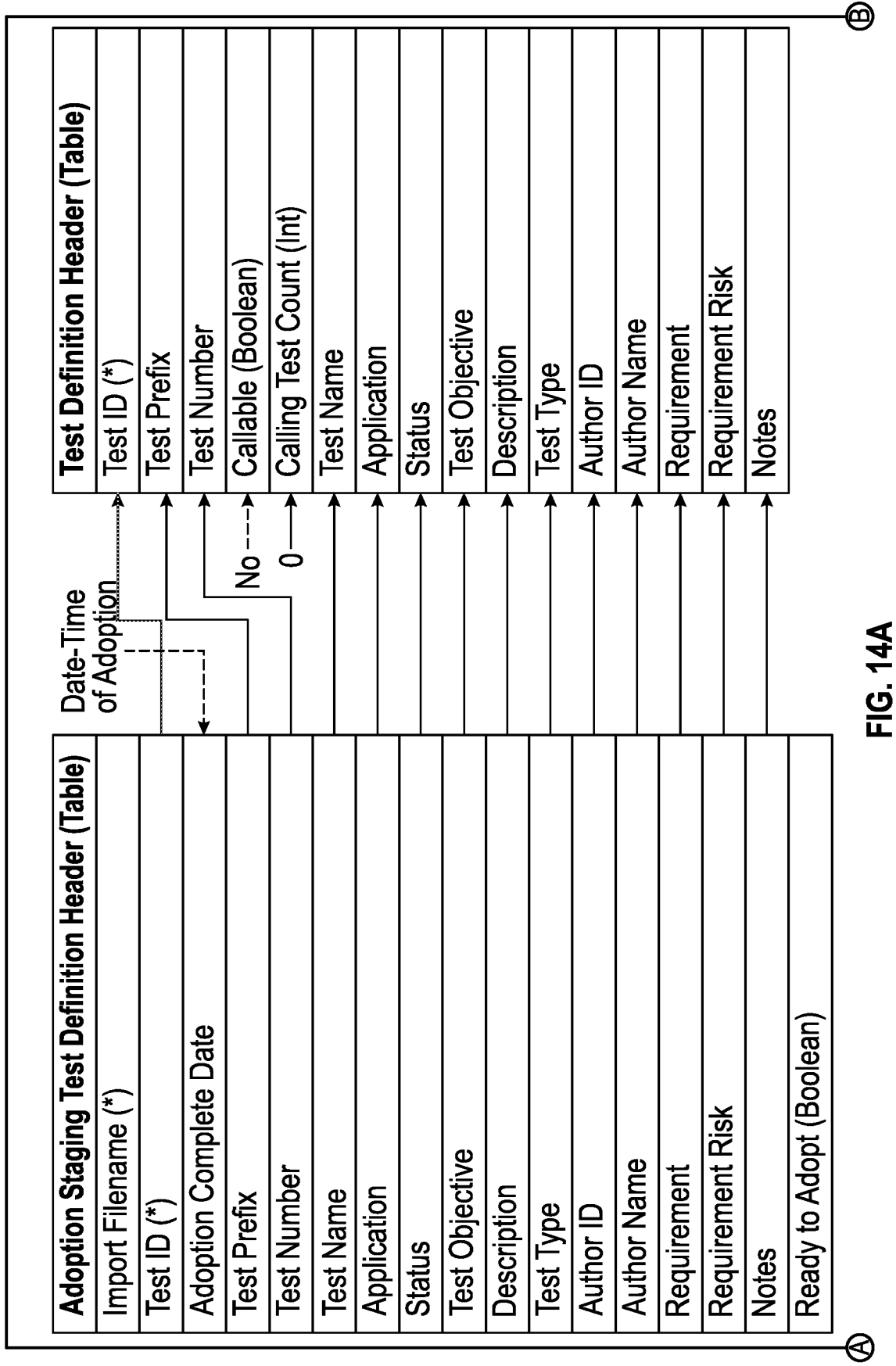
FIGS. 14A and 14B are diagrams illustrating the various data and information for adoption in accordance with various embodiments of the present inventive concept.
Figure 14A:
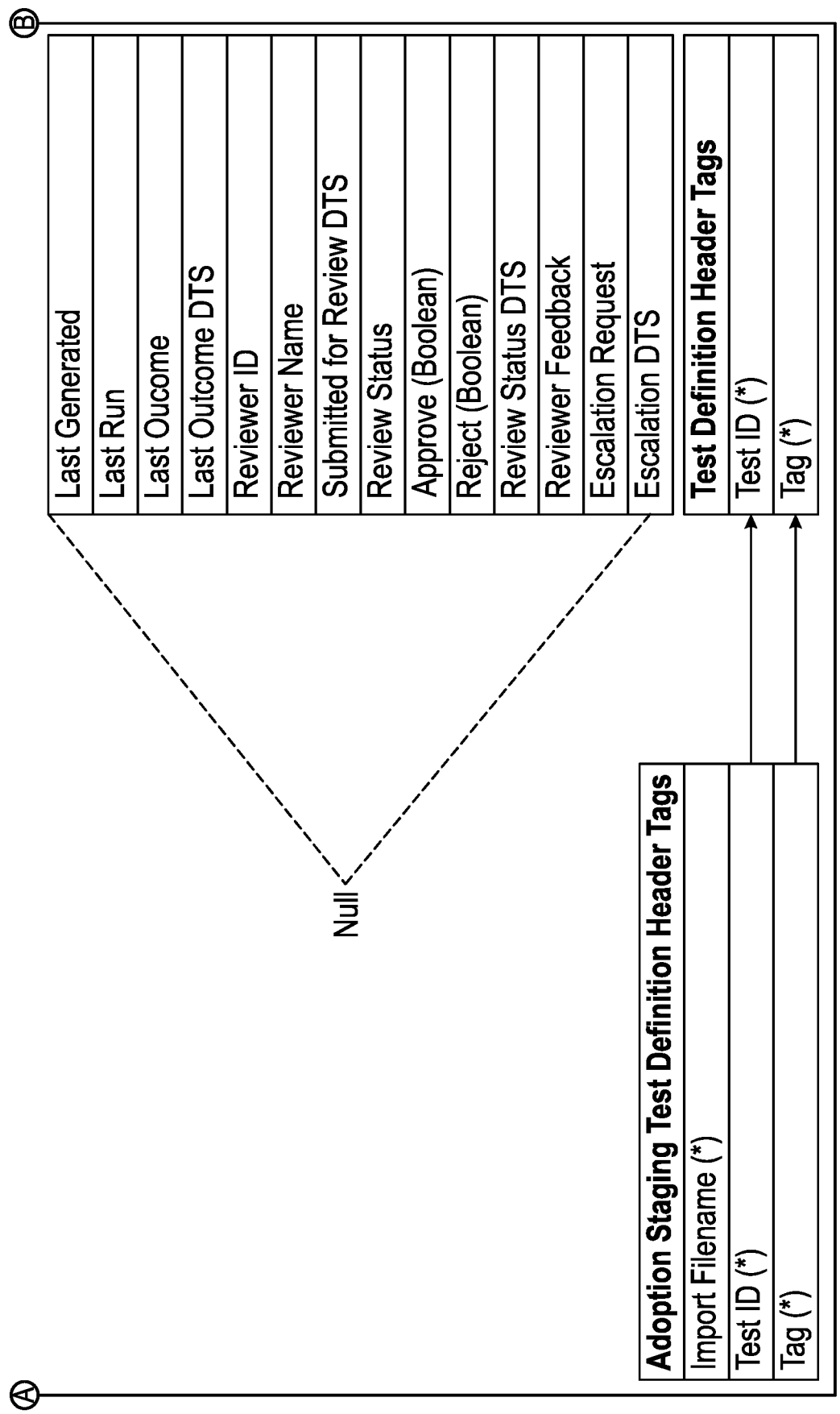
Figure 14B:
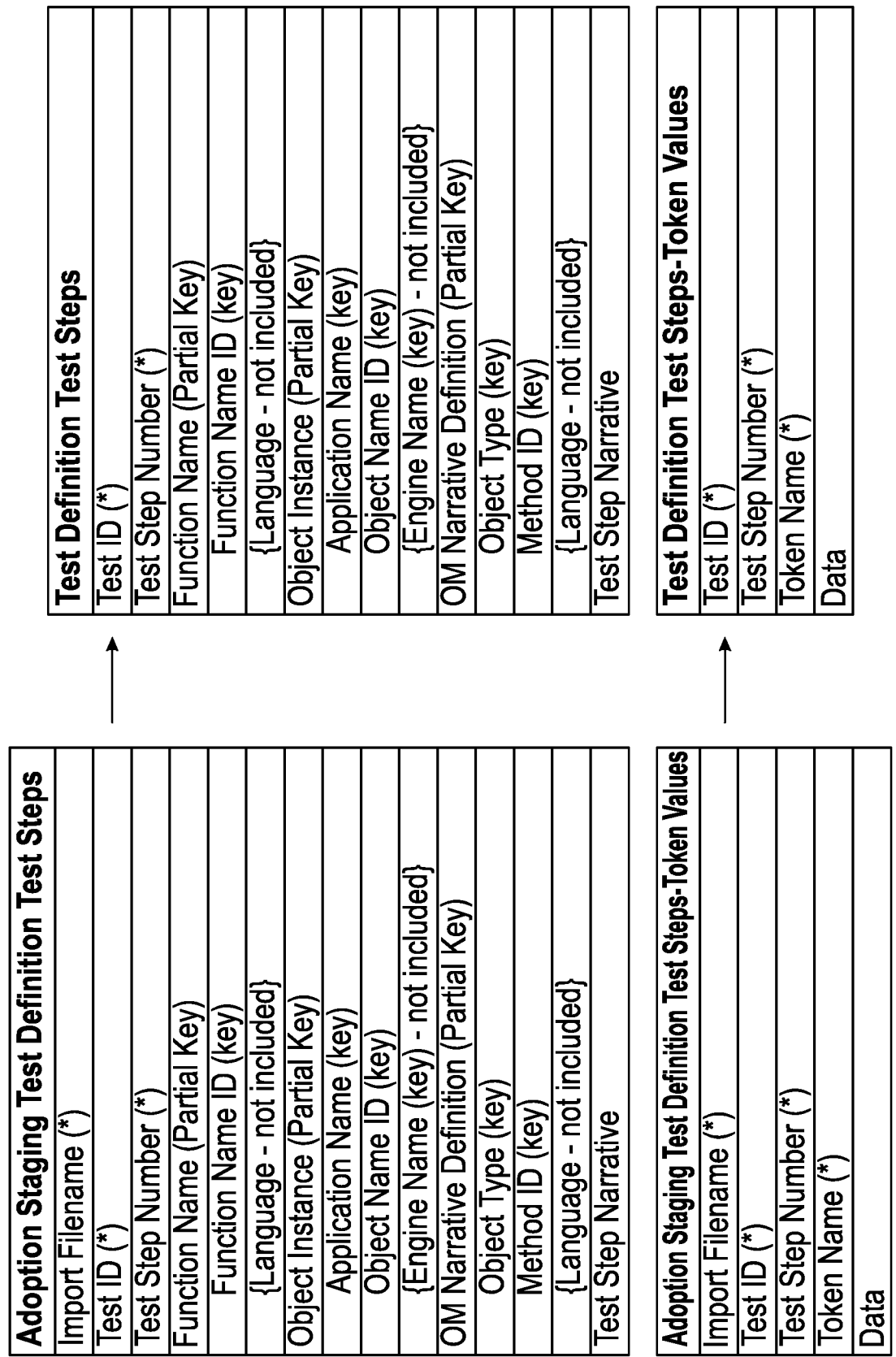

FIGS. 14A and 14B, are diagrams illustrating the various data and information for adoption in accordance with various embodiments of the present inventive concept.

FIG. 15 illustrates a series of diagrams illustrating "options" in accordance with some embodiments of the present inventive concept.

Figure 16A:
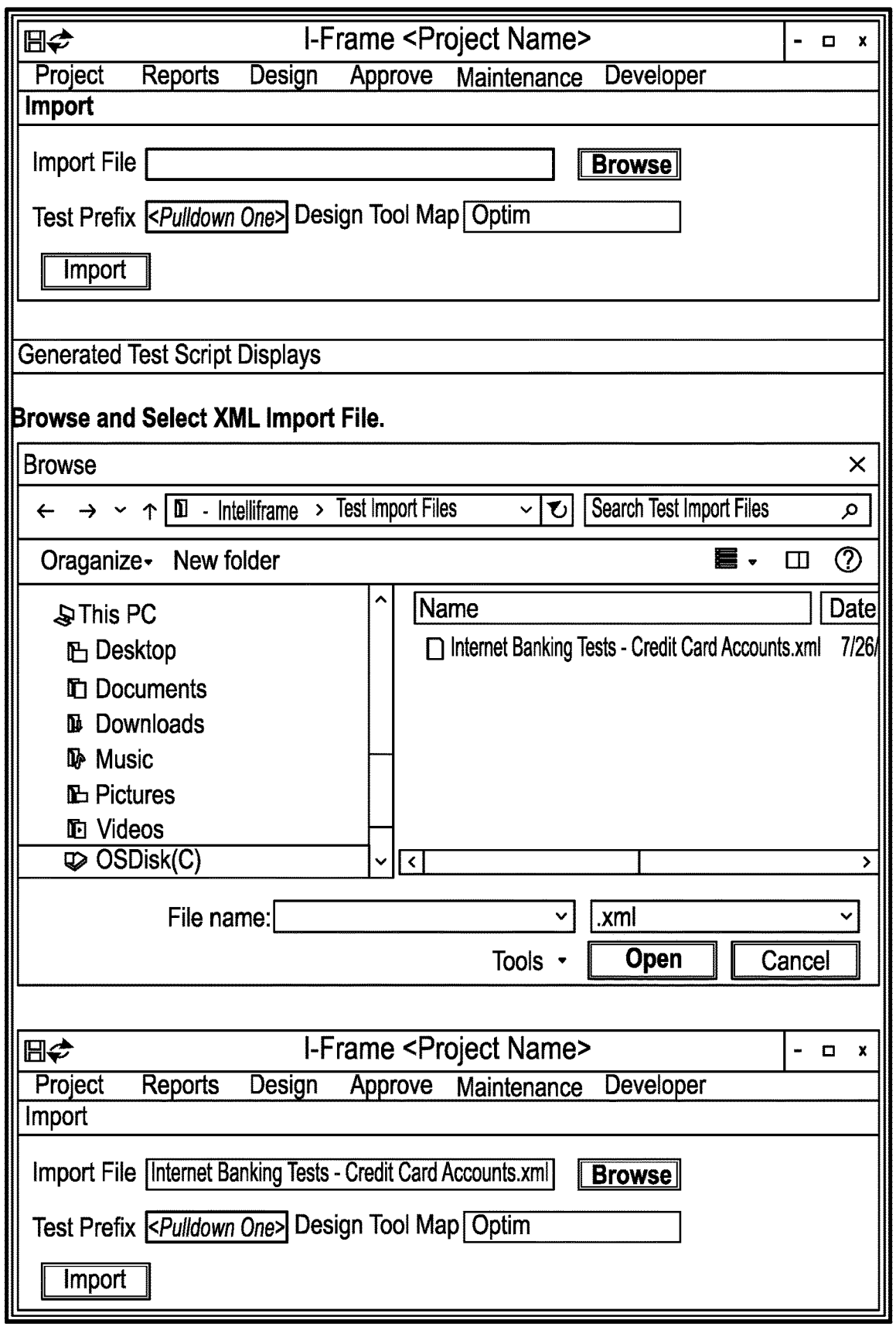
Figure 16A:
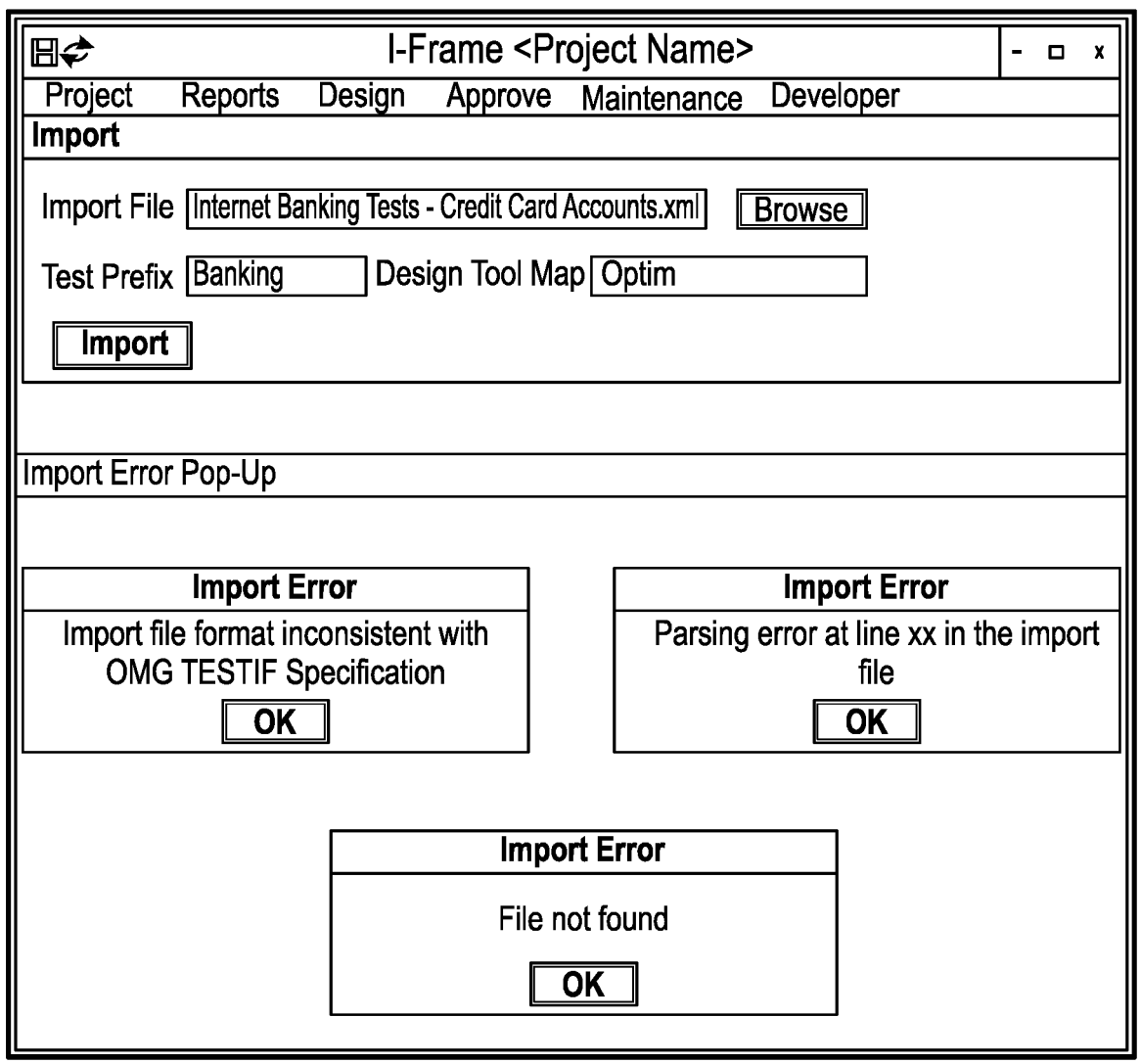

FIGS. 16A through 16C illustrate the various fields of FIG. 15 including data imported therein in accordance with various embodiments of the present inventive concept.

Figure 17E:
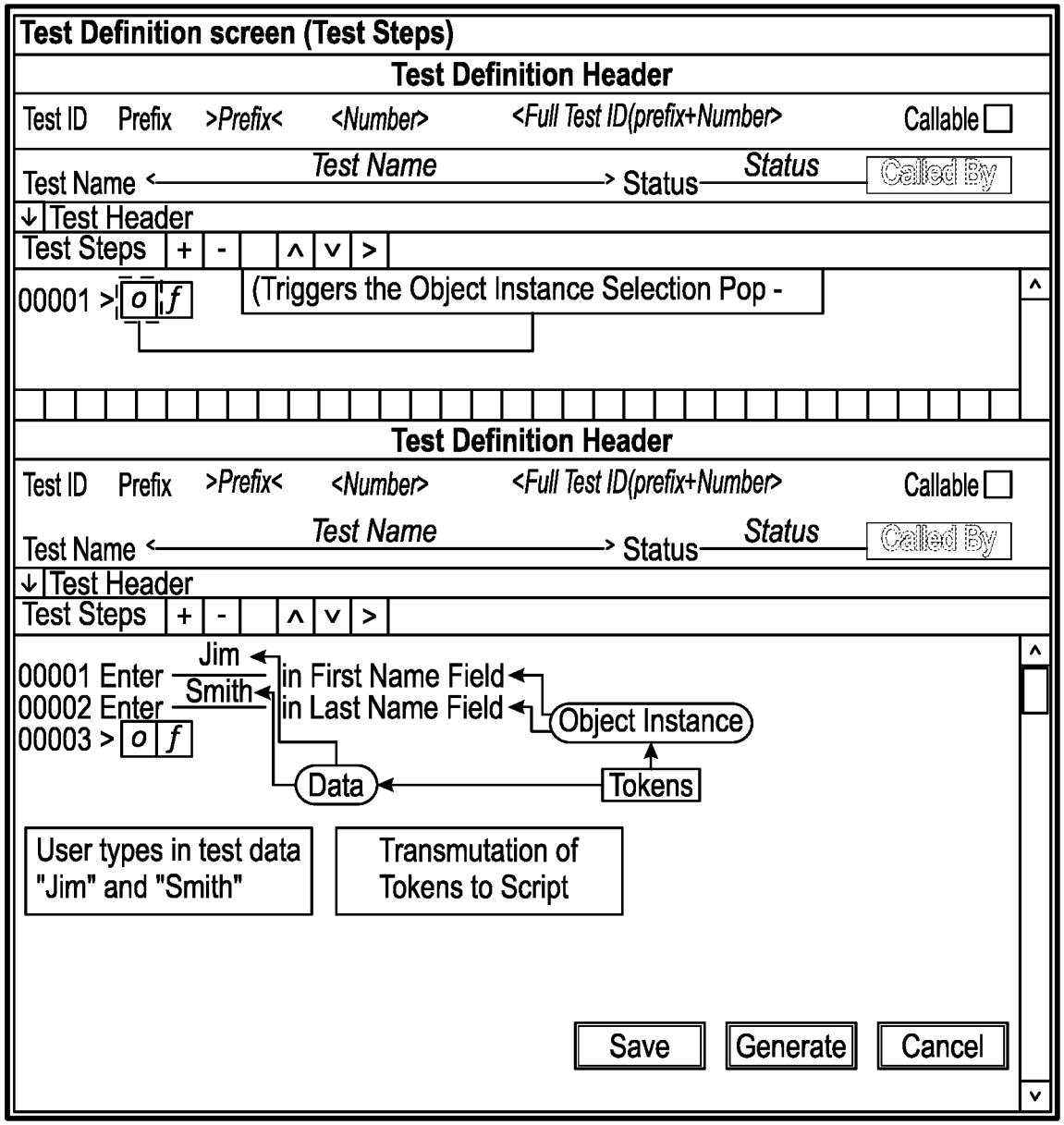
FIGS. 17A through 17P are diagrams illustrating various test definitions in accordance with various embodiments of the present inventive concept.
Figure 17F:
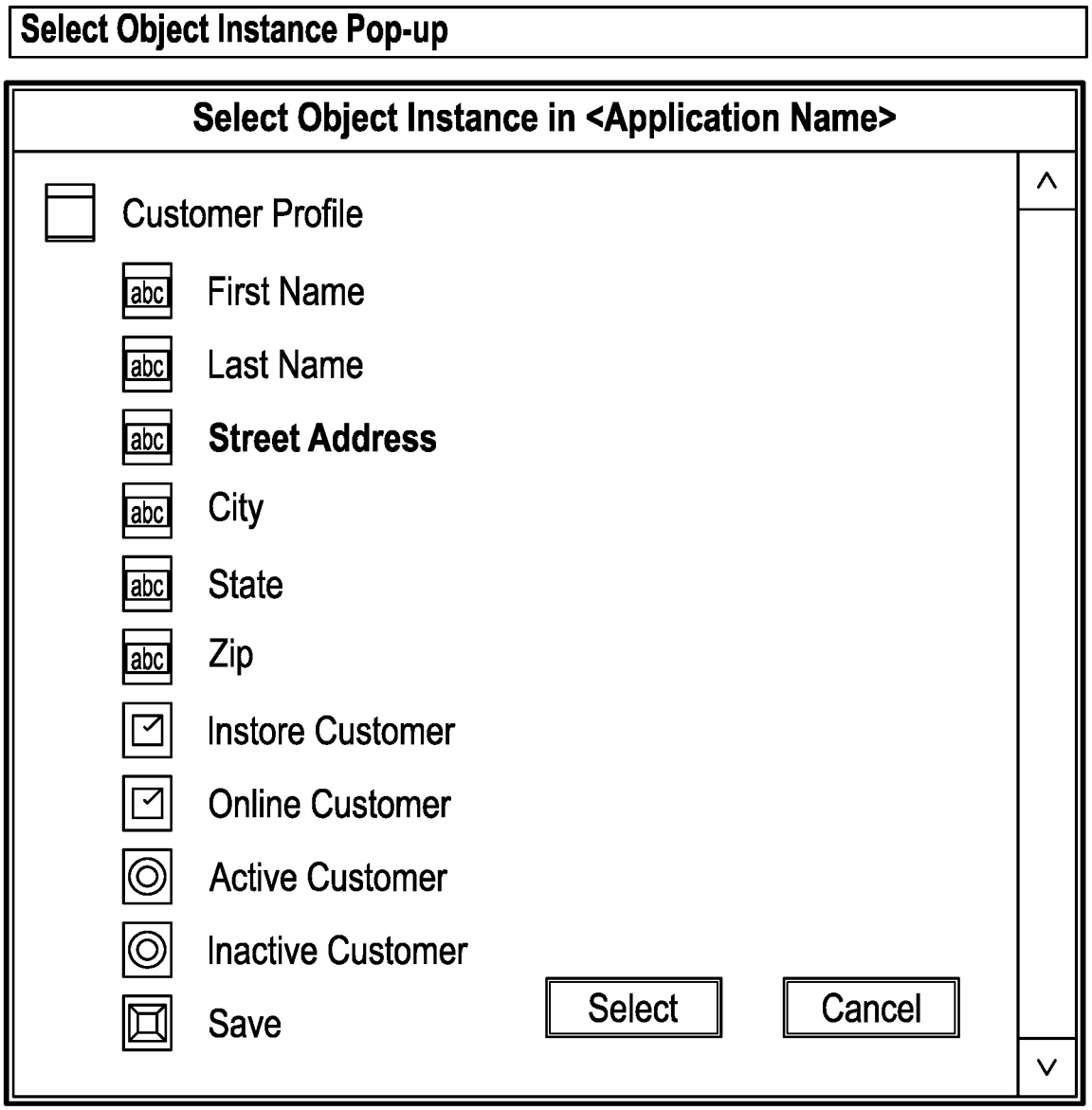
Figure 18A:
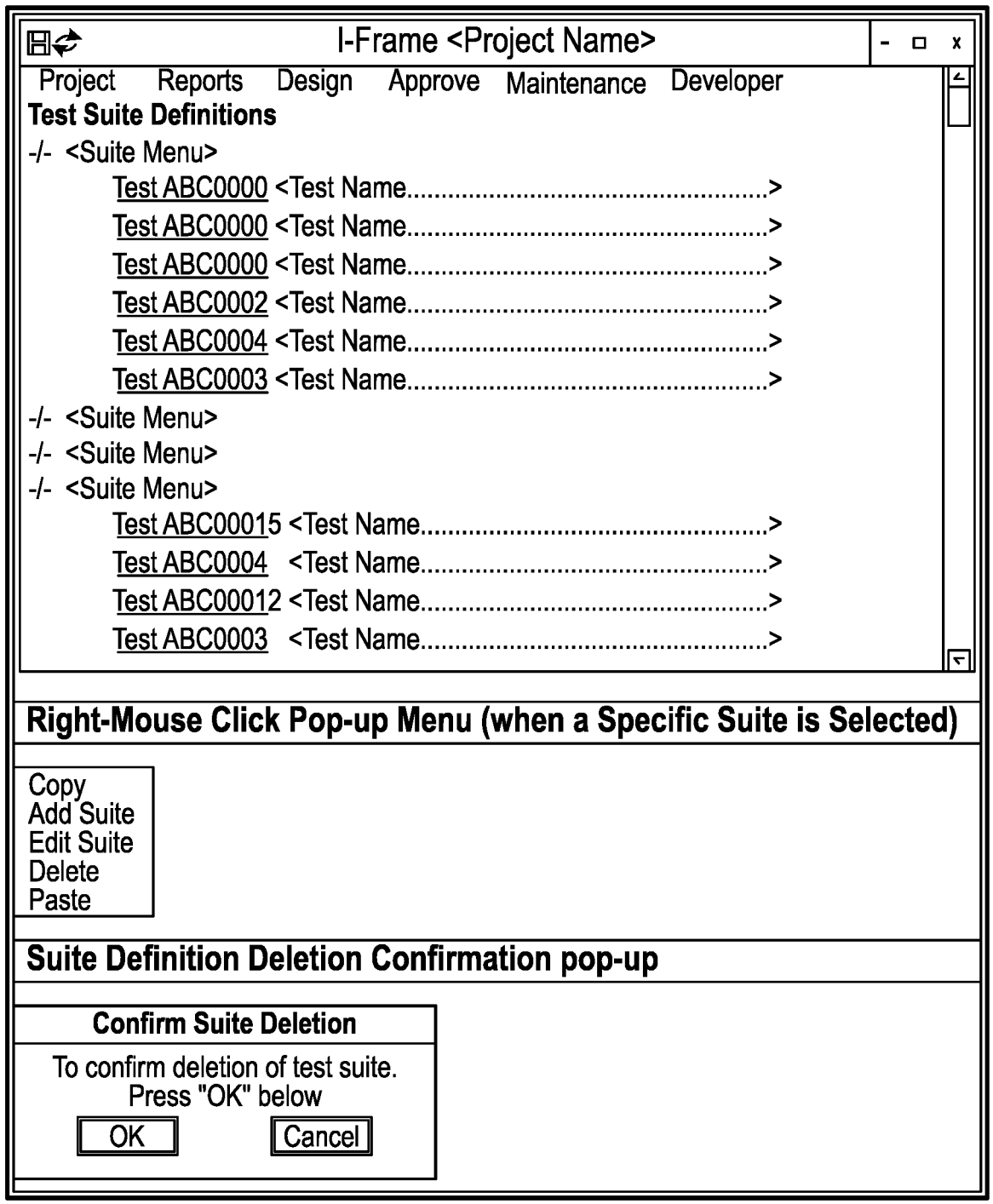
Figure 18C:
Figure 18C:
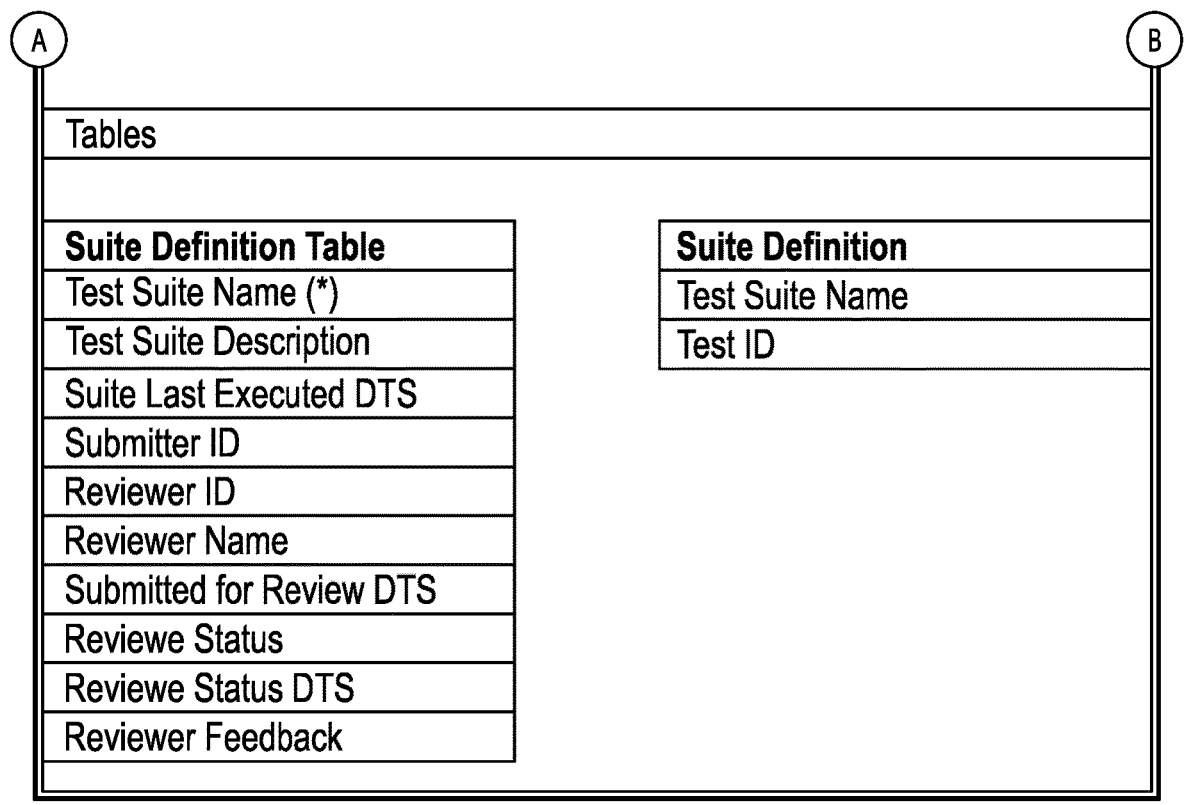

FIGS. 17A through 17P are diagrams illustrating various test definitions in accordance with various embodiments of the present inventive concept.

FIGS. 18A through 18D are diagrams illustrating test suite definitions in accordance with some embodiments of the present inventive concept.

Figure 19:
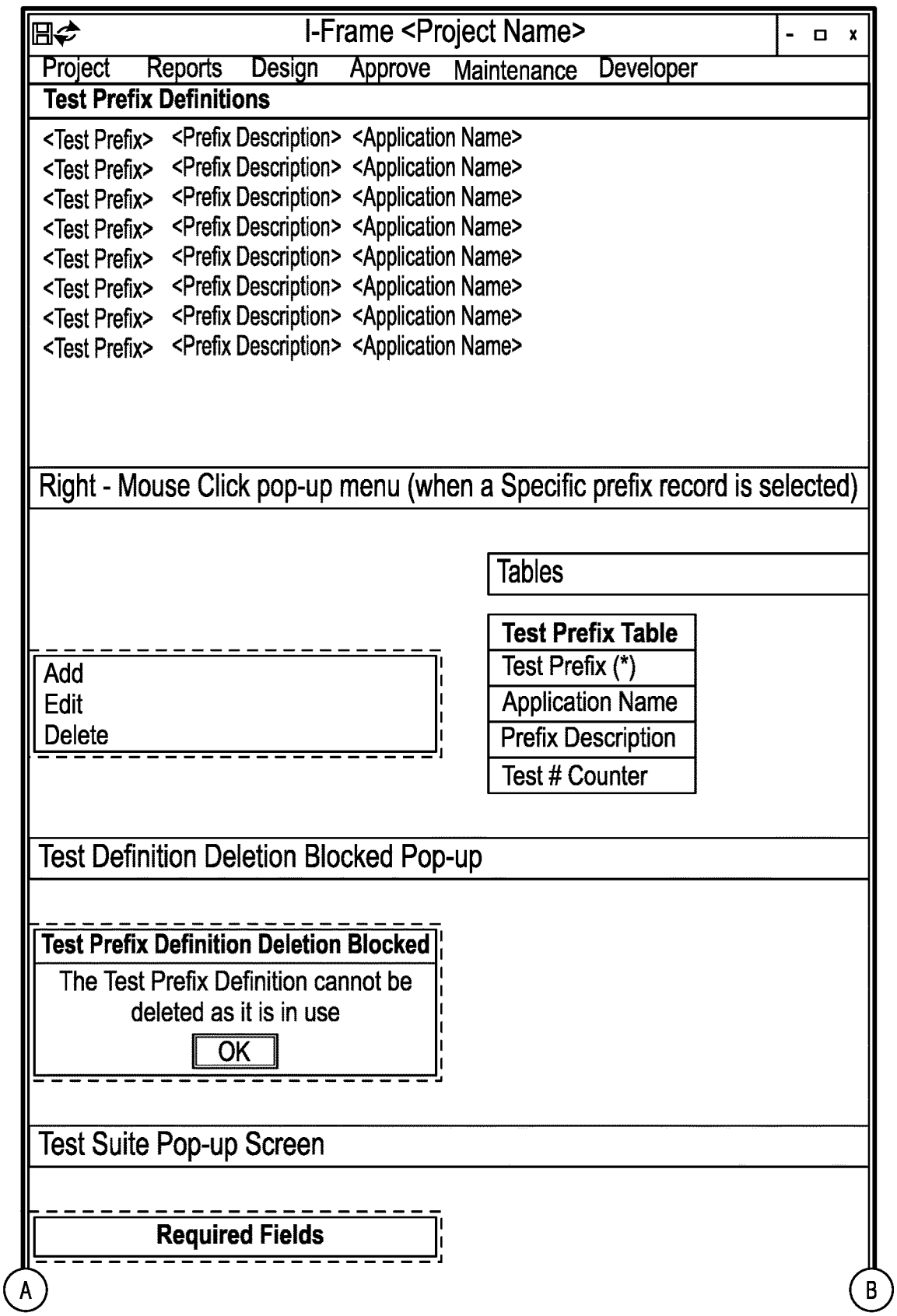
FIG. 19 is a diagram illustrating test prefix definitions in accordance with some embodiments of the present inventive concept.
Figure 20A:
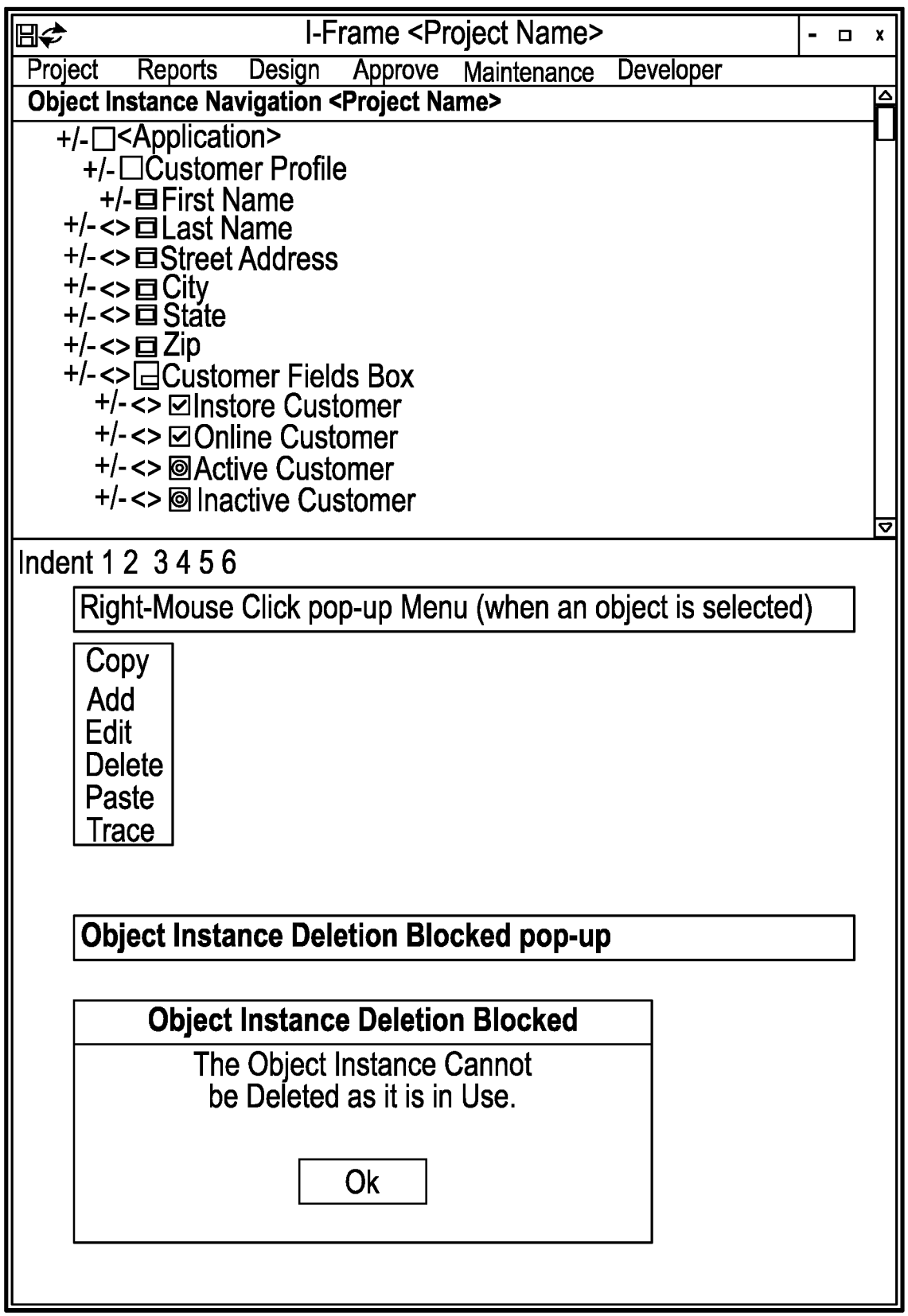
Figure 21A:
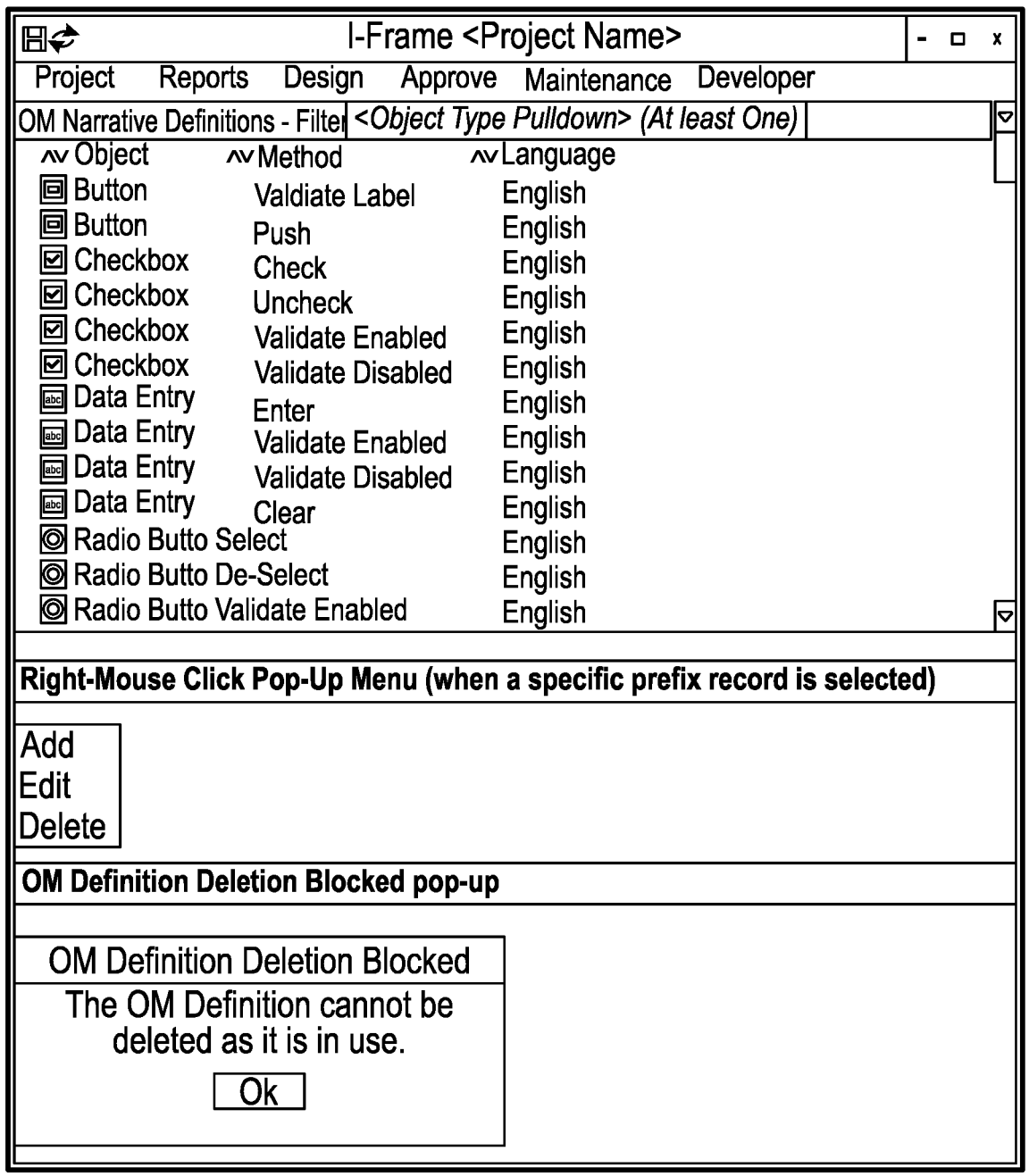
Figure 22A:
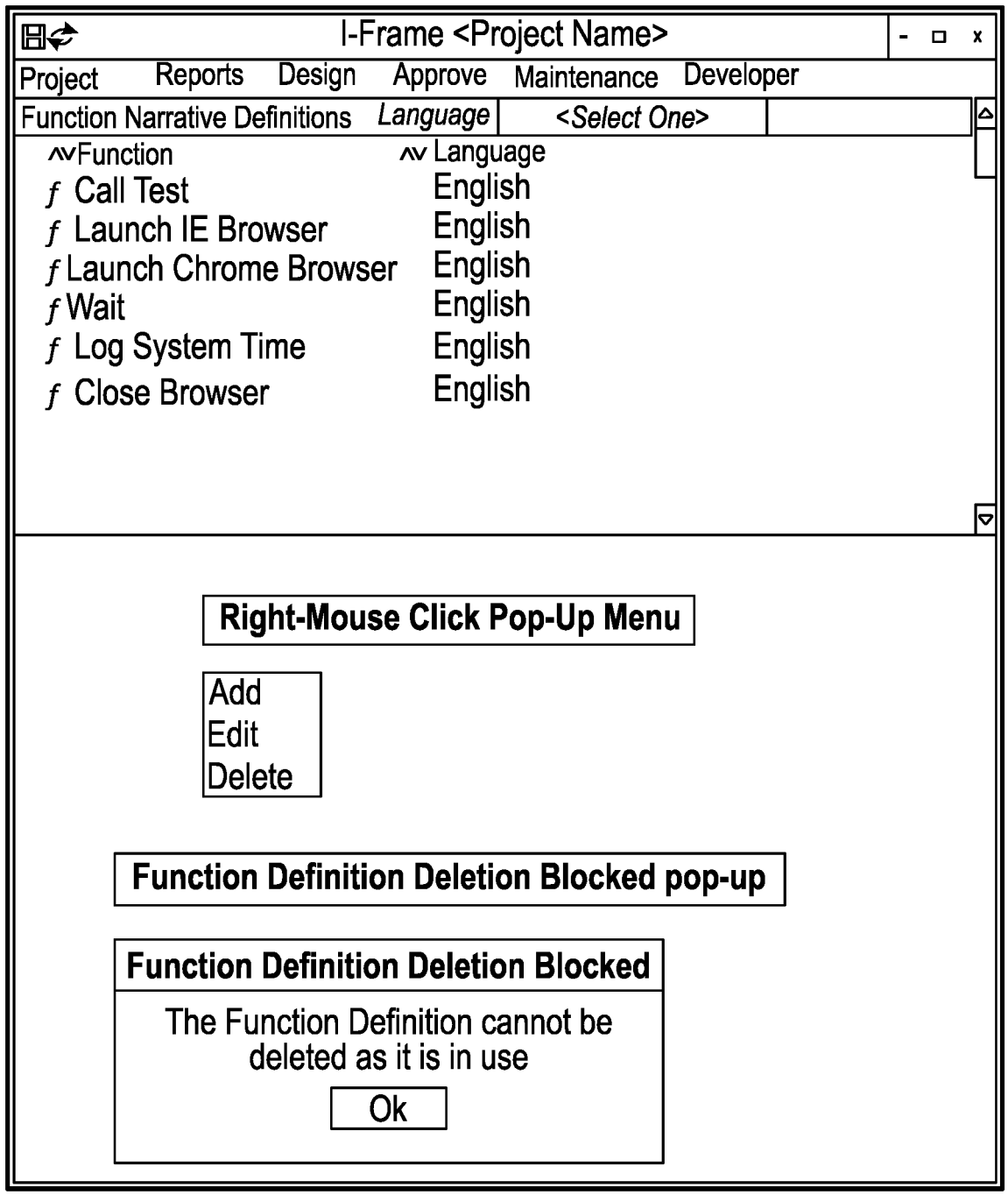
Figure 27D:

FIG. 19 is a diagram illustrating test prefix definitions in accordance with some embodiments of the present inventive concept.

FIGS. 20A through 20E are diagrams illustrating object instance navigation in accordance with some embodiments of the present inventive concept.

FIGS. 21A through 21E are diagrams illustrating OM narrative definitions in accordance with some embodiments of the present inventive concept.

FIGS. 22A through 22E are diagrams illustrating function narrative definitions in accordance with some embodiments of the present inventive concept. Call test function is a functionality provided by embodiments of the present inventive concept. No tool code is linked to this function in the module. The module discussed herein provided for the lookup of callable tests and inserts test steps into the test definition. An executable toll code is linked to the test steps inserted into the calling test.

Figure 29:
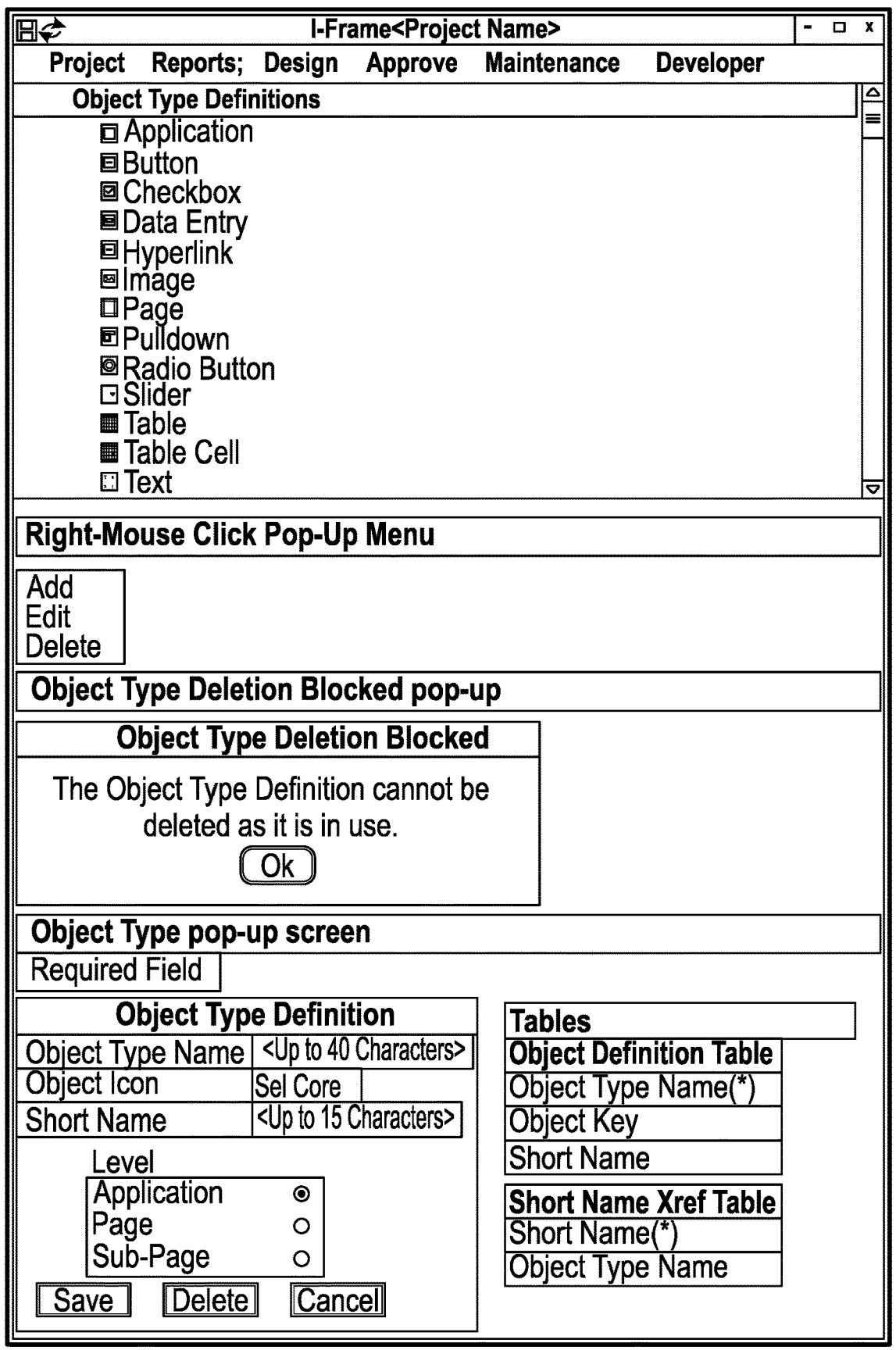
FIG. 29 is a diagram illustrating object type definitions in accordance with some embodiments of the present inventive concept.
Figure 31A:
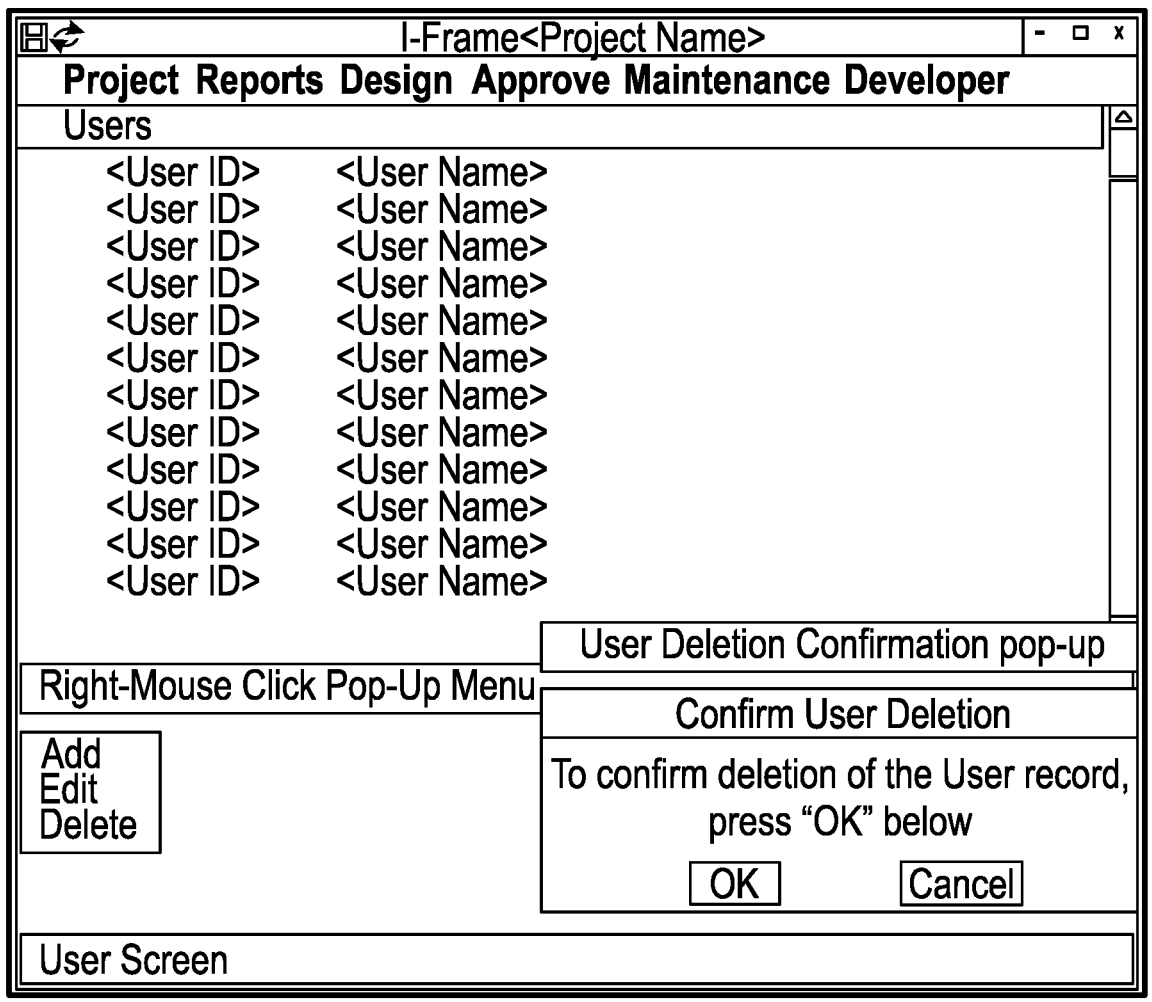
Figure 33:
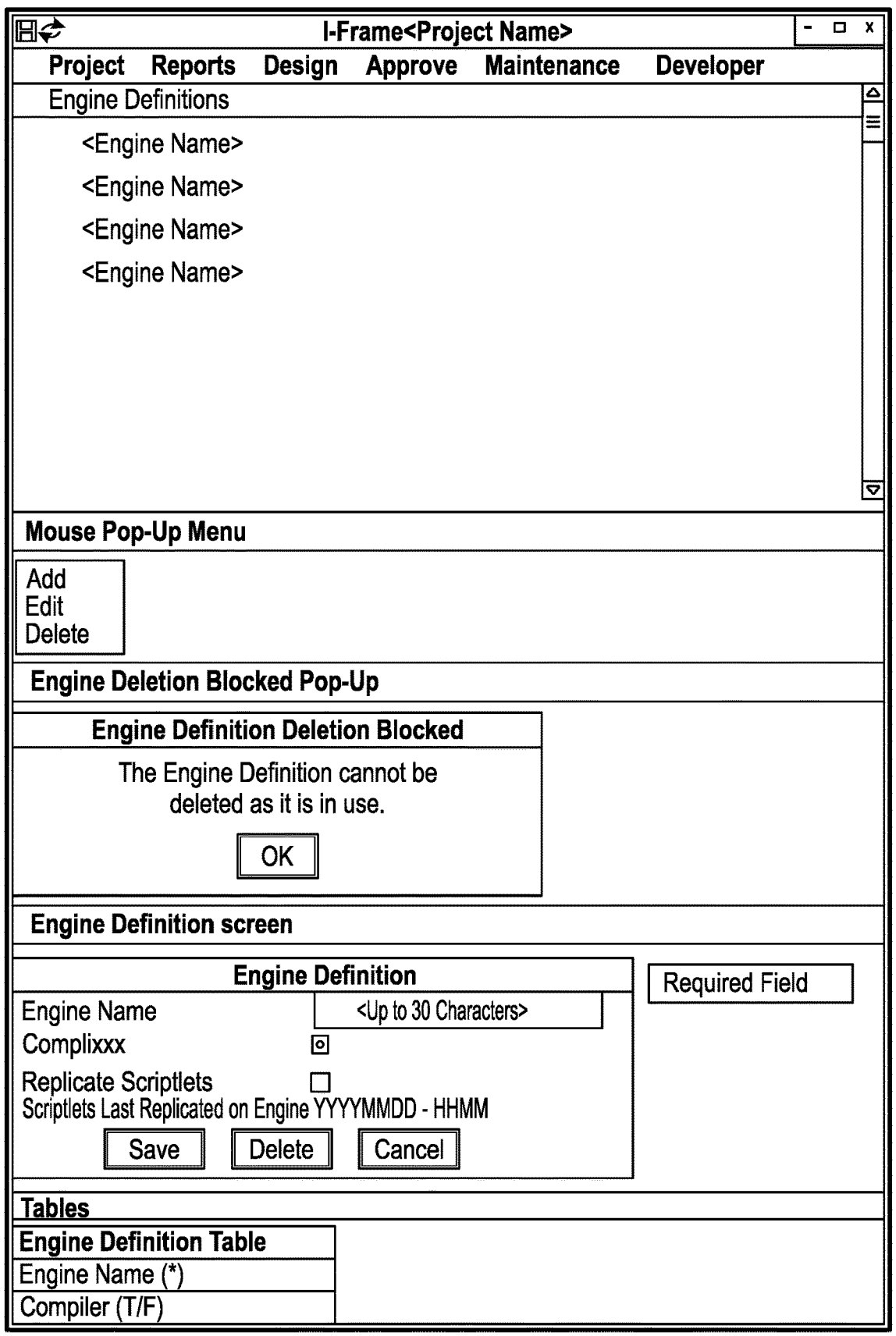
FIG. 33 is a diagram illustrating engine definitions in accordance with some embodiments of the present inventive concept.
Figure 34:
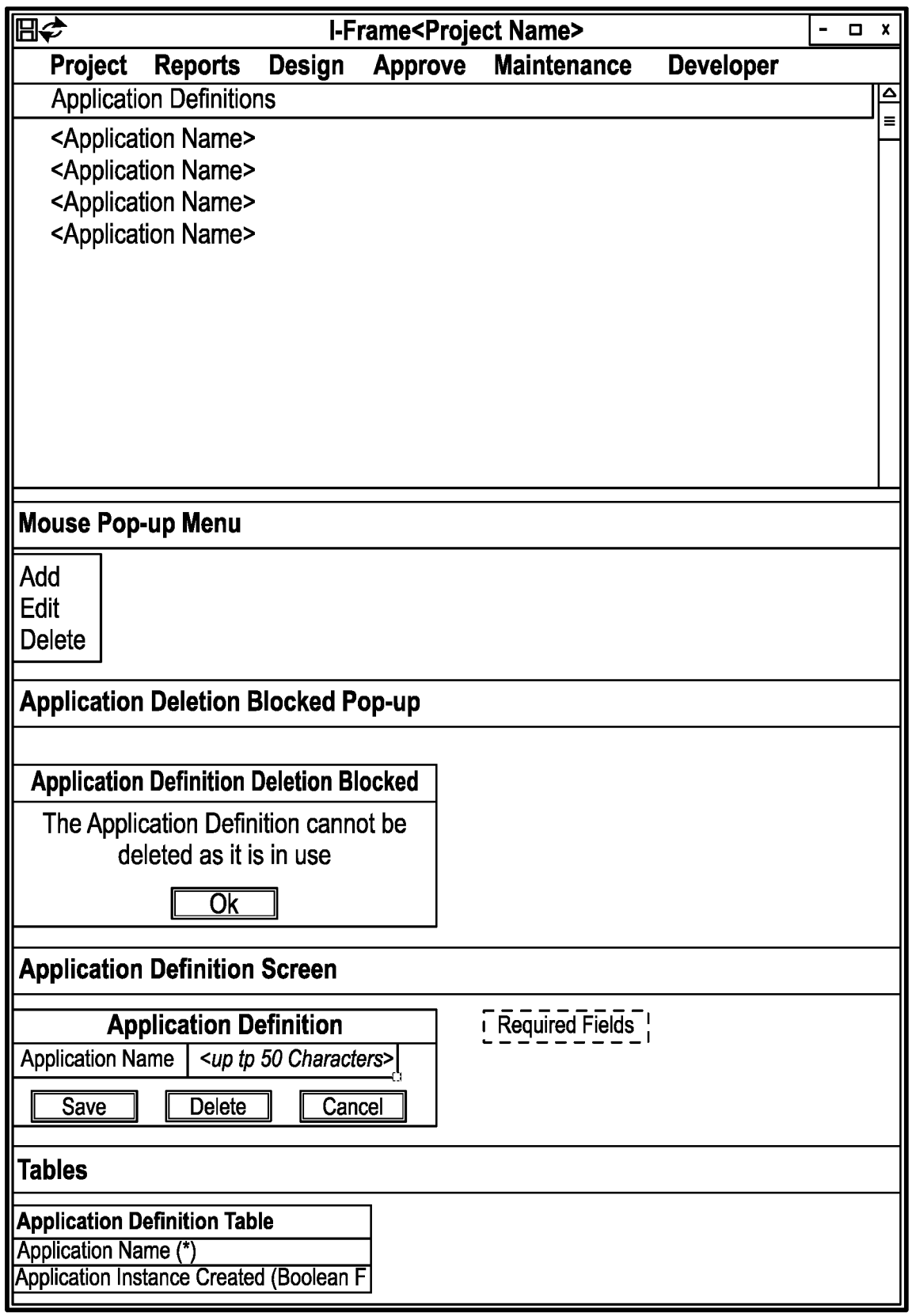
FIG. 34 is a diagram illustrating application definitions in accordance with some embodiment so the present inventive concept.

FIGS. 23A through 23E are diagrams illustrating importing (adoption) in accordance with some embodiments of the present inventive concept. FIGS. 24A and 24B are diagrams illustrating approving test definitions in accordance with some embodiments of the present inventive concept. FIG. 25 is a diagram illustrating approving test suite definitions in accordance with some embodiments of the present inventive concept. FIGS. 26A through 26E are diagrams illustrating test definition search filters in accordance with some embodiments of the present inventive concept. FIGS. 27A through 27F are diagrams illustrating replacement in accordance with some embodiments of the present inventive concept. FIGS. 28A and 28B are diagrams illustrating impact in accordance with some embodiments of the present inventive concept. FIG. 29 is a diagram illustrating object type definitions in accordance with some embodiments of the present inventive concept. FIG. 30 is a diagram illustrating test type definitions in accordance with some embodiments of the present inventive concept. FIGS. 31A and 31B are diagrams illustrating user functionality in accordance with some embodiments of the present inventive concept. FIG. 32 is a diagram illustrating language functionality in accordance with some embodiments of the present inventive concept. FIG. 33 is a diagram illustrating engine definitions in accordance with some embodiments of the present inventive concept. FIG. 34 is a diagram illustrating application definitions in accordance with some embodiment so the present inventive concept.

Various aspects of the test automation module in accordance with embodiments discussed herein will be discussed with respect to the flowcharts of FIGS. 35A through 38. Referring first to the flowchart of FIG. 35A, operations for providing a basic framework and object navigation begin at block 3500 by providing wireframe (basic frame) and object requirements and building an object instance navigation (block 3510) within the test automation module. The object instance navigation map may be displayed or printed for the user and may be validated by, for example, designers and/or developers (block 3525). Similarly, user stories having use case validation criteria is provided (block 3505) and combined with requirements analysis and test design (block 3515). The object instance navigation of block 3510 may be provided to the output of block 315 to provide automated test scripts (block 3520). These test scripts may be provided in spoken language scripts for validation for non-engineers who have subject matter expertise and for test driven development (TDD) (block 3530). Furthermore, from the automated test scripts (block 3520), both narrative (spoken language) and executable test files may be generated (block 3531). Thus, according to some embodiments of the present inventive concept, preliminary manual testing (non-automated) may be nearly eliminated, which may provide a large cost savings in personnel alone.

Figure 35A:
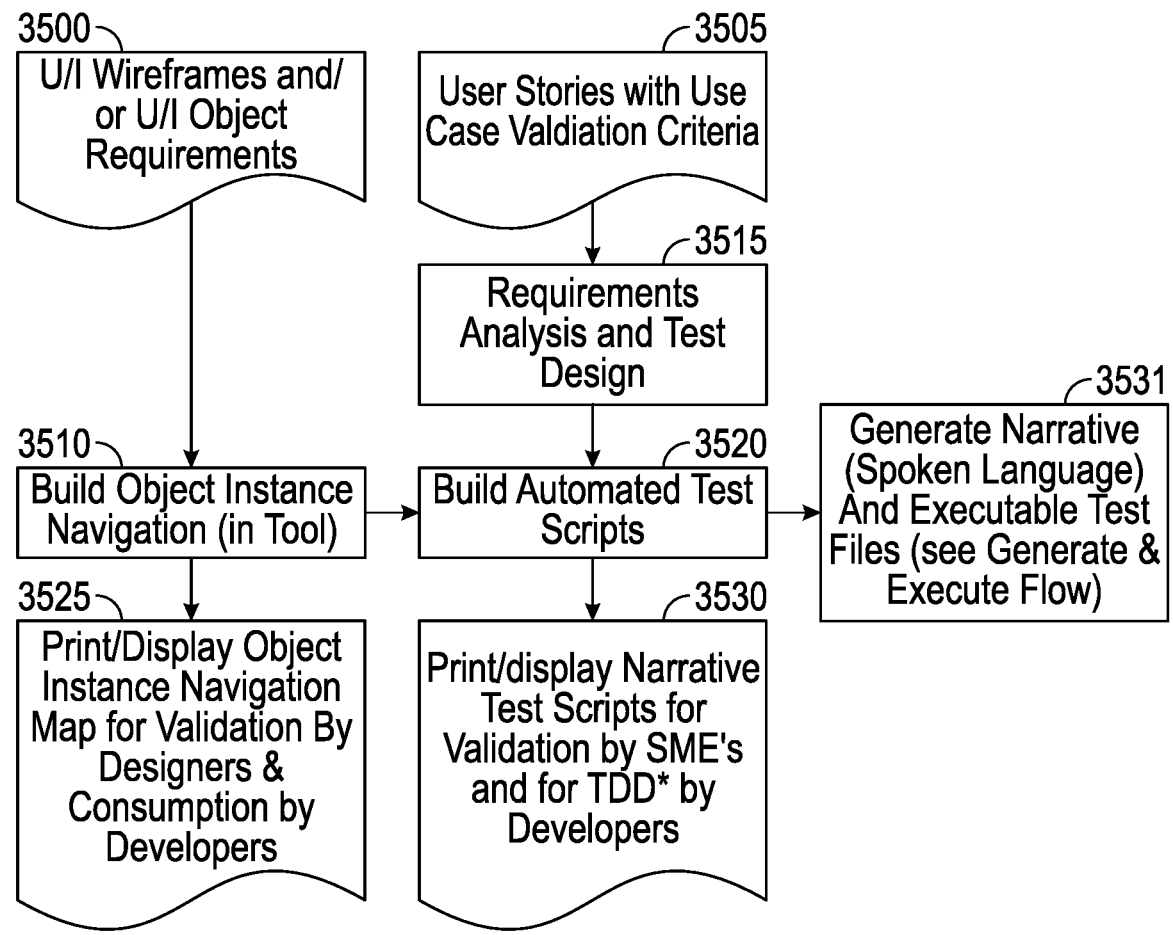
FIGS. 35A through 35C are flowcharts illustrating operations for setting up a framework and defining objects to create scripts in accordance with some embodiments of the present inventive concept.
Figure 35B:
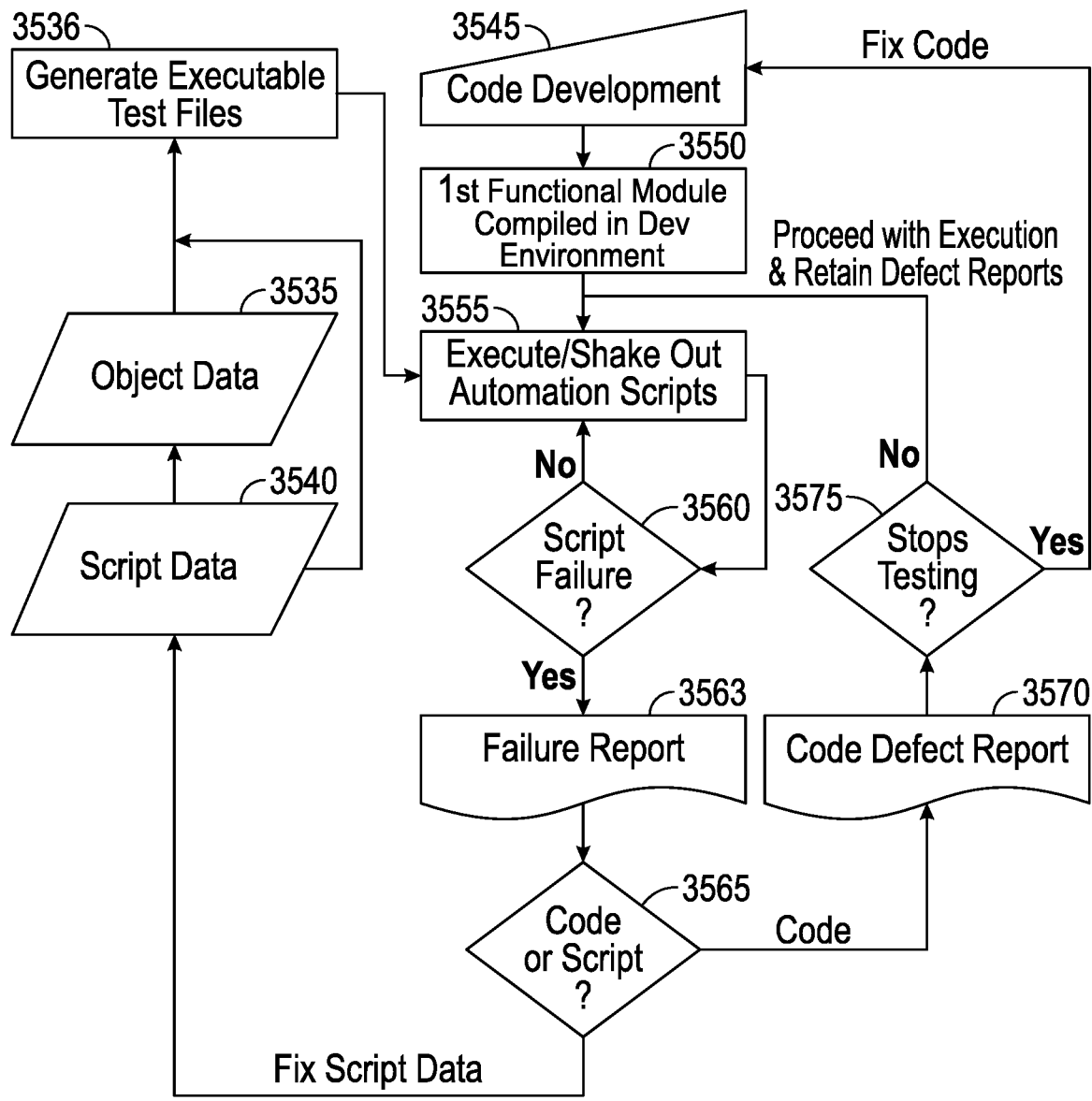

Operations proceed to the flowchart of FIG. 35B where the object data 3535 and the scripts data 3540 are provide for execution and shake out (block 3555). If the script fails (block 3560), a failure report is generated (block 3563) and the code/script (block 3565) is checked, fixed and retested until no failure is detected (block 3560). When the code/script fails a "code" may be sent in a code defect report (block 3570). It is determined if testing should be stopped (block 3575). If yes (block 3575), operation return to code development (block 3545). If no (block 3575), operations proceed with execution of the code and return defect reports (block 3550). The first functional module is compiled in the development environment (block 3550). As further illustrated in FIG. 35B, the object data 3535 and the script data 3540 are used to generate executable script files (block 3536).

Figure 35C:
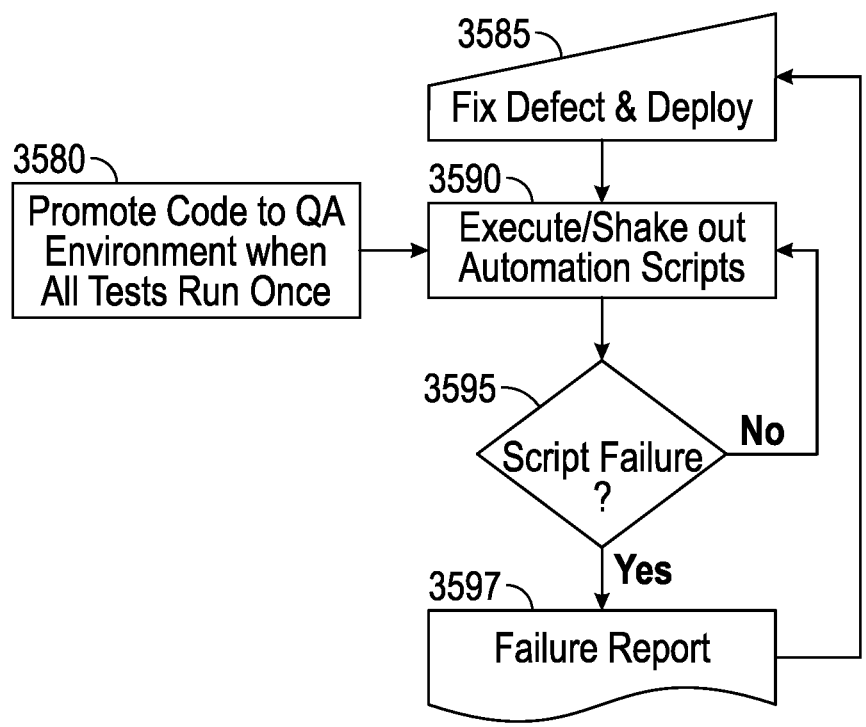

Once the code in compiled, operations proceed to the QA environment as illustrated in FIG. 35C at block 3580. Using automation scripts the code is tested (block 3590). If the script fails (block 3595), a failure report is generated (block 3697) and the defect is fixed and the code may be deployed (block 3585). If the script does not fail (block 3595), operations continue until a failure occurs. It will be understood that all major defects are discovered during unit testing. Quality assurance (QA) testing is used for stabilization testing until all defects are fixed or meet acceptance criteria. Then the code is available for performance and user acceptance testing.

Figure 36:
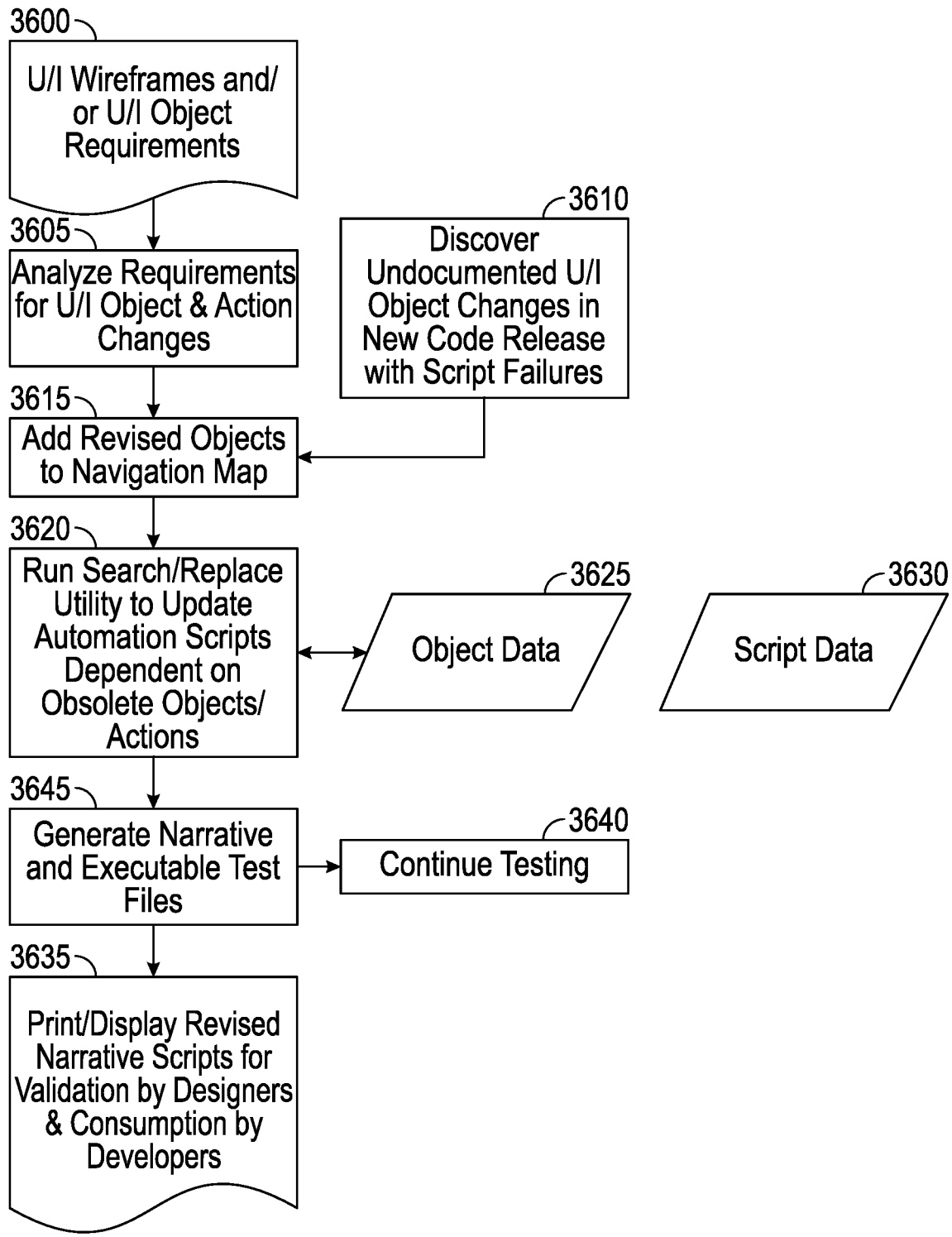
FIG. 36 is a flowchart illustrating operations for updating code when code becomes obsolete in accordance with some embodiments of the present inventive concept.

Referring now to FIG. 36, a flowchart illustrating operations for updating code when code becomes obsolete in accordance with some embodiments of the present inventive concept will be discussed. As illustrated in FIG. 36, operations begin at block 3600 by providing the wireframe and/or object requirements. These requirements are analyzed for object and action changes (block 3605). This analysis may be aided by provision of information related to undocumented user input object changed in new code release with script failure (block 3610). Information is provided from blocks 3605 and 3610 and the revised objects are added to the object navigation map (block 3615). A "search and replace" function may be run to update automation scripts dependent on objects that have been determined to be obsolete (block 3620). The search and replace function may be partially responsive to script (block 3630) and object (block 3625) data. Multiple tests (10's to 100's) may depend on collections of legacy objects. Thus, the search and replace functionality allows the dependent tests to be revised with revised objects and actions, so the code avoids becoming obsolete itself. Narrative and/or executable test files may be generated (block 3645). Revised scripts may be printed or displayed for validation (block 3635) and testing may also continue (block 3640).

Figure 37:
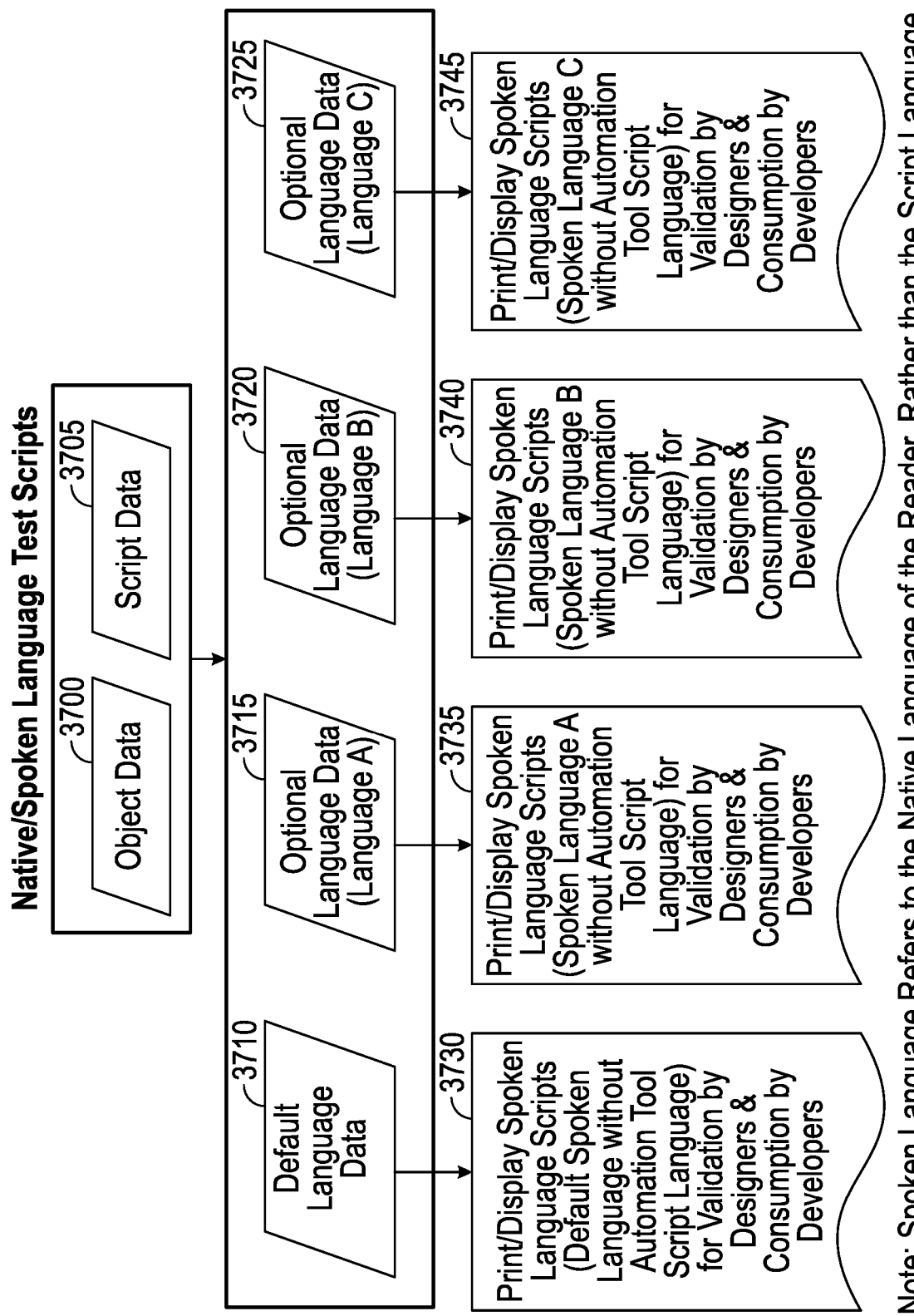
FIG. 37 is a flowchart illustrating operations for creating scripts in native languages in accordance with some embodiments of the present inventive concept.

Referring now to FIG. 37, a flowchart illustrating operations for creating scripts in native languages in accordance with some embodiments of the present inventive concept will be discussed. As illustrated, operations begin by providing the object data (block 3700) and the script data (3705) to the language module (blocks 3710, 3715, 2720 and 3725). The object and script data may be translated into spoken language so that the code can be reviewed by subject matter experts. There may be one default language (block 3710) and a plurality of other languages (block 3715, 3720, 3725) available. Although FIG. 37 only shows four languages, any number of languages may be provided without departing from the scope of the present inventive concept. "Spoken language" refs to the native language of the reader, rather than script language. Thus, allowing SMEs all over the world to review the code and verify it is being tested correctly, an automation engineer is not needed. The scripts may be displayed or printed for review in any of the languages (blocks 3730, 3735, 3740 and 3745).

Figure 38:
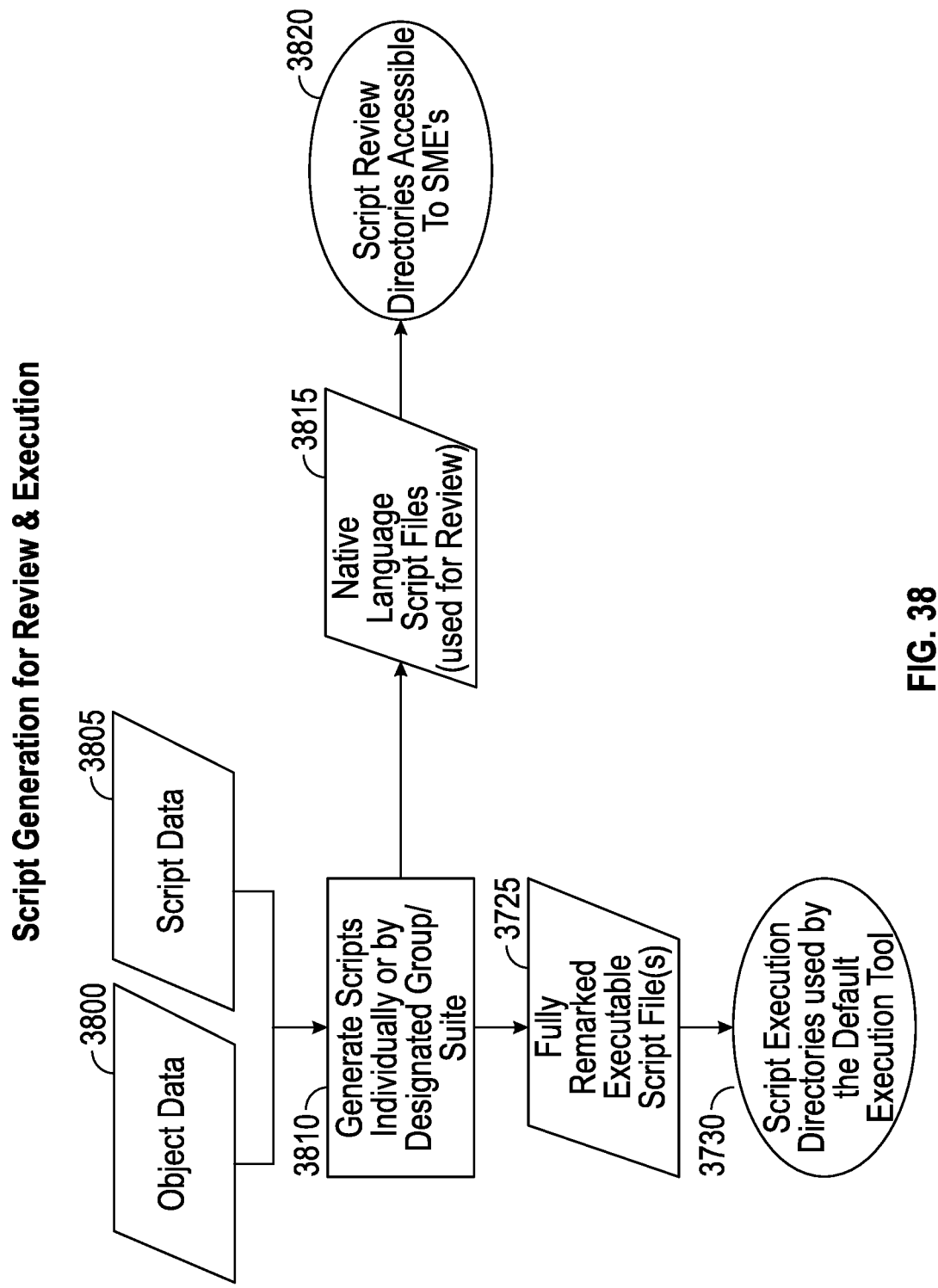
FIG. 38 is a flowchart illustrating operations for script generation for review and execution in accordance with some embodiments of the present inventive concept.

Referring now to FIG. 38, a flowchart illustrating operations for script generation for review and execution in accordance with some embodiments of the present inventive concept will be discussed. As illustrated, object data (block 3800) and script date (3805) are provided. Scripts are generated (block 3810), they can be generated individually or by designated group/suite. A fully remarked executable script file as illustrated in FIG. 39 may be generated (block 3725). Test analysts unfamiliar with the scripting language can used these remarked reports to identify the section of the script that is failing and then debug improper use of object and action or test step sequence. Where the test analyst's evaluation vindicates proper step sequence and object/action usage, he or she refers to script malfunction to the automation engineer to fix the executable language at fault. In some embodiments, eighty percent of script maintenance can thus be carried out by test analysts unfamiliar with automation script languages.

Script execution directories may be used by the default execution tool (block 3730). Native language scripts files may also be generated (block 3815) and may be reviewed by SMEs (block 3620). FIGS. 40A through 40C illustrate example native language scripts in English, Spanish and Hindi, respectively. SMEs and auditors, for example, can review native language scripts for conformance to requirements or compliance. Although only English, Spanish and Hindi are illustrated in FIGS. 40A through 40C, embodiments of the present inventive concept are not limited to these languages.

Figure 41:
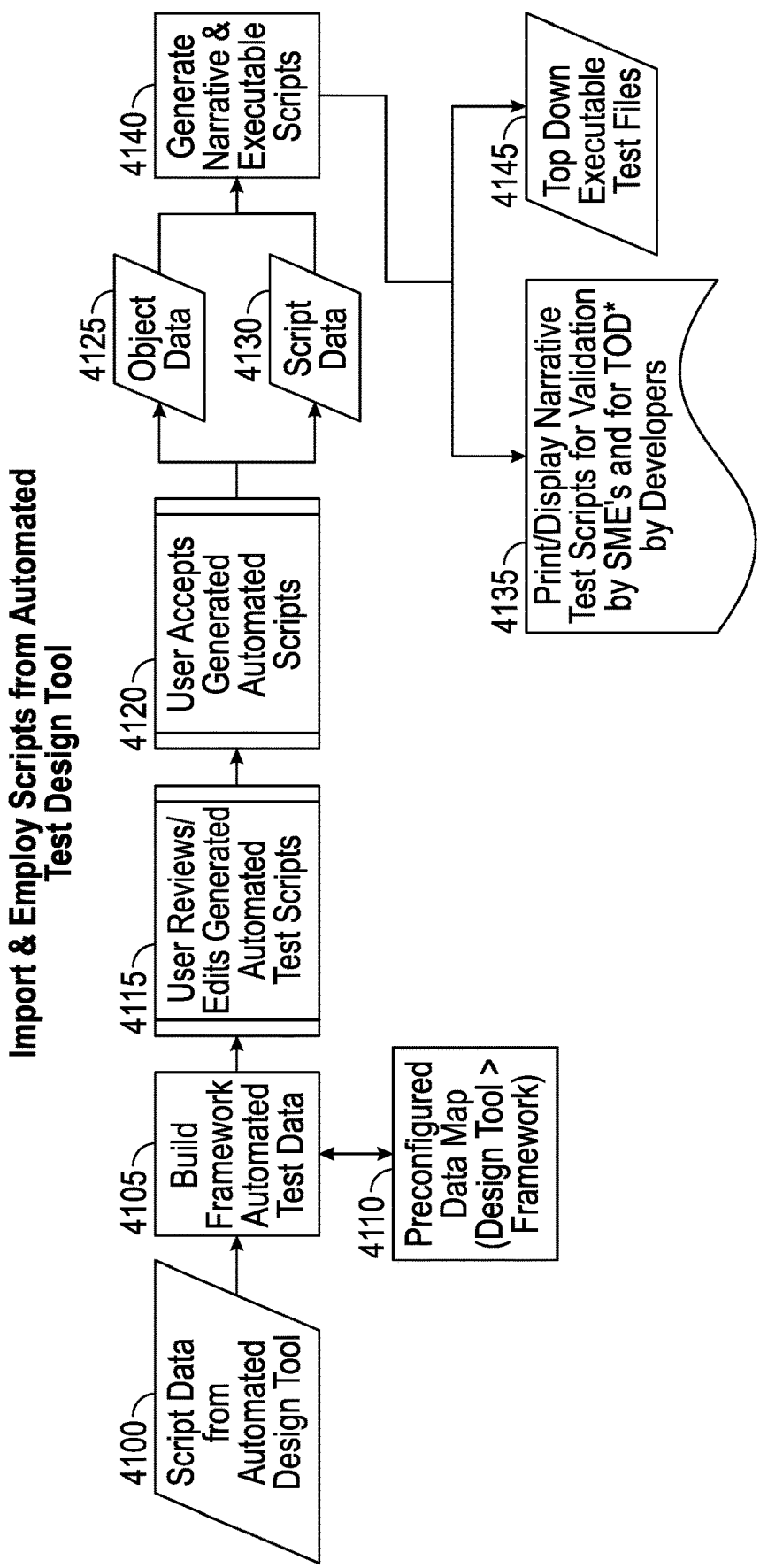
FIG. 41 is a flowchart illustrating operations for importing and using scripts from the test automation module in accordance with various embodiments of the present inventive concept.

Referring now to FIG. 41, a flowchart illustrating operations for importing and using scripts from the test automation module in accordance with various embodiments of the present inventive concept will be discussed. As illustrated, operations begin at block 4100 by providing script data from the automated test framework module in accordance with some embodiments. A framework is built for the automated test data (block 4105). A user may review and edit generated scripts (block 4115) and accept them once reviewed and/or edited (block 4120). The object data 4125 and the script date 4130 is used to generate narrative and executable scripts (block 4140). Narrative test scripts may be printed/displayed for validation by SMEs and for TDD by developers. Top down executable test files may also be made available (block 4145).

Figure 42:
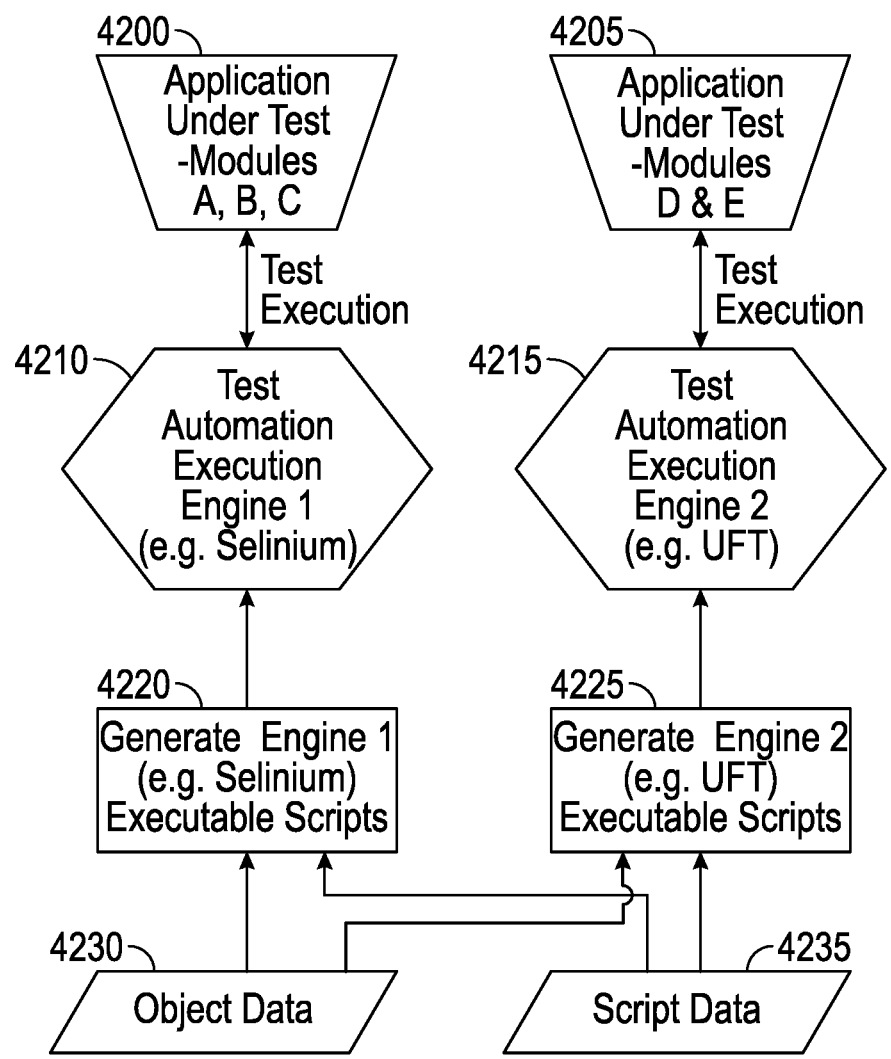
FIG. 42 is a flowchart illustrating operations for testing one application with two or more execution engines in accordance with various embodiments of the present inventive concept.

Referring now to FIG. 42, a flowchart illustrating operations for testing one application with two or more execution engines in accordance with various embodiments of the present inventive concept will be discussed. Some applications have a mix of U/I technologies that cannot be tested using a single execution engine. Some embodiments of the present inventive concept provide the ability to use more than one execution engine from one framework with application test suites. As illustrated in FIG. 42, operations begin by providing object data 4230 and script data 4235 and generating more than one engine, for example, engine 1 may be selenium (block 4220) and engine 2 may be UFT (block 4225). Selenium is a portable framework for testing applications and UFT is an automated testing software. Although two engines are shown in FIG. 42, embodiments of the present inventive concept are not limited thereto. Furthermore, Selenium and UFT are provide for example only and embodiments are not limited thereto. Tests are executed using both engines (blocks 4210 and 4215). As illustrated, certain modules, for example, modules A, B and C (block 4200) are tested using the first engine (block 4210) and modules D and E (block 4205) are testing using the second engine (block 4215).

Figure 43:
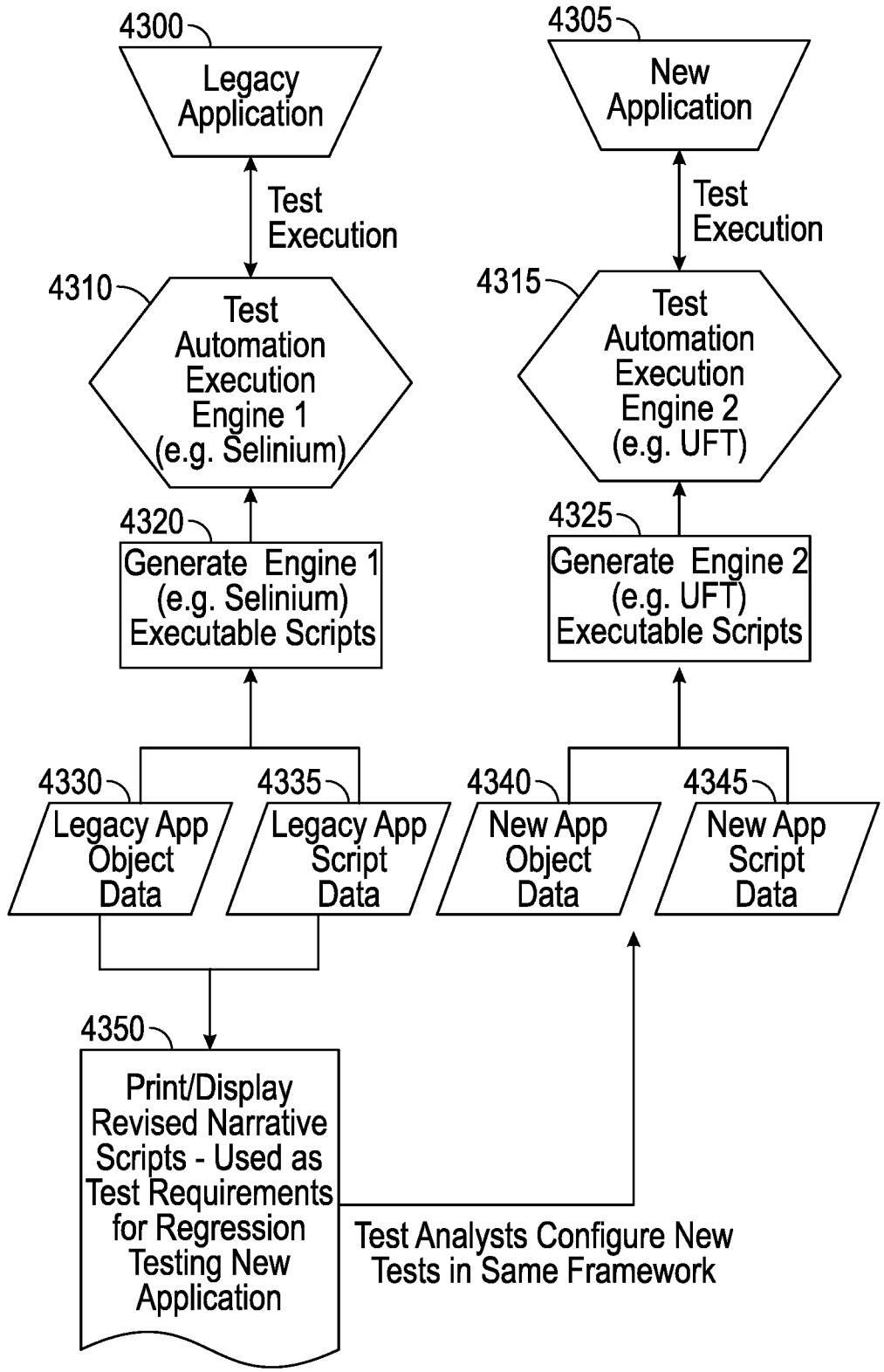
FIG. 43 is a flowchart illustrating operations for leveraging legacy automation tests for a new application during transition in accordance with various embodiments of the present inventive concept.

Referring now to FIG. 43, a flowchart illustrating operations for leveraging legacy automation tests for a new application during transition in accordance with various embodiments of the present inventive concept will be discussed. In some embodiments, transitions to new applications may be phased. In other words, the old and new applications run differing functionality in parallel until the transition is complete. For example, legacy automated tests have been refined to test business essential functionality. These legacy tests can be leveraged to ensure coverage of the new automated tests. As illustrated in FIG. 43, the legacy application operations (blocks 4300, 4310, 4320, 4330 and 4335) run in parallel with the new application operations (block 4305, 4315, 4325, 4340 and 4345). As further illustrated, the revised narrative scripts used as test requirements for regression testing (block 4350) are provided to create the new application objects (4340) and new application scripts (4345) to generate the engine for executable scripts (block 4325) for the new application. Thus, the information from the legacy engine and application inform the engine for the new application.

As briefly discussed above, some embodiments of the present inventive concept provide an automation test tool that allows scripts to be generated while the code is being developed or even prior to. Thus, most major errors are located before the code is compiled. In some embodiments, the need for manual testing may be virtually eliminated. Furthermore, some embodiments allow the scripts to be translated into a natural language such that the tests can be reviewed for SMEs who are not automation engineers. The reduction in the amount of manual testing and providing documents scripts in natural language may provide a large cost savings due to the need for fewer automation engineers.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpretive languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), microcontroller or graphics processing unit.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed example embodiments of the inventive concept. Although specific terms are employed, they are used in a generic and descriptive sense only and not for purposes of limitation, the scope of the inventive concept being defined by the following claims.

What is claimed is:

1. A system for automating testing of a software product comprising:
 a test automation suite module configured to:
 receive input to define and maintain test automation suite modules to test the software product including object requirements for tests based on user stories and/or requirements associated with the software product;
 build an object instance navigation and automated test scripts based on the received input;
 provide an object instance navigation map for the test automation suite modules, wherein the test automation suite module receives the input, builds the object instance references and provides the object instance navigation map before or in parallel with coding analysis, design and coding of the software product; and
 automatically define, refine, and execute the automated test scripts during development of the software product by automatically updating the test scripts to provide updated test scripts based on detected changes to the software product being tested, the updating and the detection of the changes being performed automatically by the system,
 wherein the updated test scripts are remarked in a default language including a test step number and related narrative.

2. The system of claim 1:
 wherein the object instance navigation map is consumable by software designers, subject matter experts and/or developers; and
 wherein the test automation suite module is further configured to provide common language narrative scripts for validation by subject matter experts.

3. The system of claim 2, wherein the test automation suite module is further configured to define, refine, and execute the test scripts during development of the software product allowing automated rapid automatic changes to the automated tests scripts to provide the updated test scripts responsive to changes to the software product and rapid redeployment of the updated test scripts.

4. The system of claim 2, wherein the test automation suite module further comprises a search module that selectively filters test components that are determined to be obsoleted and a replace module that automatically replaces the test components determined to be obsoleted in all occurrences within the automated test suite modules.

5. The system of claim 1, wherein the test automation suite module is further configured to provide stabilization testing in quality assurance (QA) environments once all test cases run successfully in a development unit test environment.

6. The system of claim 1, wherein the test automation suite module is further configured to provide a fully remarked, top-down script for execution and to convert the script into native language scripts for review by non-developer subject matter experts.

7. The system of claim 1, wherein the system further comprises a plurality of execution engines, each of the engines configured to test different portions of code of the software product.

8. The system of claim 1, where in the test automation suite module is further configured to run legacy application and new applications in parallel such that the legacy applications inform the new applications.

9. The system of claim 1, wherein the default language is set by a user.

10. The system of claim 1, wherein a test automation suite module is further configured to:
 enable searching and filtering of the updated test scripts by Object Class, Object Class Instance, Method, Method Test Data and/or Test Attributes including tags, title, and description to lay out object change impacts, page change impacts and/or, isolate legacy object instances.

11. The system of claim 1, wherein the test automation suite module is further configured to:
 enable targeting of a single object instance and method test step across all test cases that use the single object instance; and
 replace the object instance and the method test step with a new test step.

12. A method for automated testing of a software product using a test automation suite module, the method comprising:
 receiving input to define and maintain test automation suite modules to test the software product including object requirements for tests based on user stories and/or requirements associated with the software product;
 building an object instance navigation and automated test scripts based on the received input;
 providing an object instance navigation map for the test suite modules, wherein the receiving, the building and the providing are performed before or in parallel with coding analysis, design and coding of the software product; and
 automatically defining, refining, and executing the automated test scripts during development of the software product by automatically updating the test scripts to provide updated test scripts based on detected changes to the software product being tested, the updating and the detection of the changes being performed automatically,
 wherein the receiving, building, providing and automatically defining and are performed by at least one processor; and
 wherein the updated test scripts are remarked in a default language including a test step number and related narrative.

13. The method of claim 12:
 wherein the object instance navigation map is consumable by software designers, subject matter experts and/or developers; and
 wherein the method further comprises providing common language narrative scripts for validation by subject matter experts.

14. The method of claim 13, further comprising refining and executing the test scripts during development of the software product by allowing automated rapid automatic changes to the automated tests scripts to provide the updated test scripts responsive to changes to the software product and rapid redeployment of the updated test scripts.

15. The method of claim 13, further comprising selectively filtering test components that are determined to be obsoleted and automatically replacing the test components determined to be obsoleted in all occurrences within the automated test suite modules.

16. The method of claim 12, further comprising providing stabilization testing in quality assurance (QA) environments once all test cases run successfully in a development unit test environment.

17. The method of claim 12, further comprising providing a fully remarked, top-down script for execution and converting to the script into native language scripts for review by non-developer subject matter experts.

18. A computer program product for automated testing of a software product using a test automation suite module, the computer program product comprising:
a non-transitory computer readable storage medium having computer readable program code embodied in said medium, the computer readable program code comprising:
computer readable program code receive input to define and maintain test suite modules to test the software product including object requirements for tests based on user stories and/or requirements associated with the software product;
computer readable program code build an object instance navigation and automated test scripts based on the received input;
computer readable program code to provide object instance navigation map for the test suite modules, wherein the computer readable program code to receive the input, build the object instance references and provide the object instance navigation map is implemented before or in parallel with coding analysis, design and coding of the software product;
computer readable program code to automatically define, refine, and execute the automated test scripts during development of the software product by automatically updating the test scripts to provide updated test scripts based on detected changes to the software product being tested, the updating and the detection of the changes being performed automatically,
wherein the updated test scripts are remarked in a default language including a test step number and related narrative.

19. The computer program product of claim 18:
wherein the object instance navigation map is consumable by software designers, subject matter experts and/or developers; and
wherein the computer program product further comprised computer readable program code to provide common language narrative scripts for validation by subject matter experts.

20. The computer program product of claim 19, further comprising computer readable program code to define, refine and execute the test scripts during development of the software product by allowing automated rapid automatic changes to the automated tests scripts to provide the updated test scripts responsive to changes to the software product and rapid redeployment of the updated test scripts.

21. The computer program product of claim 19, further comprising computer readable program code to selectively filter test components that are determined to be obsoleted and automatically replace the test components determined to be obsoleted in all occurrences within the automated test suite modules.

22. The computer program product of claim 18, further comprising computer readable program code to provide stabilization testing in quality assurance (QA) environments once all test cases run successfully in a development unit test environment.

23. The computer program product of claim 18, further comprising computer readable program code to provide a fully remarked, top-down script for execution and convert to the script into native language scripts for review by non-developer subject matter experts.

* * * * *